US012771816B2

(12) United States Patent
Murakami et al.

(10) Patent No.: US 12,771,816 B2
(45) Date of Patent: Oct. 20, 2026

(54) IMAGE PROCESSING APPARATUS, IMAGE PROCESSING METHOD, AND PROGRAM

(71) Applicant: FUJIFILM Corporation, Tokyo (JP)

(72) Inventors: Yasunori Murakami, Saitama (JP); Masahiko Miyata, Saitama (JP); Takashi Aoki, Saitama (JP); Fuminori Irie, Saitama (JP); Kazunori Tamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 486 days.

(21) Appl. No.: 18/049,623

(22) Filed: Oct. 25, 2022

(65) Prior Publication Data

US 2023/0064707 A1 Mar. 2, 2023

Related U.S. Application Data

(63) Continuation of application No. PCT/JP2021/016069, filed on Apr. 20, 2021.

(30) Foreign Application Priority Data

Apr. 27, 2020 (JP) ................................ 2020-078677

(51) Int. Cl.
*H04N 13/282* (2018.01)
*G06F 3/14* (2006.01)
(Continued)

(52) U.S. Cl.
CPC ............ *H04N 13/282* (2018.05); *G06F 3/14* (2013.01); *G06T 7/70* (2017.01); *G06V 10/25* (2022.01);
(Continued)

(58) Field of Classification Search
CPC .... H04N 13/282; H04N 13/383; H04N 23/90; H04N 23/661; H04N 23/60; G06F 3/14;
(Continued)

(56) References Cited

U.S. PATENT DOCUMENTS

| | | | | |
|---|---|---|---|---|
| 6,556,201 | B1 * | 4/2003 | Maehara | G06T 13/00 345/427 |
| 2002/0149693 | A1 * | 10/2002 | Tantalo | H04N 23/71 348/E5.037 |

(Continued)

FOREIGN PATENT DOCUMENTS

| | | |
|---|---|---|
| JP | 2001067473 | 3/2001 |
| JP | 2013106324 | 5/2013 |

(Continued)

OTHER PUBLICATIONS

"International Search Report (Form PCT/ISA/210) of PCT/JP2021/016069," mailed on Jul. 13, 2021, with English translation thereof, pp. 1-5.

(Continued)

*Primary Examiner* — Stephen P Coleman
(74) *Attorney, Agent, or Firm* — JCIPRNET

(57) ABSTRACT

An image processing apparatus generates and outputs a virtual viewpoint image with reference to a position and an orientation of a target object included in an imaging region on the basis of a plurality of images obtained by imaging the imaging region with a plurality of imaging devices of which at least either of imaging positions or imaging directions are different, and controls a display aspect of the virtual viewpoint image according to an amount of temporal changes in at least one of the position or the orientation.

24 Claims, 32 Drawing Sheets

(51) Int. Cl.
*G06T 7/70* (2017.01)
*G06V 10/25* (2022.01)
*G06V 10/74* (2022.01)
*H04N 13/383* (2018.01)

(52) U.S. Cl.
CPC ......... *G06V 10/761* (2022.01); *H04N 13/383* (2018.05)

(58) Field of Classification Search
CPC ....... G06F 2218/12; G06F 3/147; G06T 7/70; G06V 10/25; G06V 10/761; G06V 10/74; G06V 10/764; G06V 20/17; G06V 40/18; G09G 3/003; G09G 2310/0232; G09G 2340/0428; G09G 2354/00; G09G 2370/02; G09G 2370/20
USPC .......................................................... 382/154
See application file for complete search history.

(56) References Cited

U.S. PATENT DOCUMENTS

2007/0085927 A1* 4/2007 Auberger ........... H04N 23/6811 348/402.1
2014/0010456 A1* 1/2014 Merler .................... G06T 7/277 382/191
2018/0048810 A1* 2/2018 Matsushita ............. G06T 15/00
2018/0136720 A1* 5/2018 Spitzer ...................... G06T 1/20
2019/0068945 A1 2/2019 Maruyama
2019/0174109 A1* 6/2019 Yoshikawa .......... H04N 13/243
2020/0014901 A1 1/2020 Umemura
2020/0234495 A1 7/2020 Nakao et al.

FOREIGN PATENT DOCUMENTS

JP 2019045995 3/2019
JP 2019197409 11/2019
JP 2020009021 1/2020
WO 2018211570 11/2018
WO 2019012817 1/2019

OTHER PUBLICATIONS

"Written Opinion of the International Searching Authority (Form PCT/ISA/237)" of PCT/JP2021/016069, mailed on Jul. 13, 2021, with English translation thereof, pp. 1-8.
"Office Action of Japan Counterpart Application", issued on Oct. 31, 2023, with English translation thereof, p. 1-p. 6.

* cited by examiner

IMAGE PROCESSING APPARATUS, IMAGE PROCESSING METHOD, AND PROGRAM

CROSS-REFERENCE TO RELATED APPLICATIONS

This application is a continuation application of International Application No. PCT/JP2021/016069, filed Apr. 20, 2021, the disclosure of which is incorporated herein by reference in its entirety. Further, this application claims priority under 35 USC 119 from Japanese Patent Application No. 2020-078677 filed Apr. 27, 2020, the disclosure of which is incorporated by reference herein.

BACKGROUND

1. Technical Field

The technique of the present disclosure relates to an image processing apparatus, an image processing method, and a program.

2. Related Art

JP2019-045995A discloses an information processing apparatus that determines a position of a viewpoint related to a virtual viewpoint image generated by using a plurality of images captured by a plurality of imaging devices. The information processing apparatus disclosed in JP2019-045995A includes a first determination unit that determines a scene related to generation of a virtual viewpoint image, and a second determination unit that determines a position of a viewpoint related to the virtual viewpoint image in the scene determined by the first determination unit on the basis of the scene determined by the first determination unit.

JP2019-197409A discloses an image processing apparatus that includes a generation unit that generates a virtual viewpoint image corresponding to a set virtual viewpoint, a designation unit that designates one or more display control target objects included in the virtual viewpoint image, and a display control unit that controls a display aspect of the designated object in the virtual viewpoint image according to a set speed of the virtual viewpoint.

JP2020-009021A discloses an information processing apparatus including a setting unit that sets a first virtual viewpoint related to generation of a virtual viewpoint image based on multi-viewpoint images obtained from a plurality of cameras, and a generation unit that generates viewpoint information indicating a second virtual viewpoint having at least one of a position or an orientation different from that of the first virtual viewpoint set by the setting unit and corresponding to the same time point as that of the first virtual viewpoint on the basis of the first virtual viewpoint set by the setting unit.

WO2018/211570A discloses a video generation program causing a computer to execute a process of generating a three-dimensional model of a target object in a three-dimensional space by combining a plurality of imaging frames in which the target object is imaged from a plurality of directions by a plurality of cameras, and determining a position where a virtual camera is disposed in the three-dimensional space on the basis of a position of the target object in the three-dimensional space.

SUMMARY

One embodiment according to the technique of the present disclosure provides an image processing apparatus, an image processing method, and a program capable of reducing discomfort given to a viewer of a virtual viewpoint image by temporal changes in a position and an orientation of a target object compared with a case where the position and the orientation of the target object are reproduced without change in the virtual viewpoint image.

A first aspect according to the technique of the present disclosure is an image processing apparatus including a processor; and a memory built in or connected to the processor, in which the processor generates and outputs a virtual viewpoint image with reference to a position and an orientation of a target object included in an imaging region on the basis of a plurality of images obtained by imaging the imaging region with a plurality of imaging devices of which at least either of imaging positions or imaging directions are different, and controls a display aspect of the virtual viewpoint image according to an amount of temporal changes in at least one of the position or the orientation.

A second aspect of the technique of the present disclosure is the image processing apparatus according the first aspect in which the processor controls the display aspect according to the amount of temporal changes smaller than an actual amount of temporal changes in the position and the orientation of the target object.

A third aspect of the technique of the present disclosure is the image processing apparatus according to the first aspect or the second aspect in which the processor generates an adjustment position and an adjustment orientation based on the position and the orientation by smoothing the amount of temporal changes, and controls the display aspect by generating and outputting the virtual viewpoint image with reference to the adjustment position and the adjustment orientation.

A fourth aspect of the technique of the present disclosure is the image processing apparatus according to the third aspect in which the processor smooths the amount of temporal changes by obtaining a moving average of an amount of time-series changes in the position and the orientation.

A fifth aspect of the technique of the present disclosure is the image processing according to any one of the first aspect to the fourth aspect in which the processor controls the display aspect of the virtual viewpoint image according to the amount of temporal changes in a case where the amount of temporal changes is within a predetermined range.

A sixth aspect of the technique of the present disclosure is the image processing apparatus according to any one of the first aspect to the fifth aspect in which the processor changes a time interval for generating the virtual viewpoint image according to the amount of temporal changes.

A seventh aspect according to the technique of the present disclosure is the image processing apparatus according to the sixth aspect in which, in a case where the amount of temporal changes is equal to or more than a first predetermined value, the processor sets the time interval to be shorter than a first reference time interval.

An eighth aspect according to the technique of the present disclosure is the image processing apparatus according to the seventh aspect in which, in a case where the amount of temporal changes is less than the first predetermined value and the time interval is different from a second reference time interval, the processor sets the time interval to the second reference time interval.

A ninth aspect according to the technique of the present disclosure is the image processing apparatus according to the sixth aspect in which, in a case where the amount of temporal changes is equal to or less than the first predetermined value, the processor sets the time interval to be longer than a second reference time interval.

A tenth aspect according to the technique of the present disclosure is the image processing apparatus according to the ninth aspect in which, in a case where the amount of temporal changes exceeds the first predetermined value and the time interval is different from the second reference time interval, the processor sets the time interval to the second reference time interval.

An eleventh aspect according to the technique of the present disclosure is the image processing apparatus according to any one of the sixth aspect to the tenth aspect in which the processor further changes the time interval for generating the virtual viewpoint image according to an instruction received by a reception device.

A twelfth aspect according to the technique of the present disclosure is the image processing apparatus according to the eleventh aspect in which the instruction is an instruction related to a display speed of the virtual viewpoint image.

A thirteenth aspect according to the technique of the present disclosure is the image processing apparatus according to the twelfth aspect in which, in a case where the instruction is an instruction for setting the display speed to be lower than a first reference display speed, the processor sets the time interval to be shorter than a third reference time interval.

A fourteenth aspect according to the technique of the present disclosure is the image processing apparatus according to the twelfth aspect or the thirteenth aspect in which, in a case where the instruction is an instruction for setting the display speed to be higher than a second reference display speed, the processor sets the time interval to be longer than a fourth reference time interval.

A fifteenth aspect according to the technique of the present disclosure is the image processing apparatus according to any one of the first aspect to the fourteenth aspect in which a display region of the virtual viewpoint image is divided into a facing region facing the orientation and a peripheral region surrounding the facing region, and the processor sets a resolution of the peripheral region to be lower than a resolution of the facing region.

A sixteenth aspect according to the technique of the present disclosure is the image processing apparatus according to the fifteenth aspect in which the processor reduces the resolution of the peripheral region as a distance from the facing region increases.

A seventeenth aspect according to the technique of the present disclosure is the image processing apparatus according to any one of the first aspect to the sixteenth aspect in which the processor generates and outputs information indicating a positional relationship between a display image and the virtual viewpoint image, the display image being different from the virtual viewpoint image and showing at least a part of the imaging region, on the basis of a deviation between an imaging direction for obtaining the display image and the orientation.

An eighteenth aspect according to the technique of the present disclosure is the image processing apparatus according to the seventeenth aspect in which the information indicating the positional relationship is information that is visually recognized by a viewer of the virtual viewpoint image.

A nineteenth aspect according to the technique of the present disclosure is the image processing apparatus according to the eighteenth aspect in which the information indicating the positional relationship is an arrow indicating a direction from a position of the display image to a position of the virtual viewpoint image.

A twentieth aspect of the technique of the present disclosure is the image processing according to the nineteenth aspect in which the processor expands and contracts a length of the arrow according to a distance between the position of the display image and the position of the virtual viewpoint image.

A twenty-first aspect according to the technique of the present disclosure is the image processing apparatus according to any one of the seventeenth aspect to the twentieth aspect in which the information indicating the positional relationship is information including at least one of information that is tactilely recognized by a viewer of the virtual viewpoint image or information that is audibly recognized by the viewer.

A twenty-second aspect according to the technique of the present disclosure is the image processing apparatus according to any one of the seventeenth aspect to the twenty-first aspect in which the processor performs control of switching an image to be displayed on a display from the display image to the virtual viewpoint image on condition that an instruction for switching from the display image to the virtual viewpoint image is given in a state in which the display image is displayed on the display.

A twenty-third aspect according to the technique of the present disclosure is the image processing apparatus according to any one of the first aspect to the twenty-second aspect in which the processor generates and outputs a display screen in which the virtual viewpoint images are arranged in a time series.

A twenty-fourth aspect according to the technique of the present disclosure is the image processing apparatus according to any one of the first aspect to the twenty-third aspect in which the target object is a specific person, the position is a viewpoint position of the person, and the orientation is a line-of-sight direction of the person.

A twenty-fifth aspect according to the technique of the present disclosure is an image processing method including generating and outputting a virtual viewpoint image with reference to a position and an orientation of a target object included in an imaging region on the basis of a plurality of images obtained by imaging the imaging region with a plurality of imaging devices of which at least either of imaging positions or imaging directions are different; and controlling a display aspect of the virtual viewpoint image according to an amount of temporal changes in at least one of the position or the orientation.

A twenty-sixth aspect according to the technique of the present disclosure is a program causing a computer to execute processing including generating and outputting a virtual viewpoint image with reference to a position and an orientation of a target object included in an imaging region on the basis of a plurality of images obtained by imaging the imaging region with a plurality of imaging devices of which at least either of imaging positions or imaging directions are different; and controlling a display aspect of the virtual viewpoint image according to an amount of temporal changes in at least one of the position or the orientation.

BRIEF DESCRIPTION OF THE DRAWINGS

Exemplary embodiments of the technology of the disclosure will be described in detail based on the following figures, wherein.

DETAILED DESCRIPTION

An example of an image processing apparatus, an image processing method, and a program according to embodiments of the technique of the present disclosure will be described with reference to the accompanying drawings.

First, the technical terms used in the following description will be described.

CPU stands for "Central Processing Unit". RAM stands for "Random Access Memory". SSD stands for "Solid State Drive". HDD stands for "Hard Disk Drive". EEPROM stands for "Electrically Erasable and Programmable Read Only Memory". I/F stands for "Interface". IC stands for "Integrated Circuit". ASIC stands for "Application Specific Integrated Circuit". PLD stands for "Programmable Logic Device". FPGA stands for "Field-Programmable Gate Array". SoC stands for "System-on-a-chip". CMOS stands for "Complementary Metal Oxide Semiconductor". CCD stands for "Charge Coupled Device". EL stands for "Electro-Luminescence". GPU stands for "Graphics Processing Unit". WAN stands for "Wide Area Network". LAN stands for "Local Area Network". 3D stands for "3 Dimensions". USB stands for "Universal Serial Bus". 5G stands for "5th Generation". LTE stands for "Long Term Evolution". WiFi stands for "Wireless Fidelity". RTC stands for "Real Time Clock". FIFO stands for "First In First Out". SNTP stands for "Simple Network Time Protocol". NTP stands for "Network Time Protocol". GPS stands for "Global Positioning System". Exif stands for "Exchangeable image file format for digital still cameras". GNSS stands for "Global Navigation Satellite System". In the following description, for convenience of description, a CPU is exemplified as an example of a "processor" according to the technique of the present disclosure, but the "processor" according to the technique of the present disclosure may be a combination of a plurality of processing devices such as a CPU and a GPU. In a case where a combination of a CPU and a GPU is applied as an example of the "processor" according to the technique of the present disclosure, the GPU operates under the control of the CPU and executes image processing.

In the following description, the term "match" refers to, in addition to perfect match, a meaning including an error generally allowed in the technical field to which the technique of the present disclosure belongs (a meaning including an error to the extent that the error does not contradict the concept of the technique of the present disclosure).

First Embodiment

Figure 1:
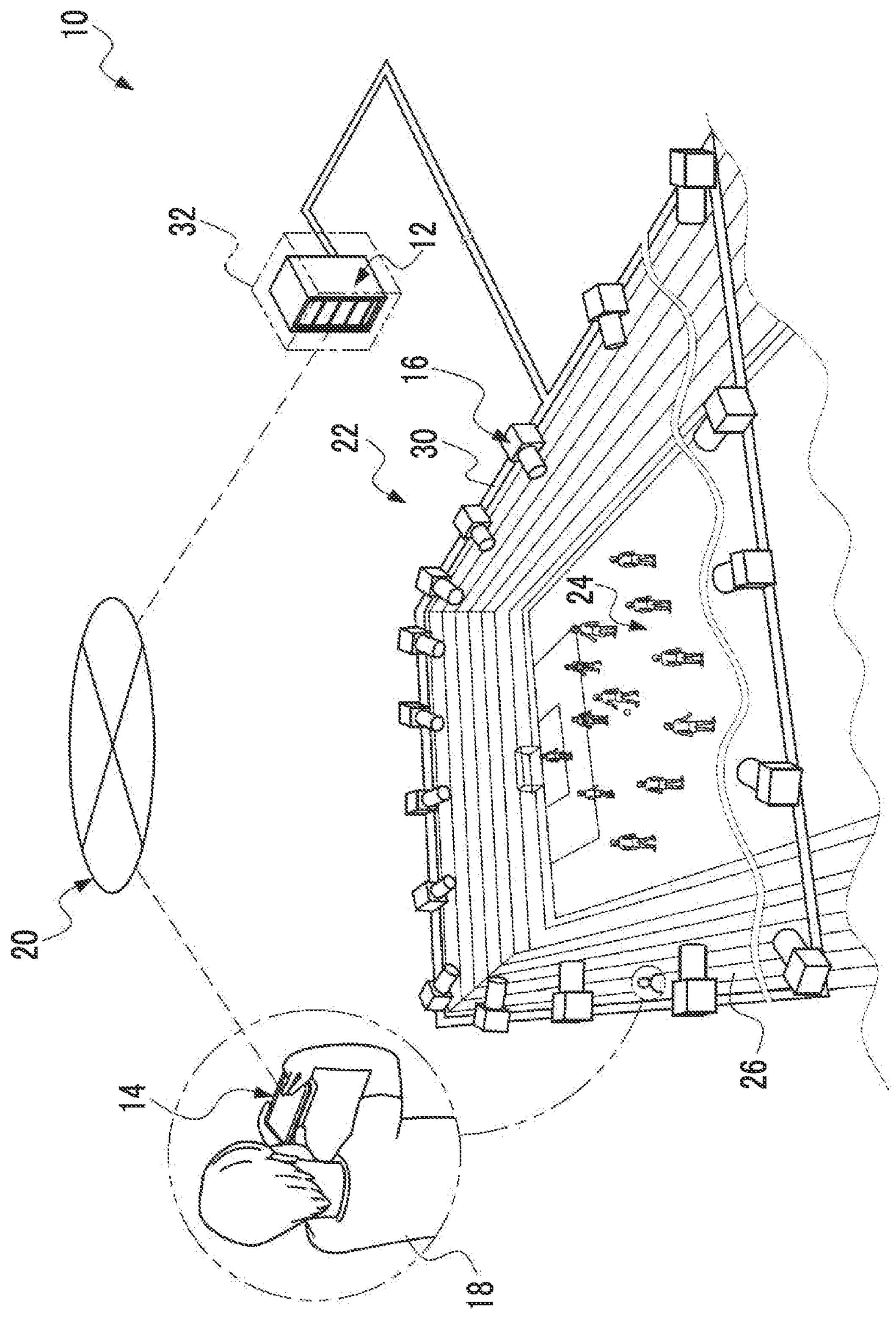
FIG. 1 is a schematic perspective view showing an example of an external configuration of an image processing system according to first and second embodiments.

As an example, as shown in FIG. 1, an image processing system 10 includes an image processing apparatus 12, a user device 14, and a plurality of imaging devices 16. The user device 14 is used by the user 18.

In the first embodiment, a smartphone is applied as an example of the user device 14. However, the smartphone is only an example, and may be, for example, a personal computer, a tablet terminal, or a portable multifunctional terminal such as a head-mounted display. In the first embodiment, a server is applied as an example of the image processing apparatus 12. The number of servers may be one or a plurality. The server is only an example, and may be, for example, at least one personal computer, or may be a combination of at least one server and at least one personal computer. As described above, the image processing apparatus 12 may be at least one device capable of executing image processing.

A network 20 includes, for example, a WAN and/or a LAN. In the example shown in FIG. 1, although not shown, the network 20 includes, for example, a base station. The number of base stations is not limited to one, and there may be a plurality of base stations. The communication standards used in the base station include wireless communication standards such as 5G standard, LTE standard, WiFi (802.11) standard, and Bluetooth (registered trademark) standard. The network 20 establishes communication between the image processing apparatus 12 and the user device 14, and transmits and receives various types of information between the image processing apparatus 12 and the user device 14. The image processing apparatus 12 receives a request from the user device 14 via the network 20 and provides a service corresponding to the request to the user device 14 that is a request source via the network 20.

In the first embodiment, a wireless communication method is applied as an example of a communication method between the user device 14 and the network 20 and a communication method between the image processing apparatus 12 and the network 20, but this is only an example, and a wired communication method may be used.

The imaging device 16 is an imaging device having a CMOS image sensor, and has an optical zoom function and/or a digital zoom function. Instead of the CMOS image sensor, another type of image sensor such as a CCD image sensor may be applied.

The plurality of imaging devices 16 are installed in a soccer stadium 22. The plurality of imaging devices 16 have different imaging positions and imaging directions. In the example shown in FIG. 1, each of the plurality of imaging devices 16 is disposed to surround a soccer field 24, and a region including the soccer field 24 is imaged as an imaging region. The imaging by the imaging device 16 refers to, for example, imaging at an angle of view including an imaging region.

Here, a form example in which each of the plurality of imaging devices 16 is disposed to surround the soccer field 24 is described, but the technique of the present disclosure is not limited to this, and for example, the plurality of imaging devices 16 may be disposed to surround the entire soccer field 24, or the plurality of imaging devices 16 may be disposed to surround a specific part of the soccer field 24. Positions and/or orientations of the plurality of imaging devices 16 can be changed, and it is determined to be generated according to a virtual viewpoint image requested by the user 18 or the like. Although not shown, at least one imaging device 16 may be installed in an unmanned aerial vehicle (for example, a multi-rotorcraft unmanned aerial vehicle), and a bird's-eye view of a region including the soccer field 24 as an imaging region may be imaged from the sky.

The image processing apparatus 12 is installed in a control room 32. The plurality of imaging devices 16 and the image processing apparatus 12 are connected via a LAN cable 30, and the image processing apparatus 12 controls the plurality of imaging devices 16 and acquires an image obtained through imaging in each of the plurality of imaging devices 16. Although the connection using the wired communication method by the LAN cable 30 is exemplified here, the connection is not limited to this, and the connection using a wireless communication method may be used.

The soccer stadium 22 is provided with spectator seats 26 to surround the soccer field 24, and the user 18 is seated in the spectator seat 26. The user 18 possesses the user device 14, and the user device 14 is used by the user 18. Here, a form example in which the user 18 is present in the soccer stadium 22 is described, but the technique of the present disclosure is not limited to this, and the user 18 may be present outside the soccer stadium 22.

Figure 2:
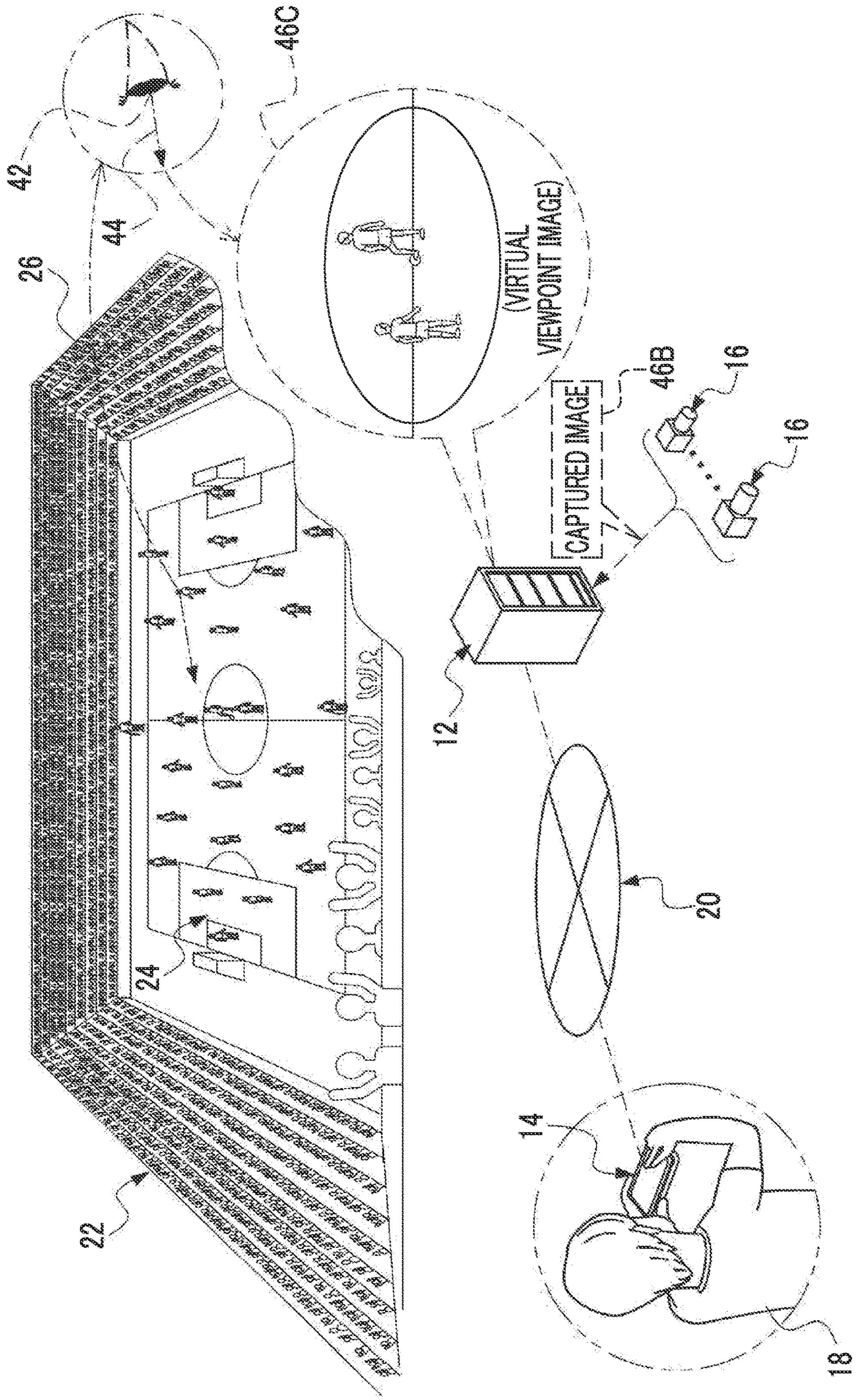
FIG. 2 is a conceptual diagram showing an example of a virtual viewpoint image generated by the image processing system according to the first and second embodiments.

As an example, as shown in FIG. 2, the image processing apparatus 12 acquires a captured image 46B showing an imaging region in a case where the imaging region is observed from each position of the plurality of imaging devices 16, from each of the plurality of imaging devices 16. The captured image 46B is a motion picture obtained by each of the plurality of imaging devices 16 imaging the imaging region. Although the case where the captured image 46B is a motion picture is exemplified here, the captured image 46B is not limited to this, and may be a still image showing the imaging region in a case where the imaging region is observed from each position of the plurality of imaging devices 16.

The image processing apparatus 12 generates a motion picture using 3D polygons by combining a plurality of captured images 46B obtained by the plurality of imaging devices 16 imaging the imaging region. The image processing apparatus 12 generates a virtual viewpoint image 46C showing an observation region in a case where the imaging region is observed from any position and any direction on the basis of the generated motion picture using 3D polygons. Here, the virtual viewpoint image 46C is a motion picture. However, this is only an example and may be a still image.

The image processing apparatus 12 stores, for example, the captured images 46B for a predetermined time (for example, several hours to several tens of hours). Therefore, for example, the image processing apparatus 12 acquires the captured image 46B at a designated imaging time point from the captured images 46B for the predetermined time, and generates the virtual viewpoint image 46C by using the acquired captured images 46B.

Here, the captured image 46B is an image obtained by being captured by the imaging device 16 which is a physical camera, whereas the virtual viewpoint image 46C is considered to be an image obtained by a virtual imaging device, that is, a virtual camera imaging the imaging region from any position and any direction. A position and an orientation of the virtual camera can be changed. The position of the virtual camera is a viewpoint position 42. The orientation of the virtual camera is a line-of-sight direction 44. Here, the viewpoint position means, for example, a position of a viewpoint of a virtual person, and the line-of-sight direction means, for example, a direction of the line of sight of the virtual person. That is, in the present embodiment, the virtual camera is used for convenience of description, but it is not essential to use the virtual camera. "Installing a virtual camera" means determining a viewpoint position, a line-of-sight direction, or an angle of view for generating the virtual viewpoint image 46C. Therefore, for example, the present invention is not limited to an aspect in which an object such as a virtual camera is installed in the imaging region on a computer, and another method such as designating coordinates or a direction of a viewpoint position numerically may be used. "Imaging with a virtual camera" means generating the virtual viewpoint image 46C corresponding to a case where the imaging region is viewed from a position and a direction in which the "virtual camera is installed". In the following description, for convenience of the description, the position of the virtual camera will also be referred to as a "virtual camera position", and the orientation of the virtual camera will also be referred to as a "virtual camera orientation".

In the example shown in FIG. 2, as an example, the virtual viewpoint image 46C is a virtual viewpoint image showing the imaging region in a case where the imaging region is observed from the viewpoint position 42 and the line-of-sight direction 44 in the spectator seat 26, that is, a virtual camera position and a virtual camera orientation in the spectator seat 26. The virtual camera position and virtual camera orientation are not fixed. That is, the virtual camera position and the virtual camera orientation can be changed according to an instruction from the user 18 or the like. For example, the image processing apparatus 12 may set a position of a person designated as a target subject (hereinafter, also referred to as a "target person") among soccer players, referees, and the like in the soccer field 24 as a virtual camera position, and set a line-of-sight direction of the target person as a virtual camera orientation.

Figure 3:
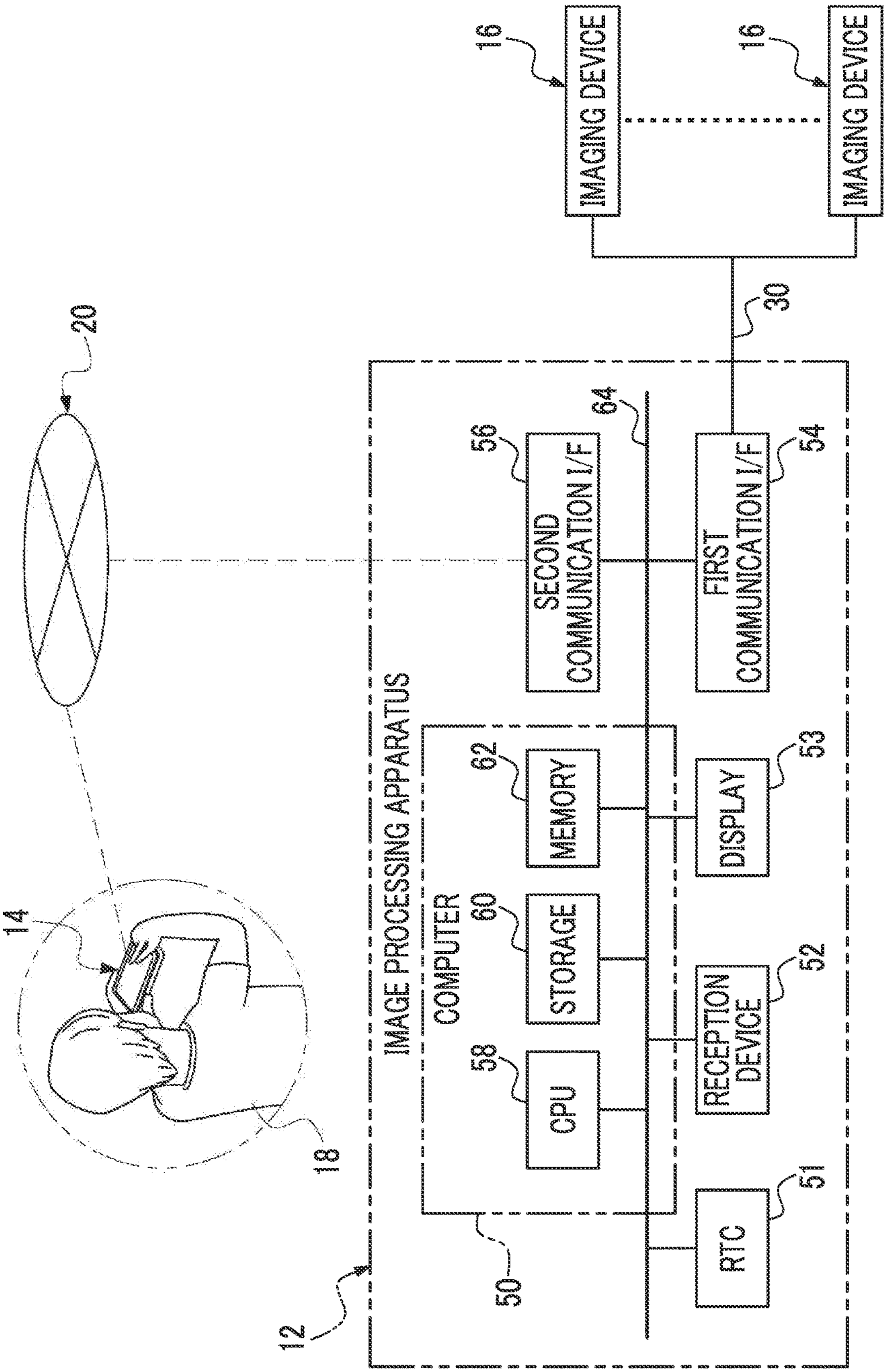
FIG. 3 is a block diagram showing an example of a hardware configuration of an electrical system of an image processing apparatus according to the first and second embodiments.

As an example, as shown in FIG. 3, the image processing apparatus 12 includes a computer 50, an RTC 51, a reception device 52, a display 53, a first communication I/F 54, and a second communication I/F 56. The computer 50 includes a CPU 58, a storage 60, and a memory 62. The CPU 58 is an example of a "processor" according to the technique of the present disclosure, and the memory 62 is an example of a "memory" according to the technique of the present disclosure.

The CPU 58, the storage 60, and the memory 62 are connected via a bus 64. In the example shown in FIG. 3, one bus is shown as the bus 64 for convenience of illustration, but a plurality of buses may be used. The bus 64 may include a serial bus or a parallel bus configured with a data bus, an address bus, a control bus, and the like.

The CPU 58 controls the entire image processing apparatus 12. The storage 60 stores various parameters and various programs. The storage 60 is a non-volatile storage device. Here, an EEPROM is applied as an example of the storage 60. However, this is only an example, and an SSD, an HDD, or the like may be used. The memory 62 is a storage device. Various types of information is temporarily stored in the memory 62. The memory 62 is used as a work memory by the CPU 58. Here, a RAM is applied as an example of the memory 62. However, this is only an example, and other types of storage devices may be used.

The RTC 51 receives drive power from a power supply system disconnected from a power supply system for the computer 50, and continues to count the current time (for example, year, month, day, hour, minute, second) even in a case where the computer 50 is shut down. The RTC 51 outputs the current time point to the CPU 58 each time point the current time is updated. Here, a form example in which the CPU 58 acquires the current time from the RTC 51 is described, but the technique of the present disclosure is not limited to this. For example, the CPU 58 may acquire the current time provided from an external device (not shown) via the network 20 (for example, by using an SNTP and/or an NTP), or may acquire the current time from a GNSS device (for example, a GPS device) built in or connected to the computer 50.

The reception device 52 receives an instruction from a user or the like of the image processing apparatus 12. Examples of the reception device 52 include a touch panel, hard keys, and a mouse. The reception device 52 is connected to the bus 64 or the like, and the instruction received by the reception device 52 is acquired by the CPU 58.

The display 53 is connected to the bus 64 and displays various types of information under the control of the CPU 58. An example of the display 53 is a liquid crystal display. In addition to the liquid crystal display, another type of display such as an EL display (for example, an organic EL display or an inorganic EL display) may be employed as the display 53.

The first communication I/F 54 is connected to the LAN cable 30. The first communication I/F 54 is realized by, for example, a device having an FPGA. The first communication I/F 54 is connected to the bus 64 and controls the exchange of various types of information between the CPU 58 and the plurality of imaging devices 16. For example, the first communication I/F 54 controls the plurality of imaging devices 16 according to a request from the CPU 58. The first communication I/F 54 acquires the captured image 46B (refer to FIG. 2) obtained by being captured by each of the plurality of imaging devices 16, and outputs the acquired captured image 46B to the CPU 58. The first communication I/F 54 is exemplified as a wired communication I/F here, but may be a wireless communication I/F such as a high-speed wireless LAN.

The second communication I/F 56 is wirelessly communicatively connected to the network 20. The second communication I/F 56 is realized by, for example, a device having an FPGA. The second communication I/F 56 is connected to the bus 64. The second communication I/F 56 controls the exchange of various types of information between the CPU 58 and the user device 14 in a wireless communication method via the network 20.

At least one of the first communication I/F 54 or the second communication I/F 56 may be configured with a fixed circuit instead of the FPGA. At least one of the first communication I/F 54 or the second communication I/F 56 may be a circuit configured with an ASIC, an FPGA, and/or a PLD.

Figure 4:
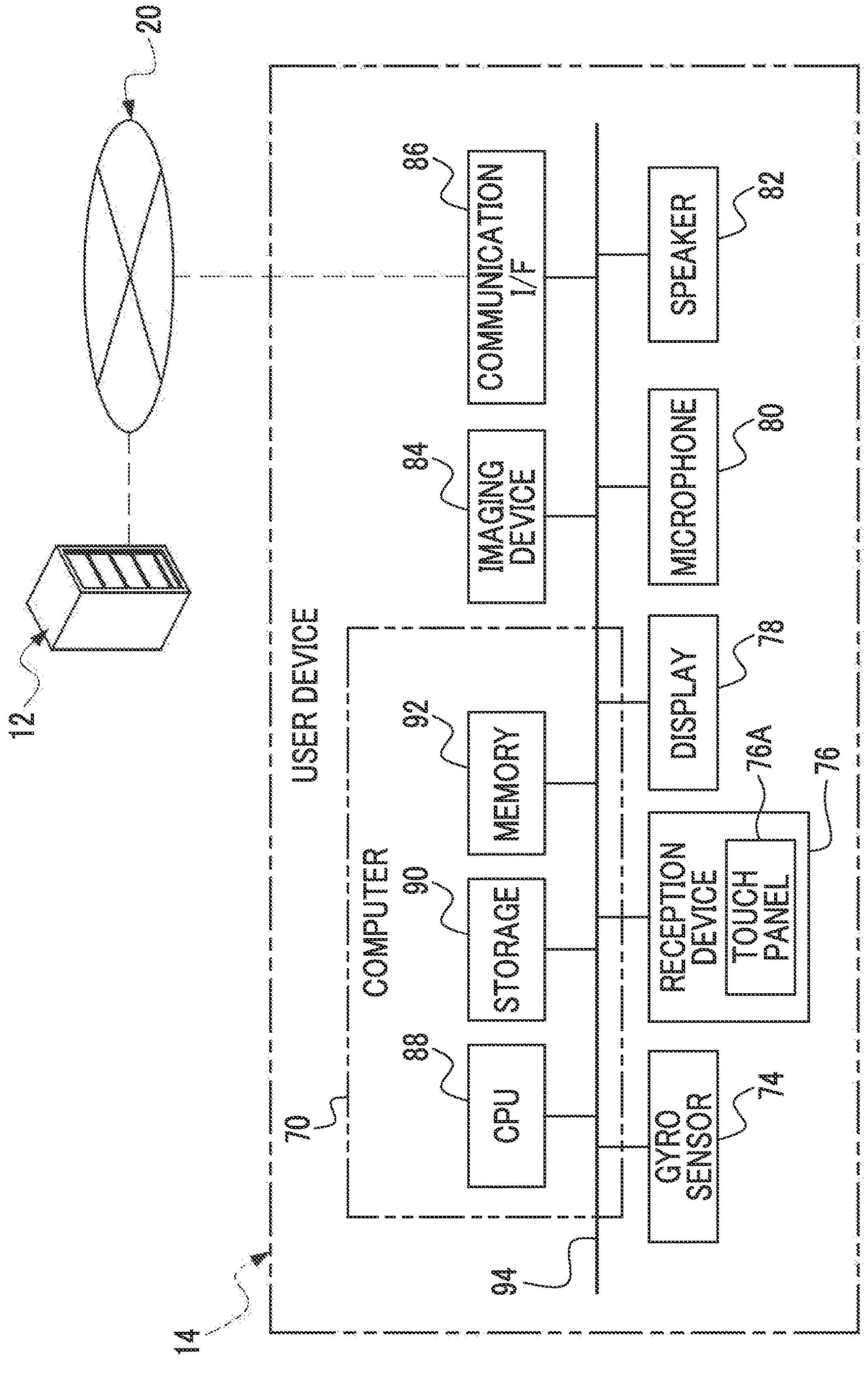
FIG. 4 is a block diagram showing an example of a hardware configuration of an electrical system of a user device according to the first and second embodiments.

As an example, as shown in FIG. 4, the user device 14 includes a computer 70, a gyro sensor 74, a reception device

76, a display 78, a microphone 80, a speaker 82, an imaging device 84, and a communication I/F 86. The computer 70 includes a CPU 88, a storage 90, and a memory 92, and the CPU 88, the storage 90, and the memory 92 are connected via a bus 94. In the example shown in FIG. 4, one bus is shown as the bus 94 for convenience of illustration, but the bus 94 may be configured with a serial bus, or may be configured to include a data bus, an address bus, a control bus, and the like.

The CPU 88 controls the entire user device 14. The storage 90 stores various parameters and various programs. The storage 90 is a non-volatile storage device. Here, an EEPROM is applied as an example of the storage 90. However, this is only an example, and an SSD, an HDD, or the like may be used. Various types of information are temporarily stored in the memory 92, and the memory 92 is used as a work memory by the CPU 88. Here, a RAM is applied as an example of the memory 92. However, this is only an example, and other types of storage devices may be used.

The gyro sensor 74 measures an angle about the yaw axis of the user device 14 (hereinafter, also referred to as a "yaw angle"), an angle about the roll axis of the user device 14 (hereinafter, also referred to as a "roll angle"), and an angle about the pitch axis of the user device 14 (hereinafter, also referred to as a "pitch angle"). The gyro sensor 74 is connected to the bus 94, and angle information indicating the yaw angle, the roll angle, and the pitch angle measured by the gyro sensor 74 is acquired by the CPU 88 via the bus 94 or the like.

The reception device 76 is an example of a "reception device" according to the technique of the present disclosure, and receives an instruction from the user 18 (refer to FIGS. 1 and 2). Examples of the reception device 76 include a touch panel 76A and a hard key. The reception device 76 is connected to the bus 94, and the instruction received by the reception device 76 is acquired by the CPU 88.

The display 78 is connected to the bus 94 and displays various types of information under the control of the CPU 88. An example of the display 78 is a liquid crystal display. In addition to the liquid crystal display, another type of display such as an EL display (for example, an organic EL display or an inorganic EL display) may be employed as the display 78.

The user device 14 includes a touch panel display, and the touch panel display is implemented by the touch panel 76A and the display 78. That is, the touch panel display is formed by overlapping the touch panel 76A on a display region of the display 78, or by incorporating a touch panel function ("in-cell" type) inside the display 78. The "in-cell" type touch panel display is only an example, and an "out-cell" type or "on-cell" type touch panel display may be used.

The microphone 80 converts collected sound into an electrical signal. The microphone 80 is connected to the bus 94. The electrical signal obtained by converting the sound collected by the microphone 80 is acquired by the CPU 88 via the bus 94.

The speaker 82 converts an electrical signal into sound. The speaker 82 is connected to the bus 94. The speaker 82 receives the electrical signal output from the CPU 88 via the bus 94, converts the received electrical signal into sound, and outputs the sound obtained by converting the electrical signal to the outside of the user device 14.

The imaging device 84 acquires an image showing the subject by imaging the subject. The imaging device 84 is connected to the bus 94. The image obtained by imaging the subject in the imaging device 84 is acquired by the CPU 88 via the bus 94. The image obtained by being captured by the imaging device 84 may also be used to generate the virtual viewpoint image 46C.

The communication I/F 86 is wirelessly communicatively connected to the network 20. The communication I/F 86 is realized by, for example, a device configured with circuits (for example, an ASIC, an FPGA, and/or a PLD). The communication I/F 86 is connected to the bus 94. The communication I/F 86 controls the exchange of various types of information between the CPU 88 and an external device in a wireless communication method via the network 20. Here, examples of the "external device" include the image processing apparatus 12.

Figure 5:
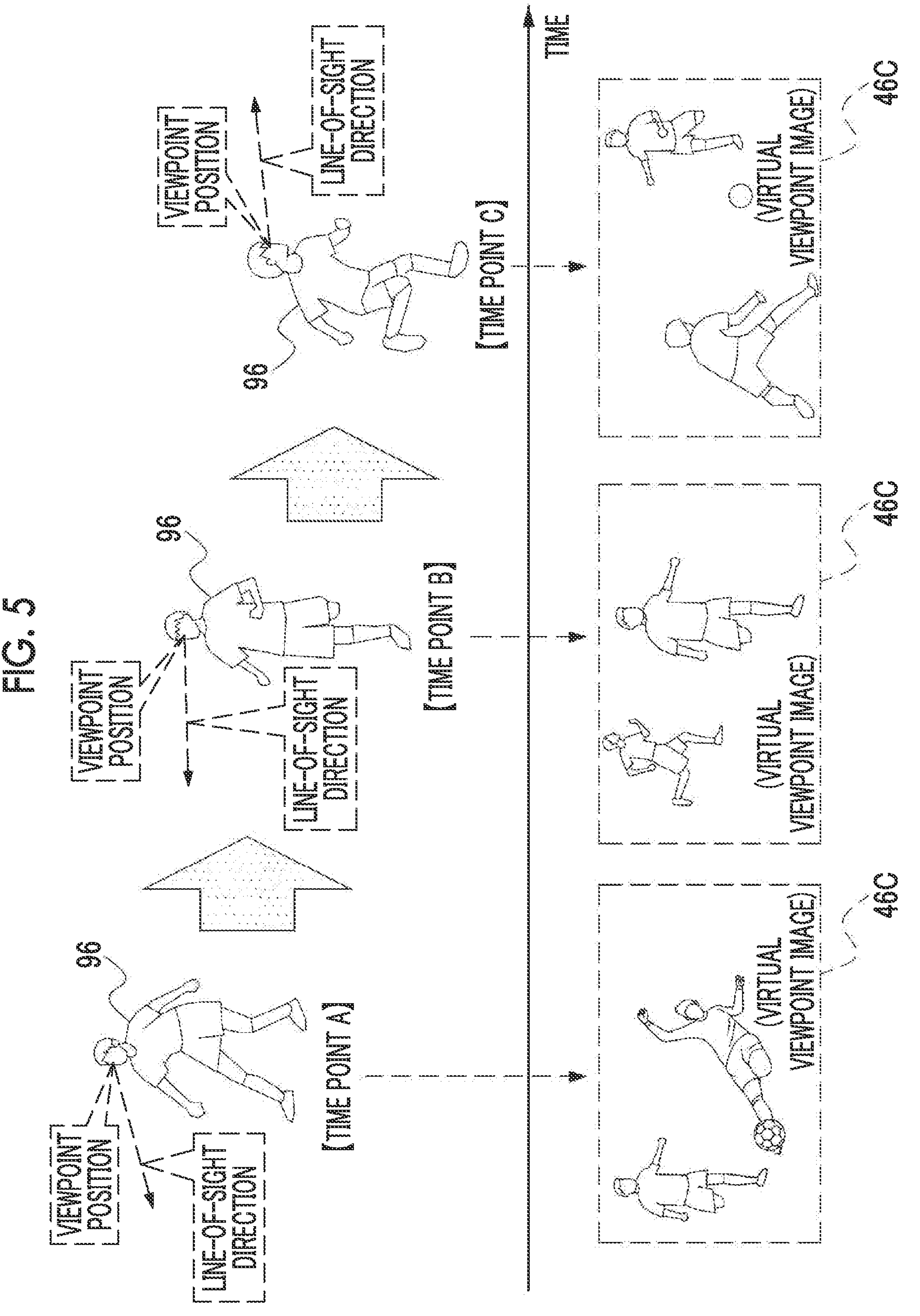
FIG. 5 is a conceptual diagram showing an example of an aspect of temporal changes in a viewpoint position and a line-of-sight direction of a target person, and an example of an aspect of temporal changes in a virtual viewpoint image.

As an example, as shown in FIG. 5, a viewpoint position and a line-of-sight direction of the target person 96 in the soccer field 24 (refer to FIGS. 1 and 2) change. The target person 96 is an example of a "target object" and a "specific person" according to the technique of the present disclosure. In the example shown in FIG. 5, a viewpoint position and a line-of-sight direction of the target person 96 at time point A, a viewpoint position and a line-of-sight direction of the target person 96 at time point B, and a viewpoint position and a line-of-sight direction of the target person 96 at time point C are shown. In the example shown in FIG. 5, the virtual viewpoint image 46C generated by the image processing apparatus 12 with reference to the viewpoint position and the line-of-sight direction of the target person 96 at each time from time point A to time point B is shown.

Here, the virtual viewpoint image 46C generated with reference to the viewpoint position and the line-of-sight direction of the target person 96 is a virtual viewpoint image obtained by being captured by a virtual camera in a case where the viewpoint position of the target person 96 is set as a virtual camera position and the line-of-sight direction of the target person 96 is set as a virtual camera orientation. In other words, the virtual viewpoint image means a virtual viewpoint image showing a region observed by the target person 96 from the viewpoint position and the line-of-sight direction of the target person 96.

In the following description, for convenience of the description, the virtual viewpoint image 46C generated with reference to the viewpoint position and the line-of-sight direction of the target person 96 at time point A will be referred to as a "virtual viewpoint image 46C at time point A". The virtual viewpoint image 46C generated with reference to the viewpoint position and the line-of-sight direction of the target person 96 at time point B will be referred to as a "virtual viewpoint image 46C at time point B". The virtual viewpoint image 46C generated with reference to the viewpoint position and the line-of-sight direction of the target person 96 at time point C will be referred to as a "virtual viewpoint image 46C at time point C".

Incidentally, an amount of temporal changes in the viewpoint position and the line-of-sight direction (specifically, an absolute value of the amount of temporal changes) of the target person 96 from time point B to time point C is larger than an amount of temporal changes in the viewpoint position and the line-of-sight direction of the target person 96 from time point A to time point B. Thus, an amount of changes from the virtual viewpoint image 46C at time point B to the virtual viewpoint image 46C at time point C is also larger than an amount of changes from the virtual viewpoint image 46C at time point A to the virtual viewpoint image 46C at time point B. For example, in a case where the virtual viewpoint images 46C from time point A to time point C are sequentially displayed on the display 78 of the user device 14, the user 18 viewing the virtual viewpoint images 46C may feel visual discomfort (for example, sickness). It is conceivable that eye strain accumulates by continuously viewing such a virtual viewpoint image 46C.

Figure 6:
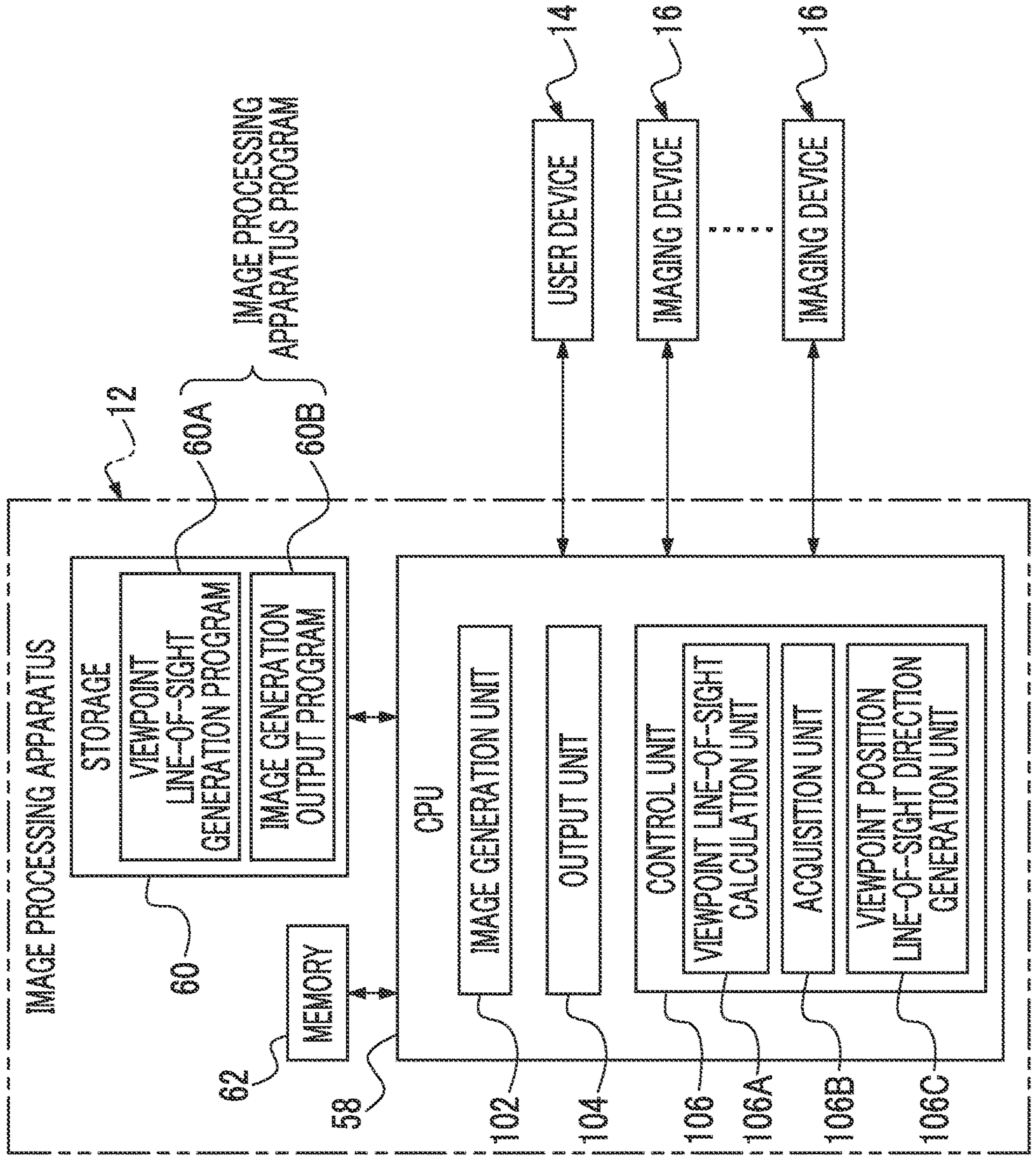
FIG. 6 is a block diagram showing an example of a main function of the image processing apparatus according to the first embodiment.

In view of such circumstances, as shown in FIG. 6 as an example, in the image processing apparatus 12, a viewpoint line-of-sight generation program 60A and an image generation output program 60B are stored in the storage 60. The CPU 58 executes a viewpoint line-of-sight generation process (refer to FIG. 13) that will be described later according to the viewpoint line-of-sight generation program 60A. The CPU 58 executes an image generation output process (refer to FIG. 14) that will be described later according to the image generation output program 60B. Hereinafter, in a case where it is not necessary to distinguish between the viewpoint line-of-sight generation program 60A and the image generation output program 60B, the programs will be referred to as an "image processing apparatus program" without reference numerals. Hereinafter, in a case where it is not necessary to distinguish between the viewpoint line-of-sight generation process and the image generation output process, the processes will be referred to as "image processing apparatus side processing" without reference numerals.

The CPU 58 reads the image processing apparatus program from the storage 60 and executes the image processing apparatus program on the memory 62 to operate as an image generation unit 102, an output unit 104, and a control unit 106. The control unit 106 includes a viewpoint line-of-sight calculation unit 106A, an acquisition unit 106B, and a viewpoint position line-of-sight direction generation unit 106C.

The image generation unit 102 generates the virtual viewpoint image 46C (refer to FIG. 5) with reference to a viewpoint position and a line-of-sight direction of the target person 96 (refer to FIG. 5) included in an imaging region on the basis of a plurality of captured images 46B obtained by the plurality of imaging devices 16 imaging the imaging region. The output unit 104 acquires the virtual viewpoint image 46C generated by the image generation unit 102 from the image generation unit 102 and outputs it to the user device 14.

The control unit 106 controls a display aspect of the virtual viewpoint image 46C (for example, a display aspect on the display 78 of the user device 14) according to an amount of temporal changes in the viewpoint position and the line-of-sight direction of the target person 96. For example, the control unit 106 controls a display aspect of the virtual viewpoint image 46C according to an amount of temporal changes smaller than an actual amount of temporal changes in the viewpoint position and the line-of-sight direction of the target person 96. In other words, the control unit 106 controls the display aspect of the virtual viewpoint image 46C by setting the amount of temporal changes in the viewpoint position and the line-of-sight direction of the target person 96 to be smaller than the actual amount of changes.

Figure 7:
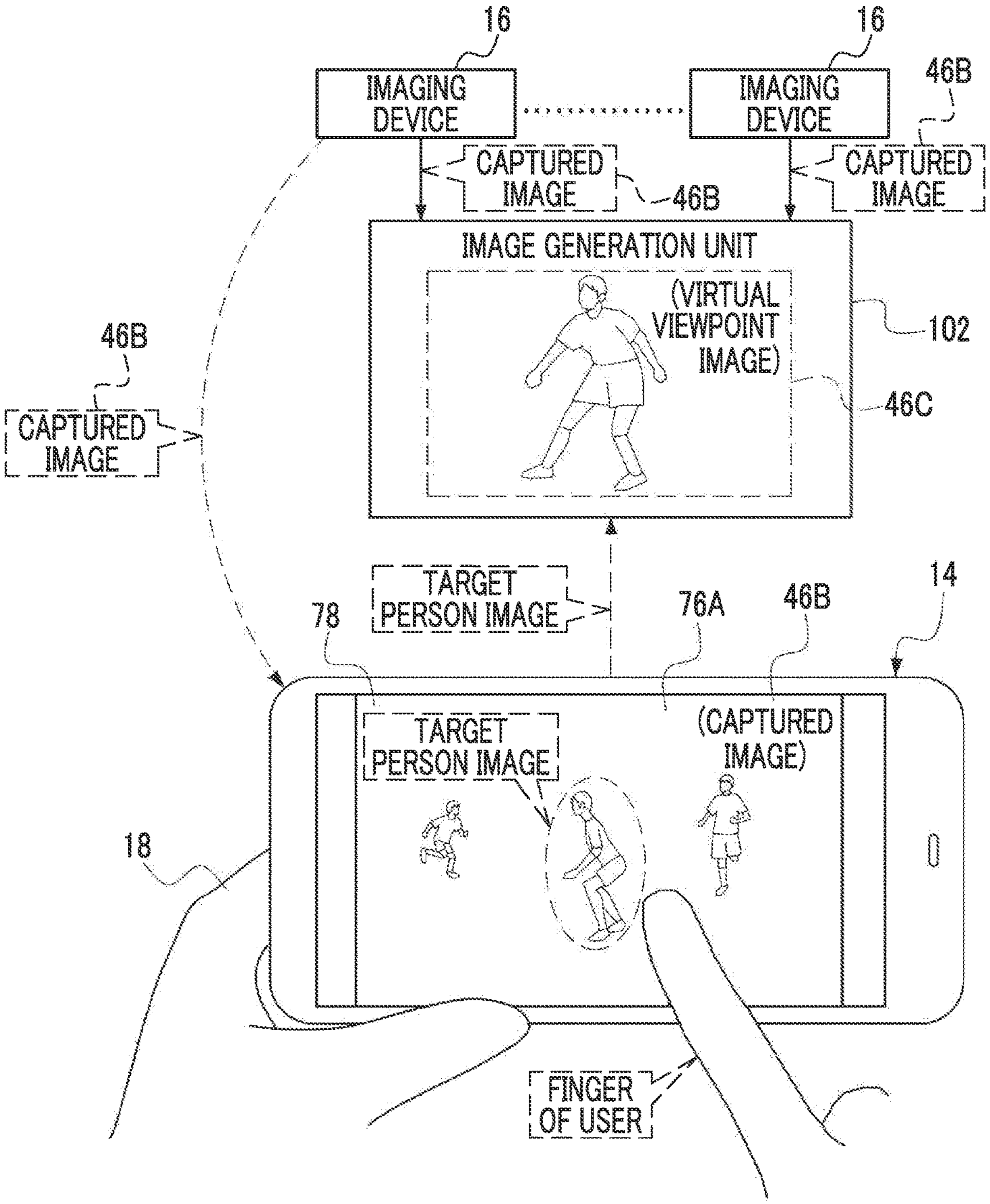
FIG. 7 is a conceptual diagram showing an example of processing details of an image generation unit according to the first embodiment.

As an example, as shown in FIG. 7, the captured image 46B obtained by imaging the imaging region with any one imaging device 16 among the plurality of imaging devices 16 is displayed on the display 78 of the user device 14. The user 18 designates a region in which the target person 96 is captured in the captured image 46B with the user's finger via the touch panel 76A. The user device 14 outputs the region designated by the user 18 to the image generation unit 102 as a target person image.

The image generation unit 102 acquires a plurality of captured images 46B (hereinafter, also referred to as a "captured image group") from the plurality of imaging devices 16. An imaging time point is assigned to each of the captured images 46B included in the captured image group. The imaging time point is, for example, attached to the captured image 46B in the Exif method. The image generation unit 102 performs image analysis (for example, image analysis using a cascade classifier and/or pattern matching) on the captured image group and the target person image input from the user device 14, to specify a plurality of captured images 46B in which the target person 96 is captured from the captured image group. The image generation unit 102 generates the virtual viewpoint image 46C showing the target person 96 on the basis of the plurality of captured images 46B in which the target person 96 is captured.

Figure 8:
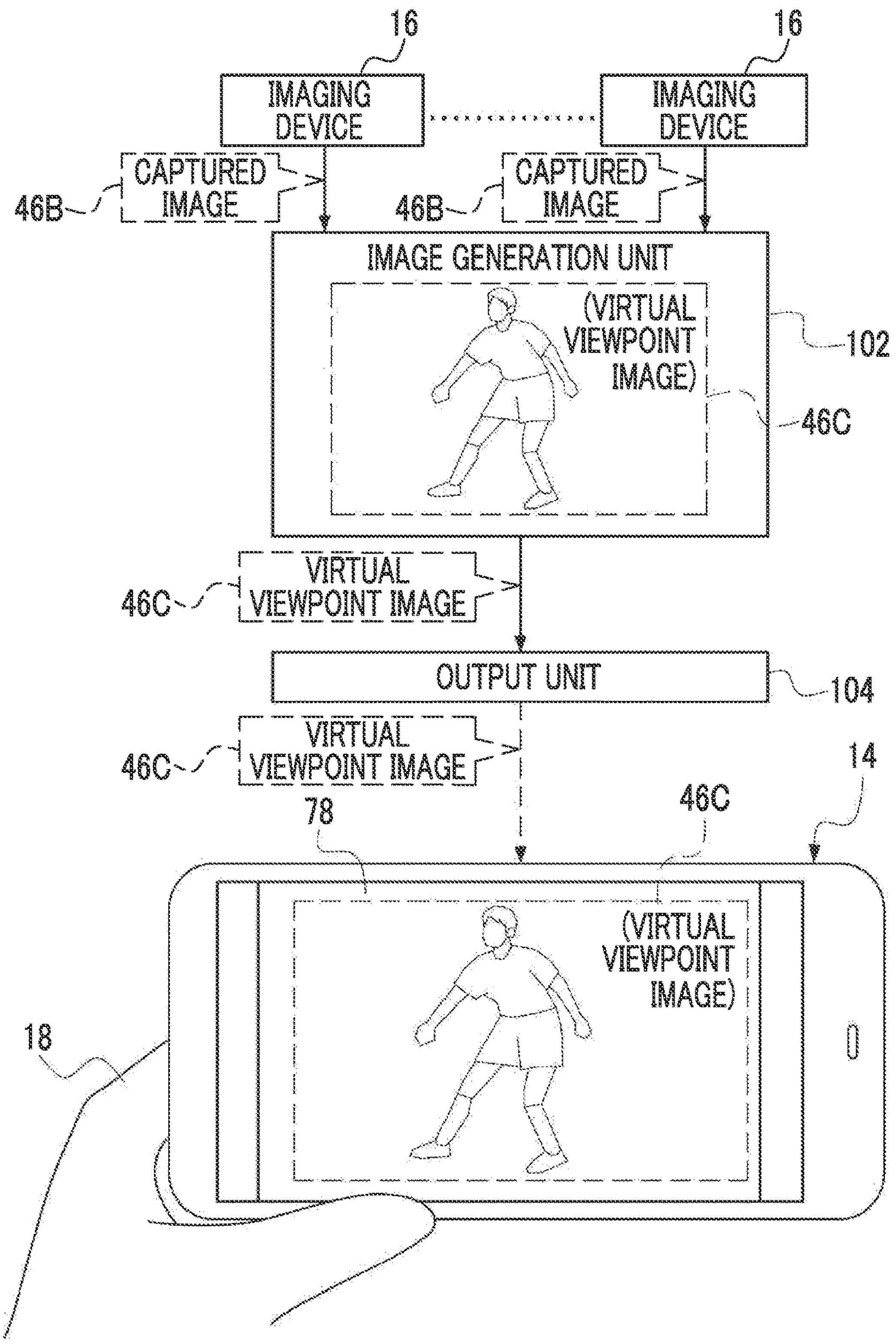
FIG. 8 is a conceptual diagram showing an example of processing details of the image generation unit and an output unit according to the first embodiment.

As an example, as shown in FIG. 8, the image generation unit 102 outputs the generated virtual viewpoint image 46C to the output unit 104. The output unit 104 outputs the virtual viewpoint image 46C input from the image generation unit 102 to the user device 14, and thus the virtual viewpoint image 46C is displayed on the display 78 of the user device 14.

Figure 9:
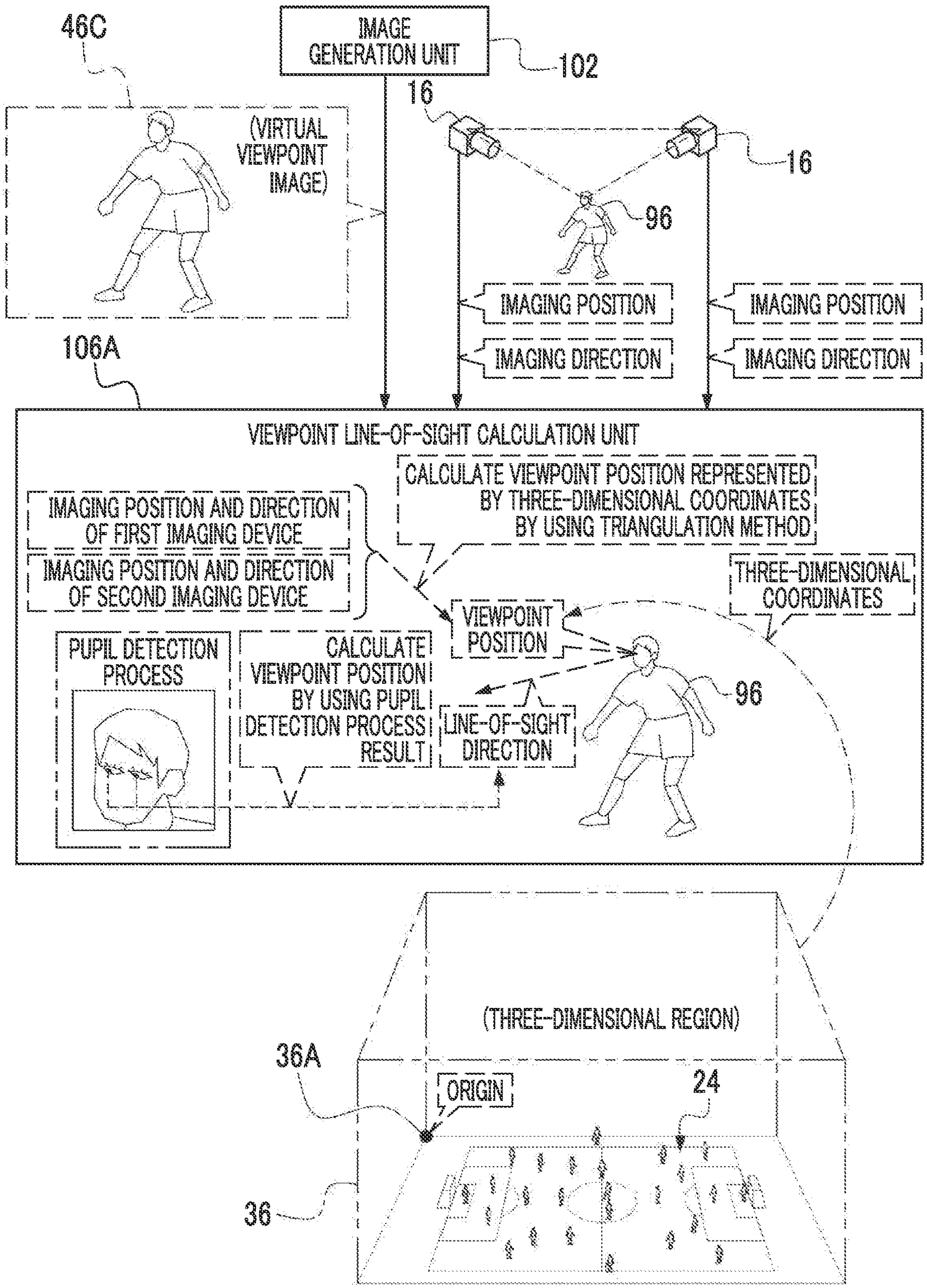
FIG. 9 is a conceptual diagram showing an example of processing details of the image generation unit and a viewpoint line-of-sight calculation unit according to the first embodiment.

As an example, as shown in FIG. 9, the imaging region imaged by the imaging device 16 is a three-dimensional region 36. The three-dimensional region 36 is formed in a rectangular cuboid shape with the soccer field 24 as a bottom surface. The three-dimensional region 36 is defined by three-dimensional coordinates having the origin 36A. In the example shown in FIG. 9, the origin 36A is set in one of the four corners of the soccer field 24. A height of the three-dimensional region 36 is determined according to, for example, an area of the soccer field 24. The height of the three-dimensional region 36 is defined within a predetermined range (several tens of meters in the example shown in FIG. 9). The "predetermined range" is a range allowed as a height at which the virtual camera can be set, and is uniquely determined according to, for example, a position, an orientation, and an angle of view of each of the plurality of imaging devices 16. A size and/or a shape of the three-dimensional region 36 may be changed according to a given condition or may be fixed.

The image generation unit 102 outputs the generated virtual viewpoint image 46C to the viewpoint line-of-sight calculation unit 106A. The viewpoint line-of-sight calculation unit 106A calculates a viewpoint position and a line-of-sight direction of the target person 96 on the basis of the virtual viewpoint image 46C input from the image generation unit 102. The image generation unit 102 uses a plurality of captured images 46B to generate the virtual viewpoint image 46C showing the target person 96. The viewpoint line-of-sight calculation unit 106A calculates the viewpoint position of the target person 96 by using a triangulation method on the basis of imaging positions and imaging directions of a first imaging device and a second imaging device among the plurality of imaging devices 16 used for imaging for obtaining the plurality of captured images 46B. The viewpoint position is represented by three-dimensional coordinates that can specify a position of the three-dimensional region 36.

The viewpoint line-of-sight calculation unit 106A executes a pupil detection process on the virtual viewpoint image 46C input from the image generation unit 102, to detect the pupils of the target person 96 shown by the virtual viewpoint image 46C input from the image generation unit 102. Since the pupil detection process is a well-known technique, the description thereof here will be omitted. The viewpoint line-of-sight calculation unit 106A calculates the line-of-sight direction of the target person 96 by using the result of detecting the pupils (pupil detection processing result). Specifically, two-dimensional coordinates that can specify a pan direction and a tilt direction are calculated from positions of the pupils in the eyes of the target person 96, and the calculated two-dimensional coordinates are used as the line-of-sight direction of the target person 96.

A method of calculating the line-of-sight direction of the target person 96 is not limited to this, and for example, an orientation of the face of the target person 96 shown by the virtual viewpoint image 46C may be used as the line-of-sight direction of the target person 96.

The acquisition unit 106B has a timer 106B1. The timer 106B1 measures a time interval Δt. The time interval Δt is a time interval for generating the virtual viewpoint image 46C, and is also a time interval at which the virtual viewpoint image 46C is output to an output destination (for example, the user device 14) and displayed on the display 78.

The acquisition unit 106B acquires the viewpoint position and the line-of-sight direction calculated by the viewpoint line-of-sight calculation unit 106A from the viewpoint line-of-sight calculation unit 106A. The acquisition unit 106B acquires the current time (hereinafter, also simply referred to as a "time point") t at the time at which the viewpoint position and the line-of-sight direction are first acquired from the viewpoint line-of-sight calculation unit 106A, from the RTC 51. Thereafter, the time point t is updated by adding the time interval Δt.

The acquisition unit 106B acquires new viewpoint position and line-of-sight direction from the viewpoint line-of-sight calculation unit 106A at every time interval Δt from the time at which the viewpoint position and the line-of-sight direction are first acquired from the viewpoint line-of-sight calculation unit 106A. Each time point the acquisition unit 106B acquires the new viewpoint position and line-of-sight direction from the viewpoint line-of-sight calculation unit 106A, the acquisition unit 106B adds the time interval Δt to the time point t at the time at which the viewpoint position and the line-of-sight direction are acquired one time before such that the time point t is updated. The acquisition unit 106B stores the viewpoint position and the line-of-sight direction in a first storage region 62A of the memory 62 as time-series data 108 at each time point t.

Figure 10:
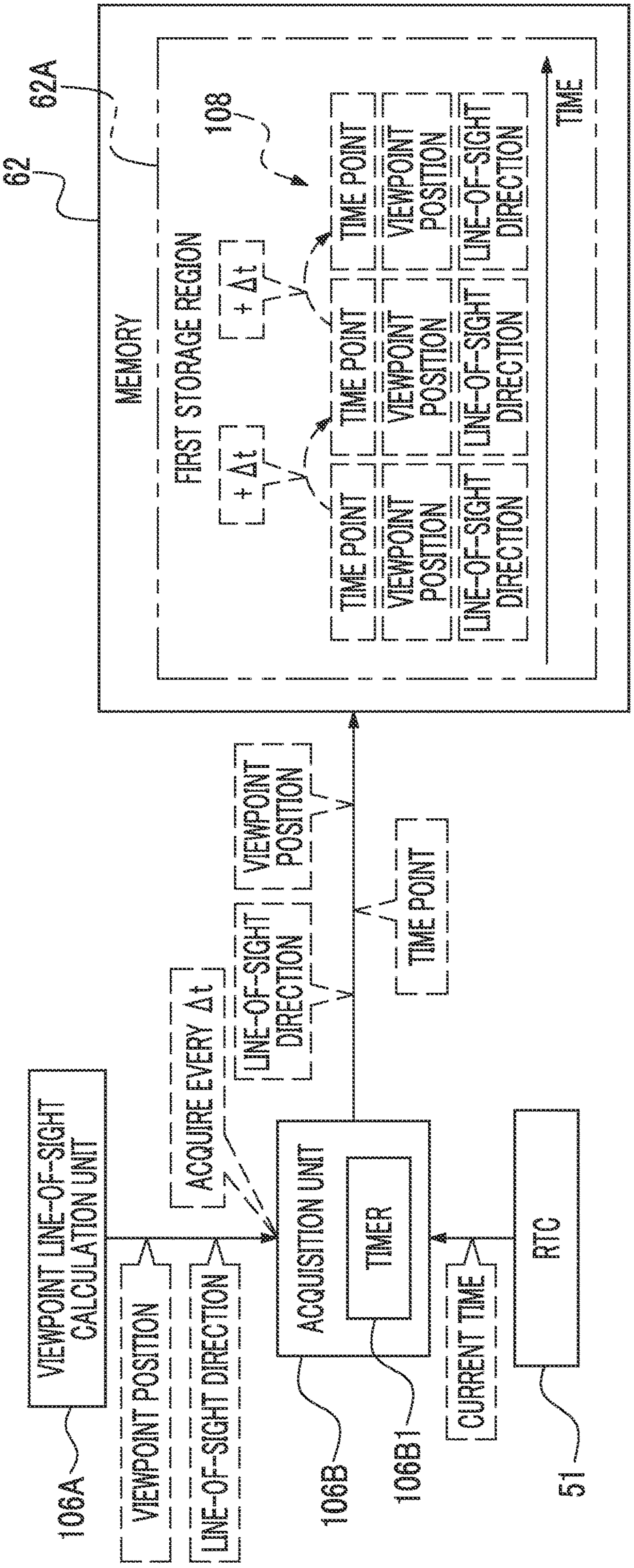
FIG. 10 is a conceptual diagram showing an example of processing details of the viewpoint line-of-sight calculation unit and an acquisition unit according to the first embodiment.

The time-series data 108 is data in which the time point t, the viewpoint position, and the line-of-sight direction are arranged in a time series. In an example shown in FIG. 10, the time point t, the viewpoint position, and the line-of-sight direction for the latest three times of acquisition of the viewpoint position and the line-of-sight direction by the acquisition unit 106B are shown as the time-series data 108. The time point t, the viewpoint position, and the line-of-sight direction are stored in the first storage region 62A in a FIFO method, and thus the time-series data 108 is updated every time interval Δt.

Figure 11:
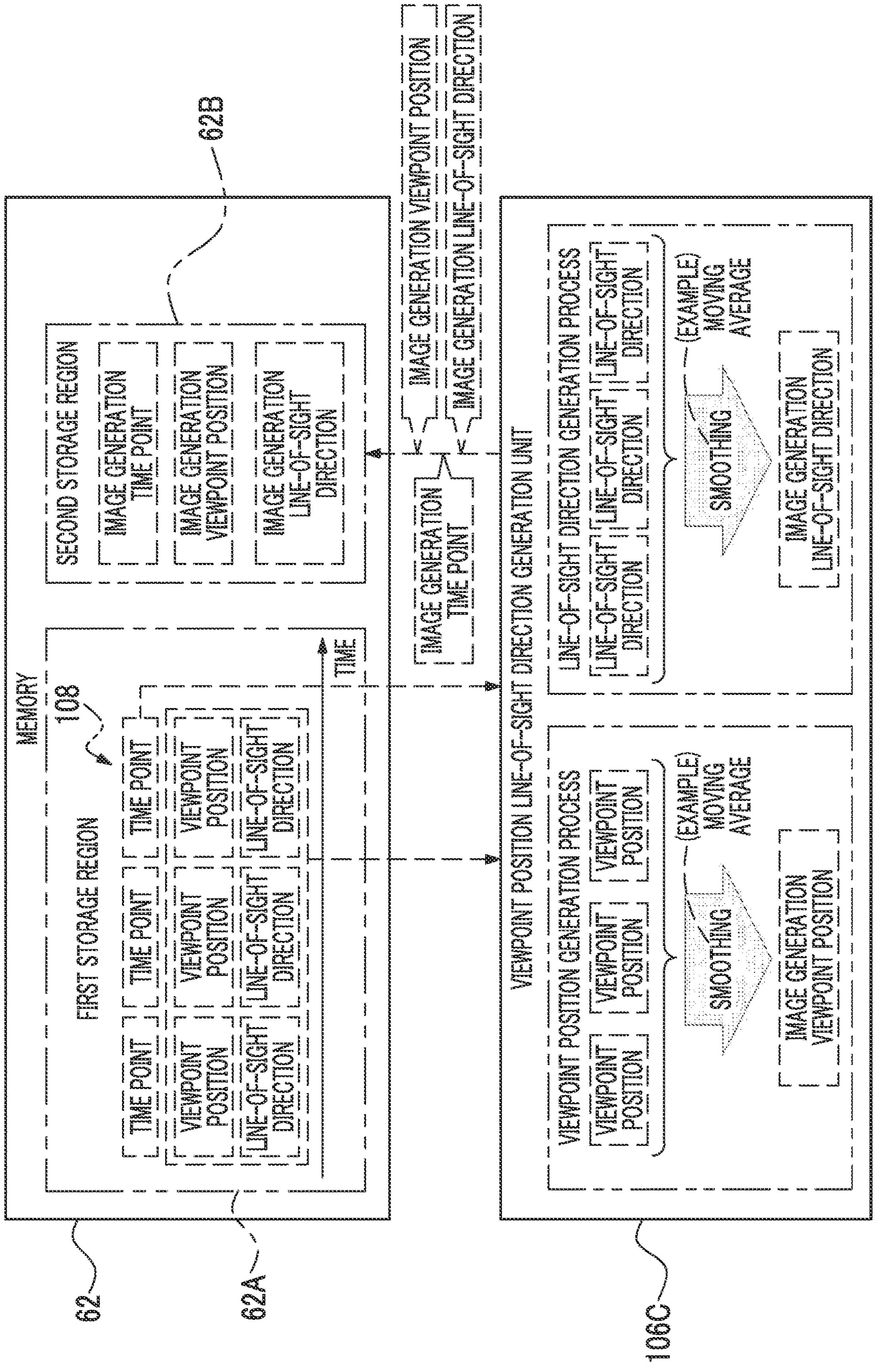
FIG. 11 is a conceptual diagram showing an example of processing details of a viewpoint position line-of-sight direction generation unit according to the first embodiment.

As an example, as shown in FIG. 11, the viewpoint position line-of-sight direction generation unit 106C acquires the oldest time point tin the time-series data 108 from the first storage region 62A. Here, the oldest time point tin the time-series data 108 refers to a time point t 2×Δt seconds before the latest time point tin the time-series data 108. The viewpoint position line-of-sight direction generation unit 106C acquires all viewpoint positions (hereinafter, also referred to as a "viewpoint position group") and all line-of-sight directions (hereinafter, also referred to as a "line-of-sight direction group") in the time-series data 108 from the first storage region 62A.

The viewpoint position line-of-sight direction generation unit 106C uses the viewpoint position group to generate an image generation viewpoint position such that an amount of temporal changes in the viewpoint position group is smaller than an actual amount of temporal changes by executing a viewpoint position generation process.

In this case, the amount of temporal changes in the viewpoint position group is smoothed, and thus the amount of temporal changes in the viewpoint position group is smaller than the actual amount of temporal changes. The smoothing of the amount of change over time in the viewpoint position group is realized by smoothing an amount of time-series changes in viewpoint positions. Smoothing the amount of time-series changes in viewpoint positions is realized, for example, by smoothing the viewpoint position group. An example of smoothing the viewpoint position group is a moving average of the viewpoint position group. The viewpoint position line-of-sight direction generation unit 106C smooths the viewpoint position group to generate an image generation viewpoint position based on the viewpoint position group. The image generation viewpoint position is an example of an "adjustment position" according to the technique of the present disclosure, and is used as a new viewpoint position of the target person 96 in a case where the virtual viewpoint image 46C is regenerated.

The viewpoint position line-of-sight direction generation unit 106C uses the line-of-sight direction group to generate an image generation line-of-sight direction such that an amount of temporal changes in the line-of-sight direction group is smaller than an actual amount of temporal changes by executing a line-of-sight direction generation process.

In this case, the amount of temporal changes in the line-of-sight direction group is smoothed, and thus the amount of temporal changes in the line-of-sight direction group is smaller than the actual amount of temporal changes. The smoothing of the amount of temporal changes in the line-of-sight direction group is realized by smoothing an amount of time-series changes in line-of-sight directions. Smoothing the amount of time-series changes in line-of-sight directions is realized, for example, by smoothing the line-of-sight direction group. An example of smoothing the line-of-sight direction group is a moving average of the line-of-sight direction group. The viewpoint position line-of-sight direction generation unit 106C smooths the line-of-sight direction group to generate an image generation line-of-sight direction based on the line-of-sight direction group. The image generation line-of-sight direction is an example of an "adjustment orientation" according to the technique of the present disclosure, and is used as a new line-of-sight direction of the target person 96 in a case where the virtual viewpoint image 46C is regenerated.

The viewpoint position line-of-sight direction generation unit 106C uses the time point t acquired from the first storage region 62A as an image generation time point, and stores the image generation time point, the image generation viewpoint position, and the image generation line-of-sight direction in a second storage region 62B of the memory 62 in association with each other. The storage of the image generation time point, the image generation viewpoint position, and the image generation line-of-sight direction in the second storage region 62B is overwrite storage. Therefore, the image generation time point, the image generation viewpoint position, and the image generation line-of-sight direction stored in the second storage region 62B are updated in a case where new image generation time point, image generation viewpoint position, and image generation line-of-sight direction are overwritten and stored in second storage region 62B by the viewpoint position line-of-sight direction generation unit 106C.

Figure 12:
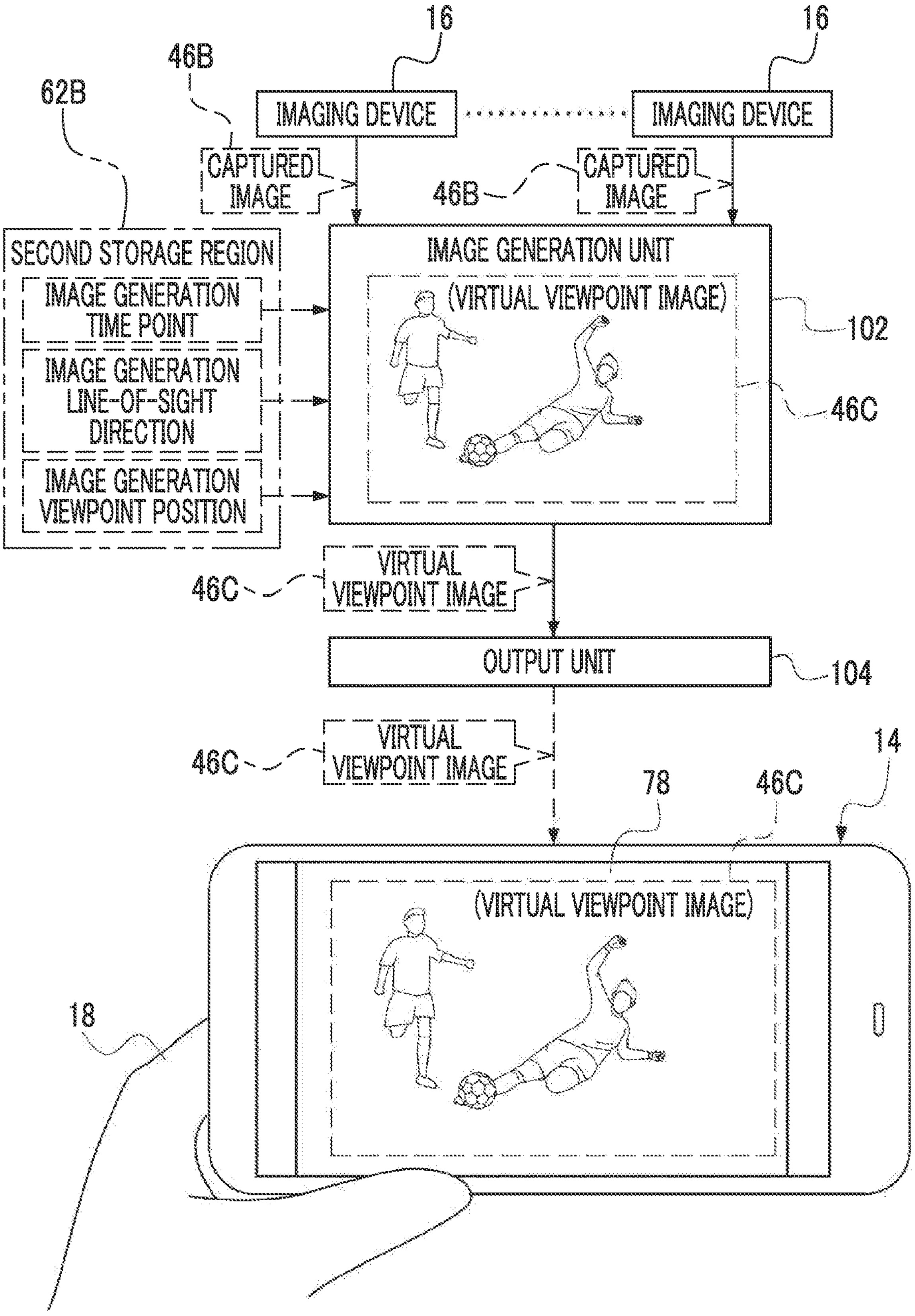
FIG. 12 is a conceptual diagram showing an example of processing details of an image generation unit and a viewpoint line-of-sight calculation unit according to the first embodiment.

As an example, as shown in FIG. 12, in a case where the new image generation time point, image generation viewpoint position, and image generation line-of-sight direction are stored in the second storage region 62B, the image generation unit 102 acquires the image generation time point, the image generation viewpoint position, and the image generation line-of-sight direction from the second storage region 62B. The image generation unit 102 acquires a plurality of captured images 46B (hereinafter, also referred to as an "image generation time point image group") having the same imaging time point as the image generation time point from the captured image group. The image generation unit 102 generates the virtual viewpoint image 46C with reference to the image generation viewpoint position and the image generation line-of-sight direction acquired from the second storage region 62B on the basis of the image generation time point image group.

The image generation unit 102 outputs the generated new virtual viewpoint image 46C to the output unit 104. The output unit 104 outputs the new virtual viewpoint image 46C input from the image generation unit 102 to the user device 14, and thus the new virtual viewpoint image 46C is displayed on the display 78 of the user device 14. The output unit 104 outputs the new virtual viewpoint image 46C to the user device 14 in a state in which the virtual viewpoint image 46C is already displayed on the display 78, and thus the virtual viewpoint image 46C displayed on the display 78 is updated to the new virtual viewpoint image 46C. That is, the output unit 104 controls a display aspect of the virtual viewpoint image 46C by updating the virtual viewpoint image 46C displayed on the display 78 to the new virtual viewpoint image 46C.

As described above, the CPU 58 controls a display aspect of the virtual viewpoint image 46C displayed on the display 78 of the user device 14 by generating the virtual viewpoint image 46C with reference to the image generation viewpoint position and the image generation line-of-sight direction and outputting the virtual viewpoint image 46C to the user device 14.

Next, an operation of the image processing system 10 will be described.

First, a viewpoint line-of-sight generation process executed by the CPU 58 of the image processing apparatus 12 according to the viewpoint line-of-sight generation program 60A will be described with reference to FIG. 13. A flow of the viewpoint line-of-sight generation process shown in FIG. 13 and an image generation output process (refer to FIG. 14) that will be described later are an example of an "image processing method" according to the technique of the present disclosure. In the following description of the viewpoint line-of-sight generation process and the image generation output process, for convenience of description, it is assumed that the virtual viewpoint image 46C showing the target person 96 has been already generated by the image generation unit 102 and displayed on the display 78 of the user device 14.

Figure 13:
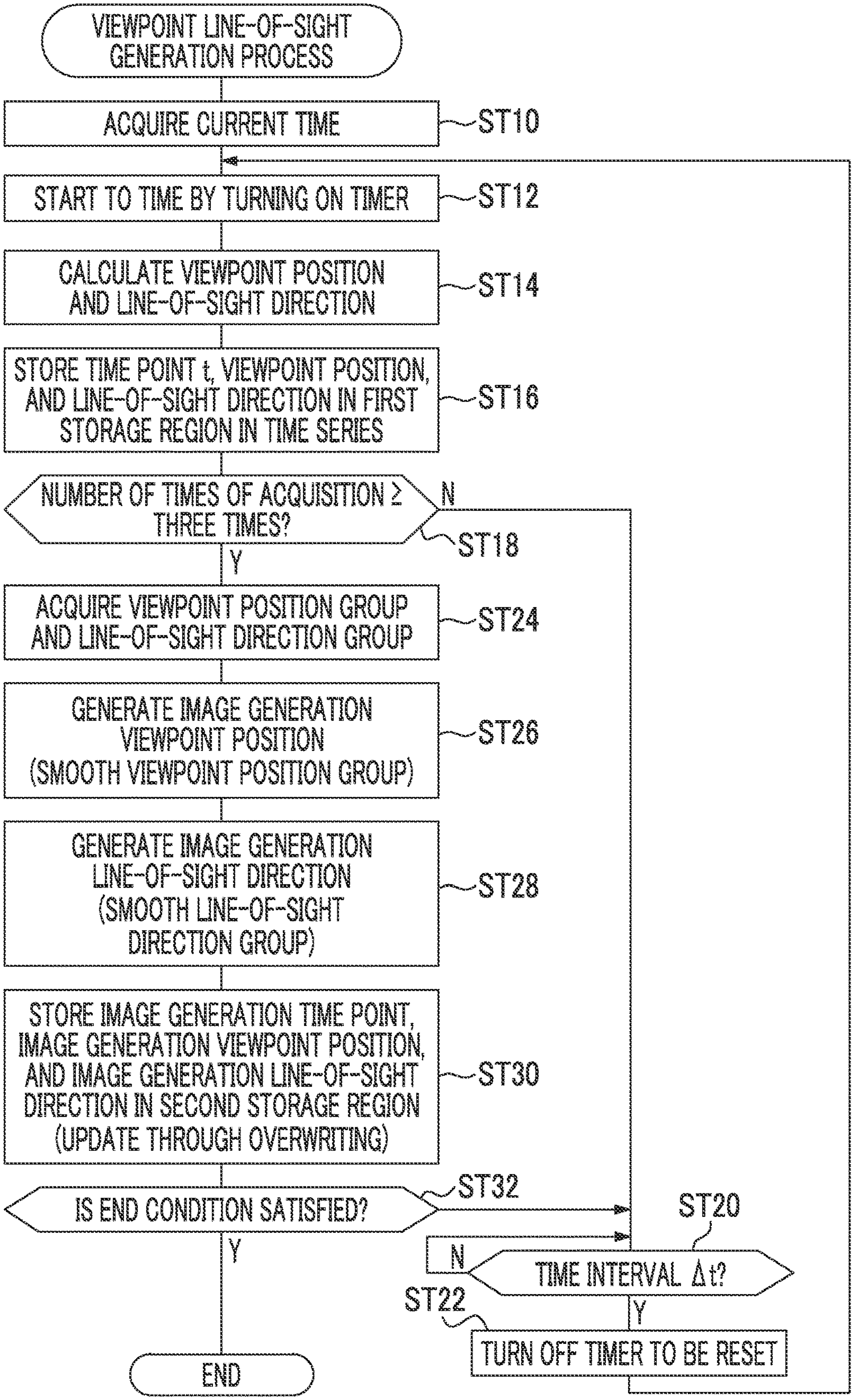
FIG. 13 is a flowchart showing an example of a flow of a viewpoint line-of-sight generation process according to the first embodiment.

In the viewpoint line-of-sight generation process shown in FIG. 13, first, in step ST10, the acquisition unit 106B acquires the current time from the RTC 51, and then the viewpoint line-of-sight generation process proceeds to step ST12.

In step ST12, the acquisition unit 106B starts the timer 106B1 to time by turning on the timer 106B1, and then the viewpoint line-of-sight generation process proceeds to step ST14.

In step ST14, the viewpoint line-of-sight calculation unit 106A calculates a viewpoint position and a line-of-sight direction of the target person 96 shown by the virtual viewpoint image 46C, and then the viewpoint line-of-sight generation process proceeds to step ST16.

In step ST16, the acquisition unit 106B acquires the time point t and also acquires the viewpoint position and the line-of-sight direction calculated in step ST14. The time point t is updated by adding the time interval Δt each time point the process in step ST32 that will be described later is executed. The acquisition unit 106B updates the time-series data 108 by storing the latest time point t, the viewpoint position, and the line-of-sight direction in the first storage region 62A in a time series, and then the viewpoint line-of-sight generation process proceeds to step ST18.

In step ST18, the acquisition unit 106B refers to the stored details of the first storage region 62A and determines whether or not the number of times of acquisition of the viewpoint position and the line-of-sight direction by the acquisition unit 106B is three or more times. In step ST18, in a case where the number of times of acquisition of the viewpoint position and the line-of-sight direction by the acquisition unit 106B is less than three times, a determination result is negative, and the viewpoint line-of-sight generation process proceeds to step ST20. In step ST18, in a case where the number of times of acquisition of the viewpoint position and the line-of-sight direction by the acquisition unit 106B is three times or more, a determination result is positive, and the viewpoint line-of-sight generation process proceeds to step ST24.

In step ST20, the acquisition unit 106B determines whether or not the time interval Δt has been measured by the timer 106B1. In step ST20, in a case where the time interval Δt has not been measured by the timer 106B1, a determination result is negative, and the determination in step ST20 is performed again. In step ST20, in a case where the time interval Δt has been measured by the timer 106B1, a determination result is positive, and the viewpoint line-of-sight generation process proceeds to step ST22.

In step ST22, the acquisition unit 106B turns off the timer 106B1 to be reset. The acquisition unit 106B updates the time point t by adding the time interval Δt to the time point t, and then the viewpoint line-of-sight generation process proceeds to step ST12.

In step ST24, the viewpoint position line-of-sight direction generation unit 106C acquires the latest three viewpoint positions and line-of-sight directions, that is, the viewpoint position group and the line-of-sight direction group from the time-series data 108 in the first storage region 62A, and then the viewpoint line-of-sight generation process proceeds to step ST26.

In step ST26, the viewpoint position line-of-sight direction generation unit 106C generates an image generation viewpoint position by smoothing the viewpoint position group, and then the viewpoint line-of-sight generation process proceeds to step ST28.

In step ST28, the viewpoint position line-of-sight direction generation unit 106C generates an image generation line-of-sight direction by smoothing the line-of-sight direction group, and then the viewpoint line-of-sight generation process proceeds to step ST30.

In step ST30, the viewpoint position line-of-sight direction generation unit 106C updates the stored details of the second storage region 62B by overwriting and storing the image generation time point (in the example shown in FIG. 11, the oldest time point tin the time-series data 108), the latest image generation viewpoint position generated in step ST26, and the latest image generation line-of-sight direction generated in step ST28 in the second storage region 62B. After the process in step ST30 is executed, the viewpoint line-of-sight generation process proceeds to step ST32.

In step ST32, the viewpoint position line-of-sight direction generation unit 106C determines whether or not a condition for ending the viewpoint line-of-sight generation process (hereinafter, also referred to as a "viewpoint line-of-sight generation process end condition") is satisfied. As an example of the condition for ending the viewpoint line-of-sight generation process, there is a condition that the image processing apparatus 12 is instructed to end the viewpoint line-of-sight generation process. The instruction for ending the viewpoint line-of-sight generation process is received by, for example, the reception device 52 or 76. In step ST32, in a case where the condition for ending the viewpoint line-of-sight generation process is not satisfied, a determination result is negative, and the viewpoint line-of-sight generation process proceeds to step ST20. In step ST32, in a case where the condition for ending the viewpoint line-of-sight generation process is satisfied, a determination result is positive, and the viewpoint line-of-sight generation process is ended.

Next, the image generation output process executed by the CPU 58 of the image processing apparatus 12 according to the image generation output program 60B will be described with reference to FIG. 14.

Figure 14:
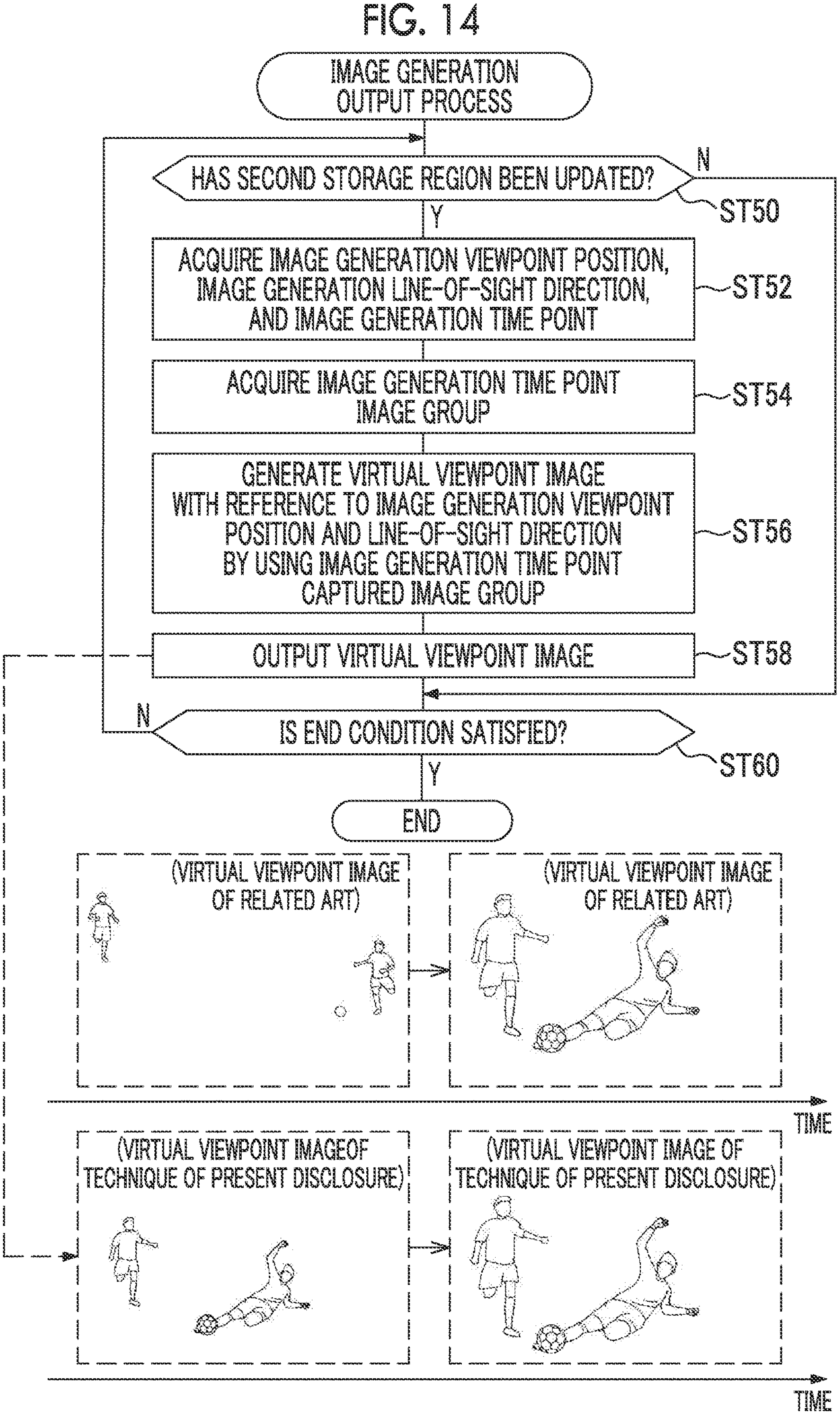
FIG. 14 is a flowchart showing an example of a flow of an image generation output process according to the first embodiment.

In the image generation output process shown in FIG. 14, first, in step ST50, the image generation unit 102 determines whether or not the stored details of the second storage region 62B have been updated by executing the process in step ST30. In step ST50, in a case where the stored details of the second storage region 62B have not been updated by executing the process in step ST30, a determination result is negative, and the image generation output process proceeds to step ST60. In step ST50, in a case where the stored details of the second storage region 62B have been updated by executing the process in step ST30, a determination result is positive, and the image generation output process proceeds to step ST52.

In step ST52, the image generation unit 102 acquires the image generation viewpoint position, the image generation line-of-sight direction, and the image generation time point from the second storage region 62B, and then the image output process proceeds to step ST54.

In step ST54, the image generation unit 102 acquires, from the captured image group, a plurality of captured images 46B having the same imaging time point as the image generation time point acquired in step ST52, that is, an image generation time point image group, and then the image generation output process proceeds to step ST56.

In step ST56, the image generation unit 102 uses the image generation time point image group acquired in step ST54 to generate the virtual viewpoint image 46C with reference to the image generation viewpoint position and the image generation line-of-sight direction acquired in step ST52, and then the image generation output process proceeds to step ST58.

In step ST58, the output unit 104 outputs the virtual viewpoint image 46C generated in step ST56 to the user device 14. The CPU 88 of the user device 14 displays the virtual viewpoint image 46C input from the output unit 104 on the display 78. After the process in step ST58 is executed, the image output process proceeds to step ST60.

In step ST60, the output unit 104 determines whether or not a condition for ending the image generation output process (hereinafter, also referred to as an "image generation output process end condition") is satisfied. As an example of the image generation output process end condition, there is a condition that the image processing apparatus 12 is instructed to end the image generation output process. The instruction for ending the image generation output process is received by, for example, the reception device 52 or 76. In step ST60, in a case where the condition for ending the image generation output process is not satisfied, a determination result is negative, and the image generation output process proceeds to step ST50. In step ST60, in a case where the condition for ending the image generation output process is satisfied, a determination result is positive, and the image generation output process is ended.

As an example, as shown in FIG. 14, in a case of comparing a case where the virtual viewpoint image 46C is generated according to the conventional method without using the viewpoint line-of-sight generation process and the image generation output process with a case where the virtual viewpoint image 46C is generated by using the viewpoint line-of-sight generation process and the image generation output process, an amount of changes in the virtual viewpoint image 46C is smaller in the latter than in the former. Therefore, according to the image processing system 10, compared with a case where the viewpoint position and the line-of-sight direction of the target person 96 are reproduced in the virtual viewpoint image 46C without change, it is possible to reduce discomfort given to the user 18 who is a viewer of the virtual viewpoint image 46C by temporal changes in the viewpoint position and the line-of-sight direction of the target person 96.

In the image processing system 10, a display aspect is controlled according to an amount of temporal changes smaller than an actual amount of temporal changes in a viewpoint position and a line-of-sight direction of a target object. That is, the display aspect of the virtual viewpoint image 46C is controlled by setting an amount of temporal changes in a viewpoint position and a line-of-sight direction of the target person 96 to be smaller than an actual amount of temporal changes by the viewpoint position line-of-sight direction generation unit 106C. Therefore, according to the present configuration, compared with a case where the amount of temporal changes in the viewpoint position and the line-of-sight direction of the target person 96 are reproduced in the virtual viewpoint image 46C without change, it is possible to reduce discomfort given to the user 18 who is a viewer of the virtual viewpoint image 46C by temporal changes in the viewpoint position and the line-of-sight direction of the target person 96.

In the image processing system 10, the amount of temporal changes in the viewpoint position and the line-of-sight direction of the target person 96 is smoothed by the viewpoint position line-of-sight direction generation unit 106C, and thus the image generation viewpoint position and the image generation line-of-sight direction based on the viewpoint position and the line-of-sight direction of the target person 96 are generated. A display aspect of the virtual viewpoint image 46C is controlled by generating and outputting the virtual viewpoint image 46C with reference to the image generation viewpoint position and the image generation line-of-sight direction. Therefore, according to the present configuration, it is possible to suppress a steep change in the virtual viewpoint image 46C compared with a case where the temporal changes in the viewpoint position and the line-of-sight direction of the target person 96 are directly reflected in the virtual viewpoint image 46C.

In the image processing system 10, the viewpoint position group and the line-of-sight direction group included in the time-series data 108 are subjected to moving average, and thus an amount of temporal changes in the viewpoint position and the line-of-sight direction of the target person 96 is smoothed. Therefore, according to the present configuration, even in a case where the viewpoint position and the line-of-sight direction of the target person 96 change from moment to moment, the smoothing of the amount of temporal changes in the viewpoint position and the line-of-sight direction of the target person 96 can be followed.

In the first embodiment, the plurality of imaging devices 16 have different imaging positions and imaging directions, but the technique of the present disclosure is not limited to this, and the plurality of imaging devices 16 may have different imaging positions or imaging directions.

In the above embodiment, a display aspect of the virtual viewpoint image 46C is controlled according to an amount of temporal changes in the viewpoint position and the line-of-sight direction of the target person 96, but the technique of the present disclosure is not limited to this. The display aspect of the virtual viewpoint image 46C may be controlled according to an amount of temporal changes in the viewpoint position or the line-of-sight direction of the target person 96.

Different weight values may be added to an amount of temporal changes in the viewpoint position of the target person 96 and an amount of temporal changes in the line-of-sight direction of the target person 96. An example of the weight value is an adjustment coefficient. In this case, for example, in a case where the amount of temporal changes in the viewpoint position of the target person 96 is smaller than the amount of temporal changes in the line-of-sight direction of the target person 96, an adjustment coefficient to be multiplied by the amount of temporal changes in the viewpoint position of the target person 96 may be set to a decimal fraction in a case where an adjustment coefficient to be multiplied by the amount of temporal changes in the line-of-sight direction of the target person 96 is set to "1". On the contrary, in a case where the amount of temporal changes in the line-of-sight direction of the target person 96 is smaller than the amount of temporal changes in the viewpoint position of the target person 96, an adjustment coefficient to be multiplied by the amount of temporal changes in the line-of-sight direction of the target person 96 may be set to a decimal fraction in a case where an adjustment coefficient to be multiplied by the amount of temporal changes in the viewpoint position of the target person 96 is set to "1". The adjustment coefficient to be multiplied by the amount of temporal changes in the viewpoint position of the target person 96 and/or the adjustment coefficient to be multiplied by the amount of temporal changes in the viewpoint position of the target person 96 may be a fixed value or may be a variable value that is changed according to a given instruction and/or condition.

In a case where the adjustment coefficient is a variable value, for example, the adjustment coefficient to be multiplied by the amount of temporal changes in the viewpoint position of the target person 96 and the adjustment coefficient to be multiplied by the amount of temporal changes in the line-of-sight direction of the target person 96 may be different according to, for example, a ratio between an amount of changes in the viewpoint position per unit time and the amount of changes in the line-of-sight direction per unit time.

Specifically, in a case where the ratio of the amount of changes in the line-of-sight direction per unit time point to the amount of changes in the viewpoint position per unit time is larger than a reference ratio (for example, 1.5), the adjustment coefficient to be multiplied by the amount of temporal changes in the line-of-sight direction of the target person 96 may be smaller than the adjustment coefficient to be multiplied by the amount of temporal changes in the viewpoint position of the target person 96. On the contrary, for example, in a case where the ratio of the amount of changes in the viewpoint position of the target person 96 per unit time point to the amount of changes in the line-of-sight direction of the target person 96 per unit time is larger than the reference ratio, the adjustment coefficient to be multiplied by the amount of temporal changes in the viewpoint position of the target person 96 may be smaller than the adjustment coefficient to be multiplied by the amount of temporal changes in the line-of-sight direction of the target person 96. The reference ratio may be a fixed value or a variable value that is changed according to a given instruction and/or condition.

In the first embodiment, the target person 96 is exemplified, but the technique of the present disclosure is not limited to this, and may be a non-person (an object other than a human). Examples of the non-person include a robot (for example, a robot that imitates a living thing such as a person, an animal, or an insect) equipped with a device (for example, a device including a physical camera and a computer connected to the physical camera) capable of recognizing an object, an animal, and an insect. In this case, a display aspect of the virtual viewpoint image is controlled according to an amount of temporal changes in a position and/or an orientation of a non-person.

In the first embodiment, an amount of temporal changes is exemplified, but the concept of the amount of temporal changes also includes the concept of the first derivative of time or the concept of the second derivative of time.

In the first embodiment, the latest three viewpoint positions have been exemplified as the viewpoint position group in which an amount of temporal changes is smoothed, and the latest three line-of-sight directions have been exemplified as the line-of-sight direction group in which an amount of temporal changes is smoothed, but the technique of the present disclosure is not limited to this. An amount of temporal changes in the viewpoint position group may be smoothed by using the latest two viewpoint positions or the latest four or more viewpoint positions as the viewpoint position group. The line-of-sight direction group may be smoothed by using the latest two line-of-sight directions or the latest four or more line-of-sight directions as the line-of-sight direction groups.

Second Embodiment

In the first embodiment, a form example in which the time interval Δt is fixed has been described, but in the second embodiment, a form example in which the time interval Δt is changed according to conditions will be described. In the second embodiment, the same constituents as those in the first embodiment are denoted by the same reference numerals, and the description thereof will be omitted. In the second embodiment, portions different from the first embodiment will be described.

Figure 15:
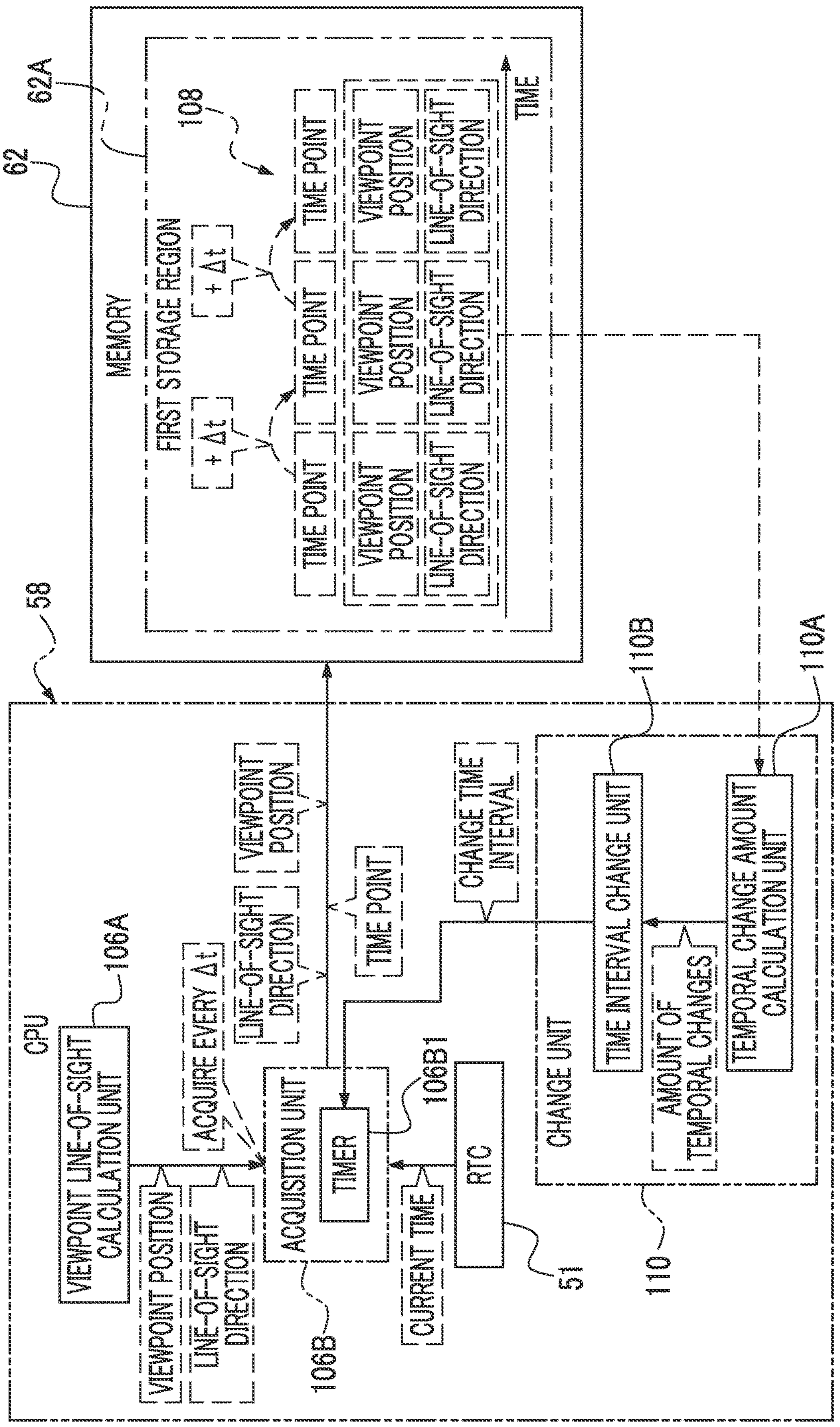
FIG. 15 is a conceptual diagram showing an example of processing details of a change unit according to the second embodiment.

As an example, as shown in FIG. 15, in the image processing apparatus 12 according to the second embodiment, the CPU 58 further operates as a change unit 110. The change unit 110 changes the time interval Δt according to an amount of temporal changes in a viewpoint position and a line-of-sight direction of the target person 96. Here, for convenience of description, the amount of temporal changes in the viewpoint position and the line-of-sight direction of the target person 96 is exemplified, but as described above, the technique of the present disclosure is established for an amount of temporal changes in the viewpoint position or the line-of-sight direction of the target person 96.

The change unit 110 includes a temporal change amount calculation unit 110A and a time interval change unit 110B. The temporal change amount calculation unit 110A acquires the viewpoint position group and the line-of-sight direction group from the time-series data 108. The temporal change amount calculation unit 110A calculates an amount of temporal changes in the viewpoint position group acquired from the time-series data 108. Here, an example of the amount of temporal changes in the viewpoint position group is an average value of an amount of temporal changes between viewpoint positions adjacent to the time stored in the first storage region 62A. The temporal change amount calculation unit 110A calculates an amount of temporal changes in the line-of-sight direction group acquired from the time-series data 108. Here, an example of the amount of temporal changes in the line-of-sight direction group is an average value of an amount of temporal changes between line-of-sight directions adjacent to the time stored in the first storage region 62A.

The time interval change unit 110B changes the time interval Δt measured by the timer 106B1 according to the amount of temporal changes calculated by the temporal change amount calculation unit 110A. Hereinafter, a more detailed description will be made.

The time interval change unit 110B sets, in a case where the amount of temporal changes in the viewpoint position group is equal to or more than a first threshold value and the amount of temporal changes in the line-of-sight direction group is equal to or more than the second threshold value, the time interval Δt to be shorter than a normal time interval on condition that the time interval Δt is equal to or longer than the normal time interval. The normal time interval is a time interval set by default. The normal time interval may be fixed or may be changed according to a given instruction and/or condition. Here, the normal time interval is an example of "first to fourth reference time intervals" according to the technique of the present disclosure.

In the following description, for convenience of the description, a case where the condition that an amount of temporal changes in the viewpoint position group is equal to or more than the first threshold value and a condition that an amount of temporal changes in the line-of-sight direction group is equal to or more than the second threshold value are satisfied will also be referred to as "a case where an amount of temporal change is equal to or more than the threshold value (amount of temporal changes≥threshold value)". A case where the condition that the amount of temporal changes in the viewpoint position group is equal to or more than the first threshold value and/or the condition that the amount of temporal changes in the line-of-sight direction group is equal to or more than the second threshold value are/is not satisfied will be referred to as "a case where an amount of temporal changes is less than a threshold value (amount of temporal changes<threshold value)". The amount of temporal changes in the viewpoint position group and the amount of temporal changes in the line-of-sight direction group will also be collectively referred to as an "amount of temporal changes". Here, the threshold value is an example of a "first predetermined value" according to the technique of the present disclosure.

In a case where the amount of temporal changes is less than the threshold value, the time interval change unit 110B sets the time interval Δt to the normal time interval on condition that the time interval Δt is different from the normal time interval.

Figure 16A:
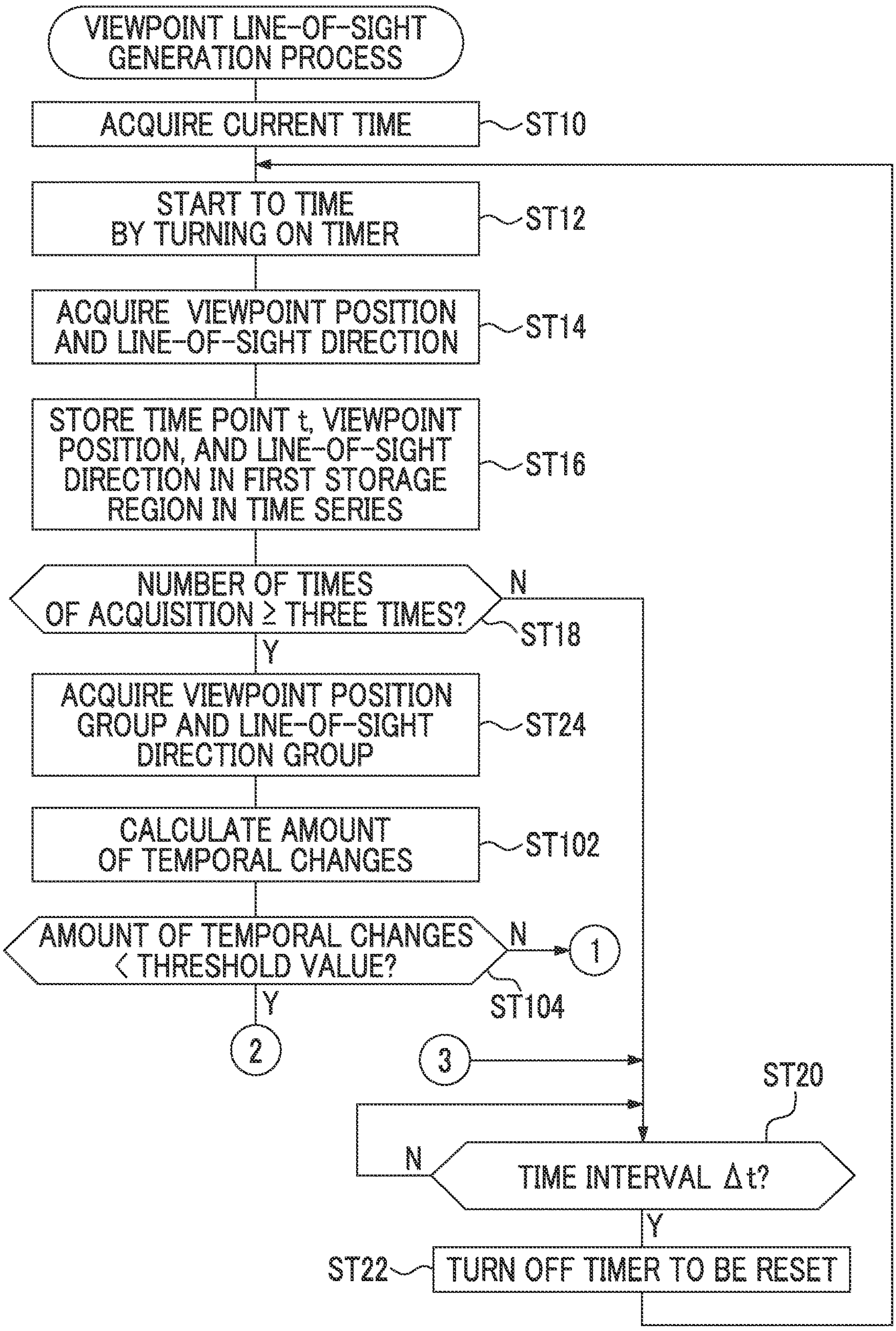
FIG. 16A is a flowchart showing an example of a flow of a viewpoint line-of-sight generation process according to the second embodiment.
Figure 16B:
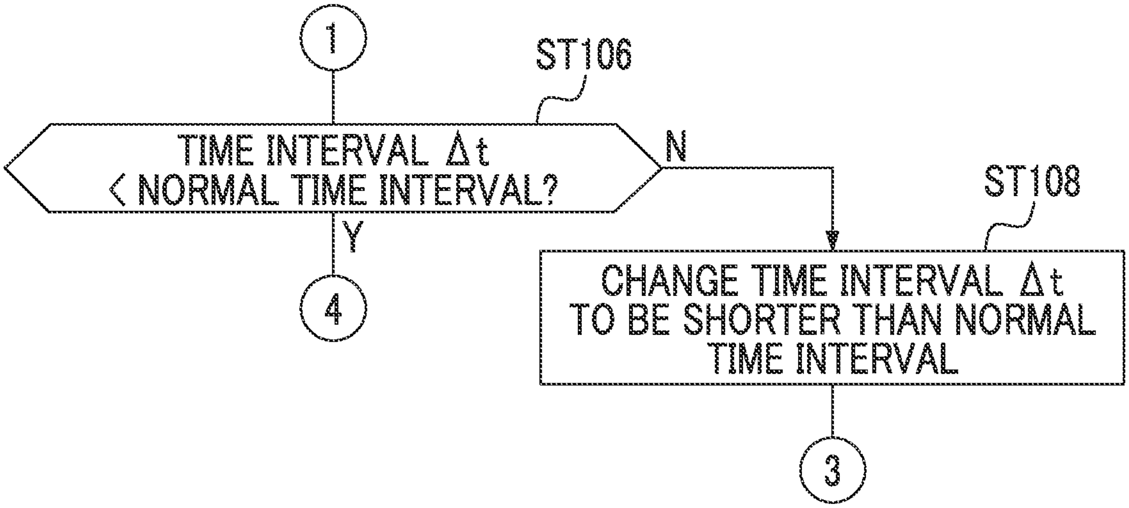
FIG. 16B is a continuation of the flowchart of FIG. 16A.
Figure 16C:
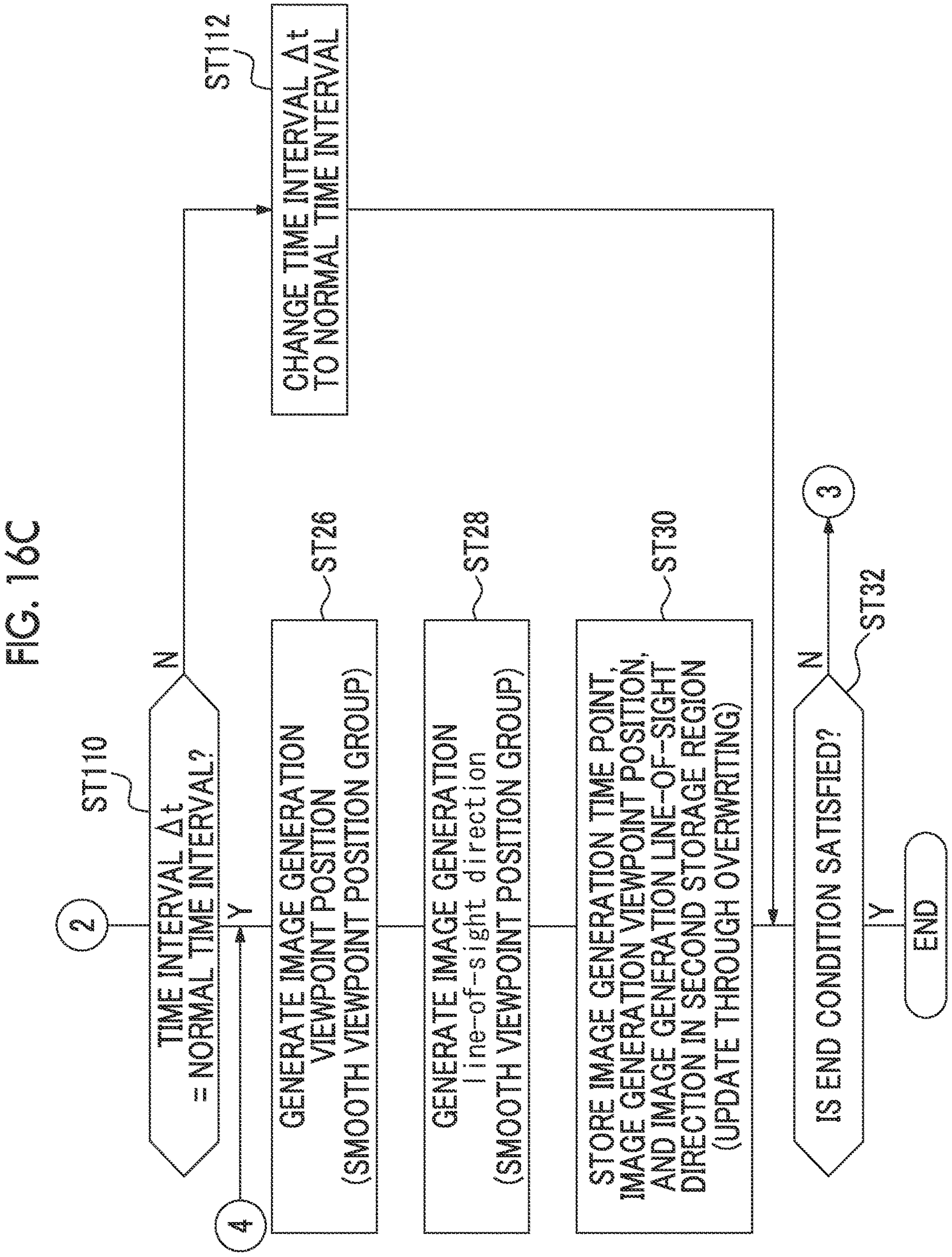
FIG. 16C is a continuation of the flowcharts of FIGS. 16A and 16B.

FIGS. 16A to 16C show an example of a flow of a viewpoint line-of-sight generation process according to the second embodiment. The flowcharts of FIGS. 16A to 16C are different from the flowchart of FIG. 13 in that steps ST102 to ST112 are provided.

After the process in step ST24 shown in FIG. 16A is executed, the viewpoint line-of-sight generation process proceeds to step ST102.

In step ST102, the temporal change amount calculation unit 110A calculates an amount of temporal changes by using the viewpoint position group and the line-of-sight direction group acquired in step ST24, and then the viewpoint line-of-sight generation process proceeds to step ST104.

In step ST104, the time interval change unit 110B determines whether or not the amount of temporal changes calculated in step ST102 is less than the threshold value. In step ST104, in a case where the amount of temporal changes calculated in step ST102 is equal to or more than the threshold value, a determination result is negative, and the viewpoint line-of-sight generation process proceeds to step ST106 shown in FIG. 16B. In step ST104, in a case where the amount of temporal changes calculated in step ST102 is less than the threshold value, a determination result is positive, and the viewpoint line-of-sight generation process proceeds to step ST110 shown in FIG. 16C.

In step ST106 shown in FIG. 16B, the time interval change unit 110B determines whether or not the time interval Δt is shorter than the normal time interval. In step ST106, in a case where the time interval Δt is shorter than the normal time interval, a determination result is positive, and the viewpoint line-of-sight generation process proceeds to step ST26 shown in FIG. 16C. In step ST106, in a case where the time interval Δt is equal to or longer than the normal time interval, a determination result is negative, and the viewpoint line-of-sight generation process proceeds to step ST108.

In step ST108, the time interval change unit 110B changes the time interval Δt to a predetermined first time interval shorter than the normal time interval, and then the viewpoint line-of-sight generation process proceeds to step ST20 shown in FIG. 16A. Here, the predetermined first time interval may be fixed, or may be changed according to a given instruction and/or condition within a range less than the normal time interval.

In step ST110 shown in FIG. 16C, the time interval change unit 110B determines whether or not the time interval Δt is the normal time interval. In step ST110, in a case where the time interval Δt is not the normal time interval, a determination result is negative, and the viewpoint line-of-sight generation process proceeds to step ST112. In step ST110, in a case where the time interval Δt is the normal time interval, a determination result is positive, and the viewpoint line-of-sight generation process proceeds to step ST26.

In step ST112, the time interval change unit 110B changes the time interval Δt to the normal time interval regardless of an amount of temporal change, and then the viewpoint line-of-sight generation process proceeds to step ST32.

As described above, in the second embodiment, the time interval Δt is changed according to an amount of changes with time. Therefore, according to the present configuration, it is possible to suppress a steep change in the virtual viewpoint image 46C compared with a case where the time interval Δt does not change regardless of an amount of temporal changes.

In the second embodiment, in a case where the amount of temporal changes is equal to or more than the threshold value, the time interval Δt is shorter than the normal time interval. Therefore, according to the present configuration, the user 18 who is a viewer of the virtual viewpoint image 46 can feel the reality of fine temporal changes in the viewpoint position and the line-of-sight direction of the target person 96 compared with a case where the time interval Δt is always constant regardless of an amount of temporal changes.

In the second embodiment, in a case where the amount of temporal changes is less than the threshold value and the time interval Δt is different from the normal time interval, the time interval Δt is set to the normal time interval. Therefore, according to the present configuration, the user 18 who is a viewer of the virtual viewpoint image 46C can feel the reality of temporal changes in the viewpoint position and the line-of-sight direction of the target person 96 at an appropriate display speed compared with the case where the time interval Δt is always constant regardless of an amount of temporal changes.

In the second embodiment, the time interval change unit 110B sets the time interval Δt to be shorter than the normal time interval on condition that the time interval Δt is equal to or more than the normal time interval in a case where an amount of temporal changes is equal to or more than the threshold value, but the technique of the present disclosure is not limited to this. For example, the time interval change unit 110B may set the time interval Δt to be equal to or longer than the normal time interval on condition that the time interval Δt is shorter than the normal time interval in a case where an amount of temporal changes is equal to or less than the threshold value. The time interval change unit 110B may set the time interval Δt to the normal time interval on condition that the time interval Δt is different from the normal time interval in a case where the amount of temporal changes exceeds the threshold value.

Figure 17A:
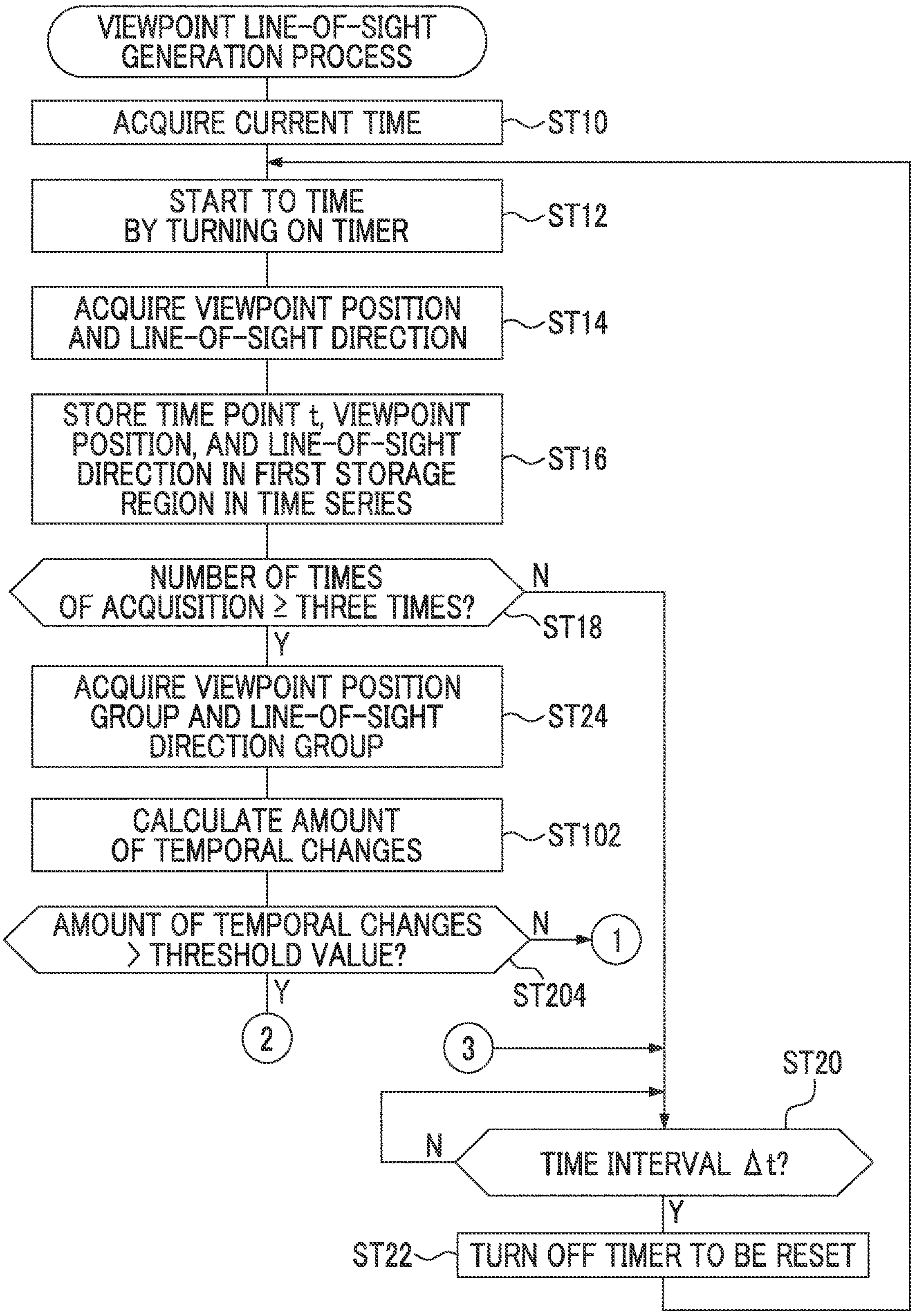
FIG. 17A is a flowchart showing a first modification example of the flow of the viewpoint line-of-sight generation process according to the second embodiment.
Figure 17B:
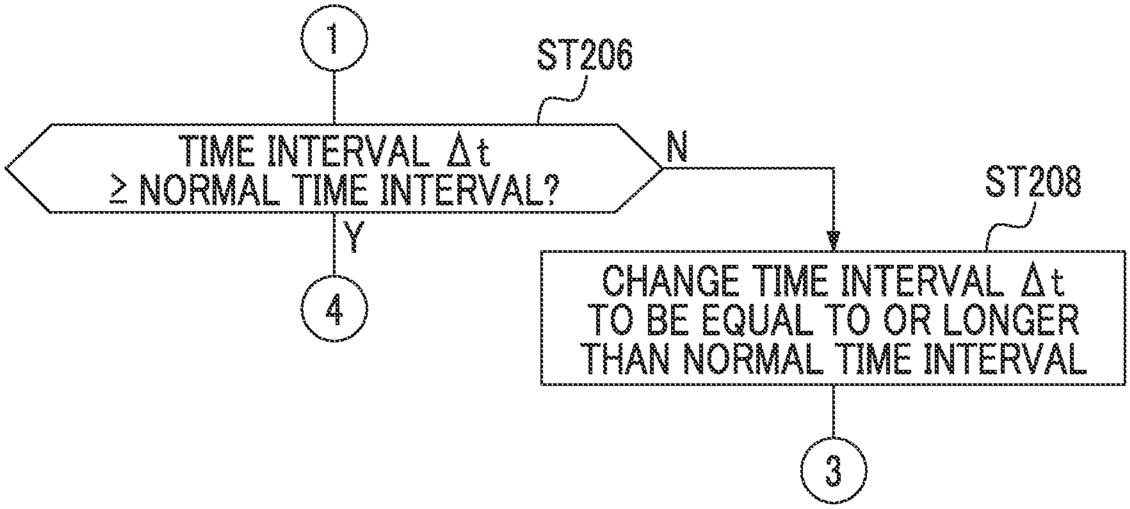
FIG. 17B is a continuation of the flowchart of FIG. 17A.

In this case, the viewpoint line-of-sight generation process shown in FIGS. 16A and 16B is changed to a viewpoint line-of-sight generation process shown in FIGS. 17A and 17B. Flowcharts of FIGS. 17A and 17B are different from the flowcharts of FIGS. 16A and 16B in that step ST204 is provided instead of step ST104, step ST206 is provided instead of step ST106, and step ST208 is provided instead of step ST108.

In step ST204 shown in FIG. 17A, the time interval change unit 110B determines whether or not the amount of temporal changes calculated in step ST102 exceeds the threshold value. In step ST204, in a case where the amount of temporal changes calculated in step ST102 is equal to or less than the threshold value, a determination result is negative, and the viewpoint line-of-sight generation process proceeds to step ST206 shown in FIG. 17B. In step ST204, in a case where the amount of temporal changes calculated in step ST102 exceeds the threshold value, a determination result is positive, and the viewpoint line-of-sight generation process proceeds to step ST110 shown in FIG. 16C.

In step ST206 shown in FIG. 17B, the time interval change unit 110B determines whether or not the time interval Δt is equal to or longer than the normal time interval. In step ST206, in a case where the time interval Δt is equal to or longer than the normal time interval, a determination result is positive, and the viewpoint line-of-sight generation process proceeds to step ST26 shown in FIG. 16C. In a case where the time interval Δt is shorter than the normal time interval in step ST206, a determination result is negative, and the viewpoint line-of-sight generation process proceeds to step ST208.

In step ST208, the time interval change unit 110B changes the time interval Δt to a predetermined second time interval equal to or longer than the normal time interval, and then the viewpoint line-of-sight generation process proceeds to step ST20 shown in FIG. 17A. Here, the predetermined second time interval may be fixed, or may be changed according to a given instruction and/or condition within a range of the normal time interval or more.

As described above, in a case where the viewpoint line-of-sight generation process shown in FIGS. 17A and 17B is executed, the time interval change unit 110B sets the time interval Δt to be equal to or longer than the normal time interval on condition that the time interval Δt is shorter than the normal time interval in a case where the amount of temporal changes is equal to or less than the threshold value. Therefore, according to the present configuration, the user 18 who is a viewer of the virtual viewpoint image 46C can feel the reality of rough temporal changes in the viewpoint position and the line-of-sight direction of the target person 96 compared with a case where the time interval Δt is always constant regardless of an amount of temporal changes.

In a case where the viewpoint line-of-sight generation process shown in FIGS. 17A and 17B is executed, the time interval change unit 110B sets the time interval Δt to the normal time interval on condition that the time interval Δt is different from the normal time interval in a case where the amount of temporal changes exceeds the threshold value. Therefore, according to the present configuration, the user 18 who is a viewer of the virtual viewpoint image 46C can feel the reality of temporal changes in the viewpoint position and the line-of-sight direction of the target person 96 at an appropriate display speed compared with the case where the time interval Δt is always constant regardless of an amount of temporal changes.

In the second embodiment, in a case where the amount of temporal changes is less than the threshold value and the time interval Δt coincides with the normal time interval (in a case where a determination result is positive in step ST110 shown in FIG. 16C), the image generation viewpoint position and the image generation line-of-sight direction are generated, and the virtual viewpoint image 46C with reference to the image generation viewpoint position and the image generation line-of-sight direction is generated (step ST56 shown in FIG. 14), but the technique of the present disclosure is not limited to this. For example, the time interval change unit 110B may control a display aspect of the virtual viewpoint image 46C according to an amount of temporal changes in a case where the amount of temporal changes is within a predetermined range.

Figure 18:
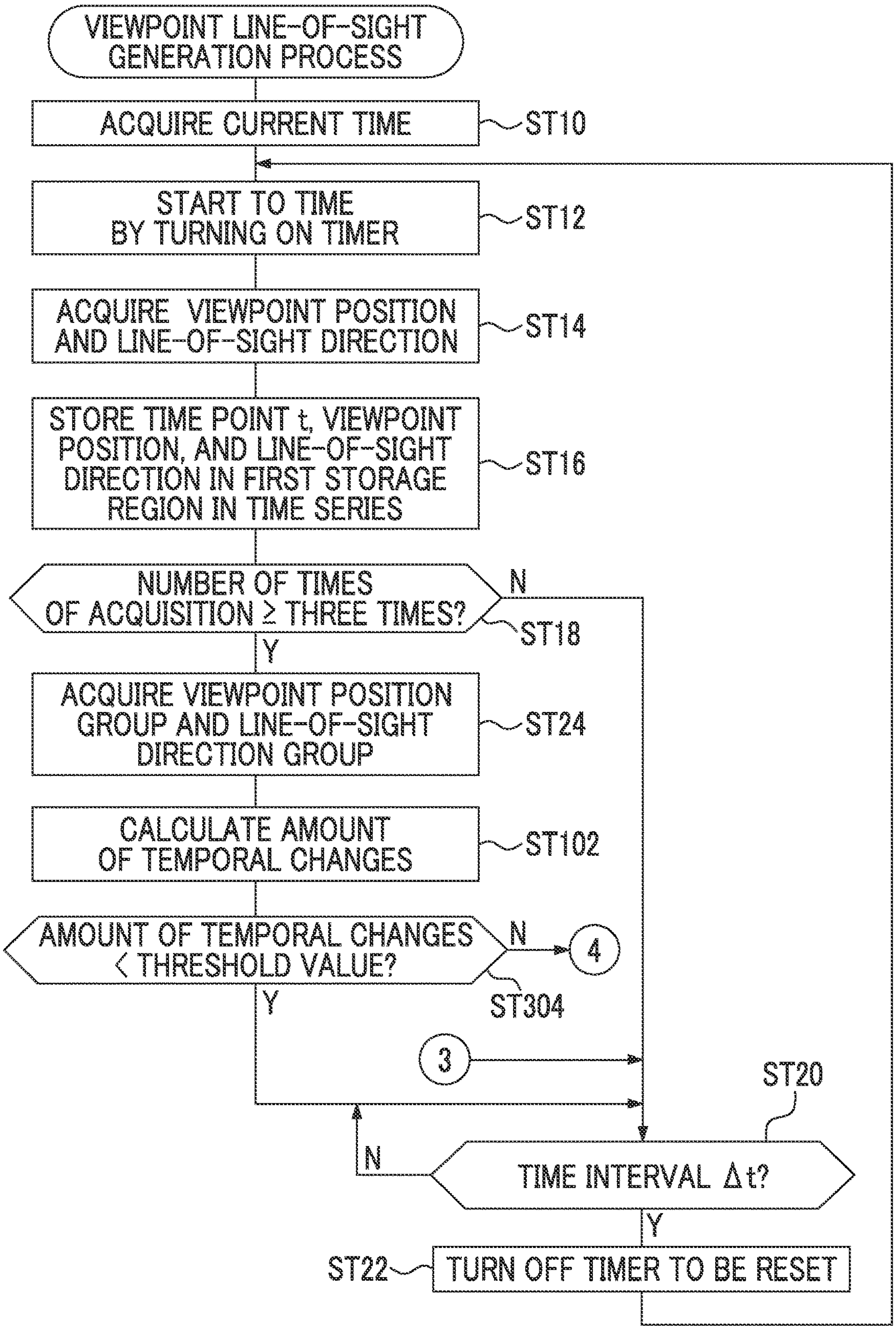
FIG. 18 is a flowchart showing a second modification example of the flow of the viewpoint line-of-sight generation process according to the second embodiment.

In this case, for example, the viewpoint line-of-sight generation process shown in FIG. 16A is changed to a viewpoint line-of-sight generation process shown in FIG. 18. A flowchart of FIG. 18 is different from the flowchart of FIG. 16A in that step ST304 is provided instead of step ST104.

In step ST304 shown in FIG. 18, the time interval change unit 110B determines whether or not the amount of temporal changes is less than the threshold value. In step ST304, in a case where the amount of temporal changes is equal to or more than the threshold value, a determination result is negative, and the viewpoint line-of-sight generation process proceeds to step ST26 shown in FIG. 16C. In step ST304, in a case where the amount of temporal changes is less than the threshold value, a determination result is positive, and the viewpoint line-of-sight generation process proceeds to step ST20.

Consequently, only in a case where the amount of temporal changes is equal to or more than the threshold value, new image generation viewpoint position and image generation line-of-sight direction are generated (refer to steps ST26 and ST28 shown in FIG. 16C), and the virtual viewpoint image 46C with reference to the image generation viewpoint position and the image generation line-of-sight direction is generated. Therefore, according to the present configuration, a display aspect of the virtual viewpoint image 46C is controlled according to an amount of temporal changes only in a case where the amount of temporal changes is equal to or more than the threshold value, the user 18 who is a viewer of the virtual viewpoint image 46 can feel the reality of fine temporal changes in the viewpoint position and the line-of-sight direction of the target person 96 compared with a case where the image generation viewpoint position and the image generation line-of-sight direction are generated regardless of the amount of the temporal changes.

In the example shown in FIG. 18, in step ST304, the time interval change unit 110B determines whether or not the amount of temporal changes is less than the threshold value, but the technique of the present disclosure is not limited to this, and, in step ST304, the time interval change unit 110B may determine whether or not the amount of temporal changes is equal to or more than the threshold value. In this case as well, the same effect can be expected. In the form example in which the time interval change unit 110B determines in step ST304 whether or not the amount of temporal changes is equal to or more than the threshold value, in a case where the amount of temporal changes is less than the threshold value in step ST304, a determination result may be negative, and the viewpoint line-of-sight generation process may proceed to step ST208 shown in FIG. 17B.

In the example shown in FIG. 18, a form example has been described in which, in a case where a determination result is negative in step ST304, the viewpoint line-of-sight generation process proceeds to step ST110 shown in FIG. 16C, but the technique of the present disclosure is limited to this. For example, in a case where a determination result is negative, in step ST304, the viewpoint line-of-sight generation process may proceed to step ST106 shown in FIG. 16B.

Figure 19:
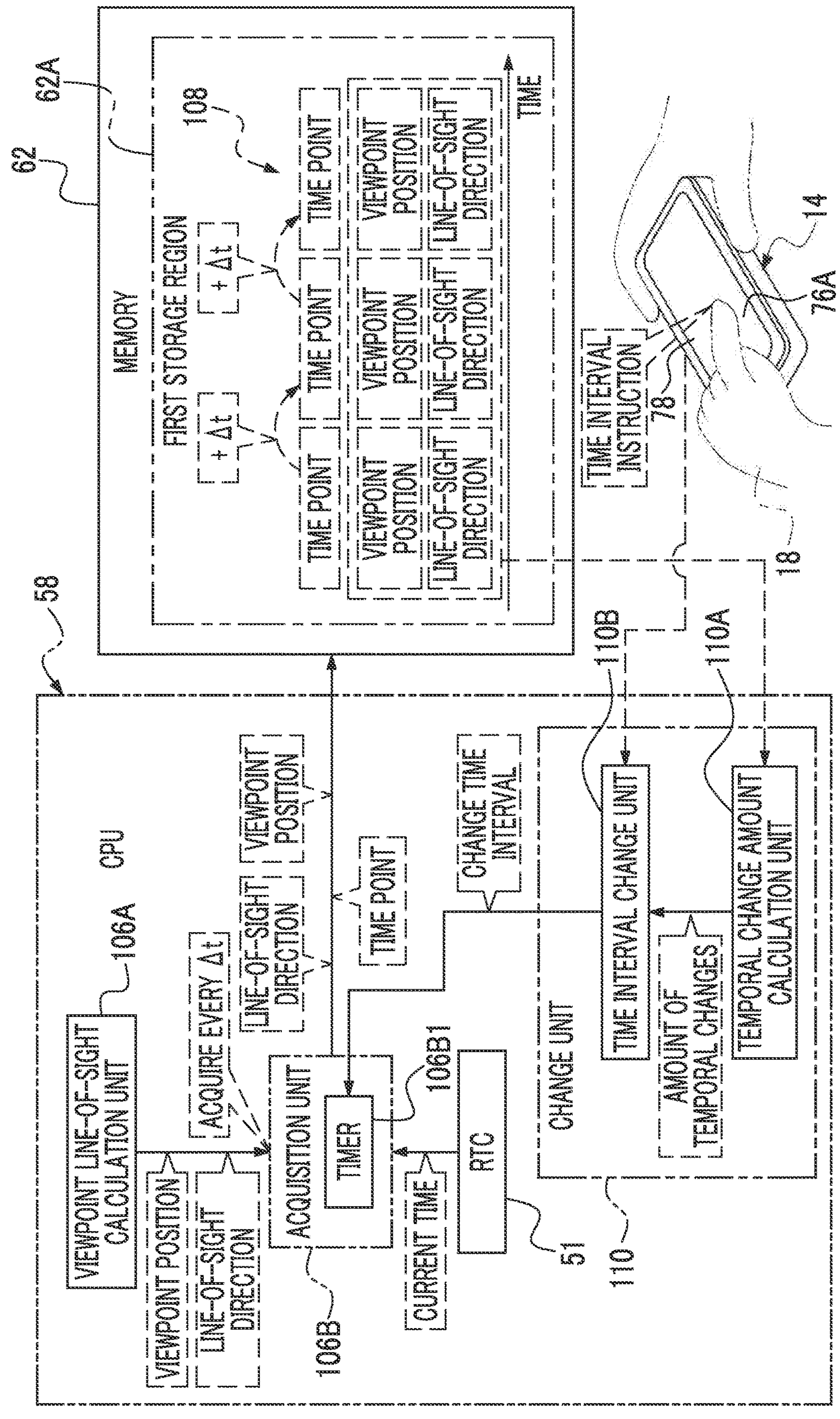
FIG. 19 is a conceptual diagram showing a modification example of processing details of the change unit according to the second embodiment.

In the second embodiment, the time interval change unit 110B changes the time interval Δt according to the amount of temporal changes calculated by the temporal change amount calculation unit 110A, but the technique of the present disclosure is not limited to this. For example, the CPU 58 may further change the time interval Δt according to an instruction received by the reception device 76 of the user device 14. In this case, as shown in FIG. 19 as an example, in a case where a time interval instruction which is an instruction for the new time interval Δt is received via the touch panel 76A of the user device 14, the time interval change unit 110B changes the time interval Δt to the new time interval Δt according to the time interval instruction. Here, a form example in which a time interval instruction is received via the touch panel 76A has been described, but a time interval instruction may be given by using a hard key, or a time interval instruction may be given by using voice recognition processing. As described above, by changing the time interval Δt according to the instruction received by the reception device 76, it is possible to prevent the time interval Δt from being too short or too long. As a result, it is possible to prevent the user 18 who is a viewer of the virtual viewpoint image 46C from feeling that the time interval at which the virtual viewpoint image 46C is displayed is too short or too long.

Figure 20:
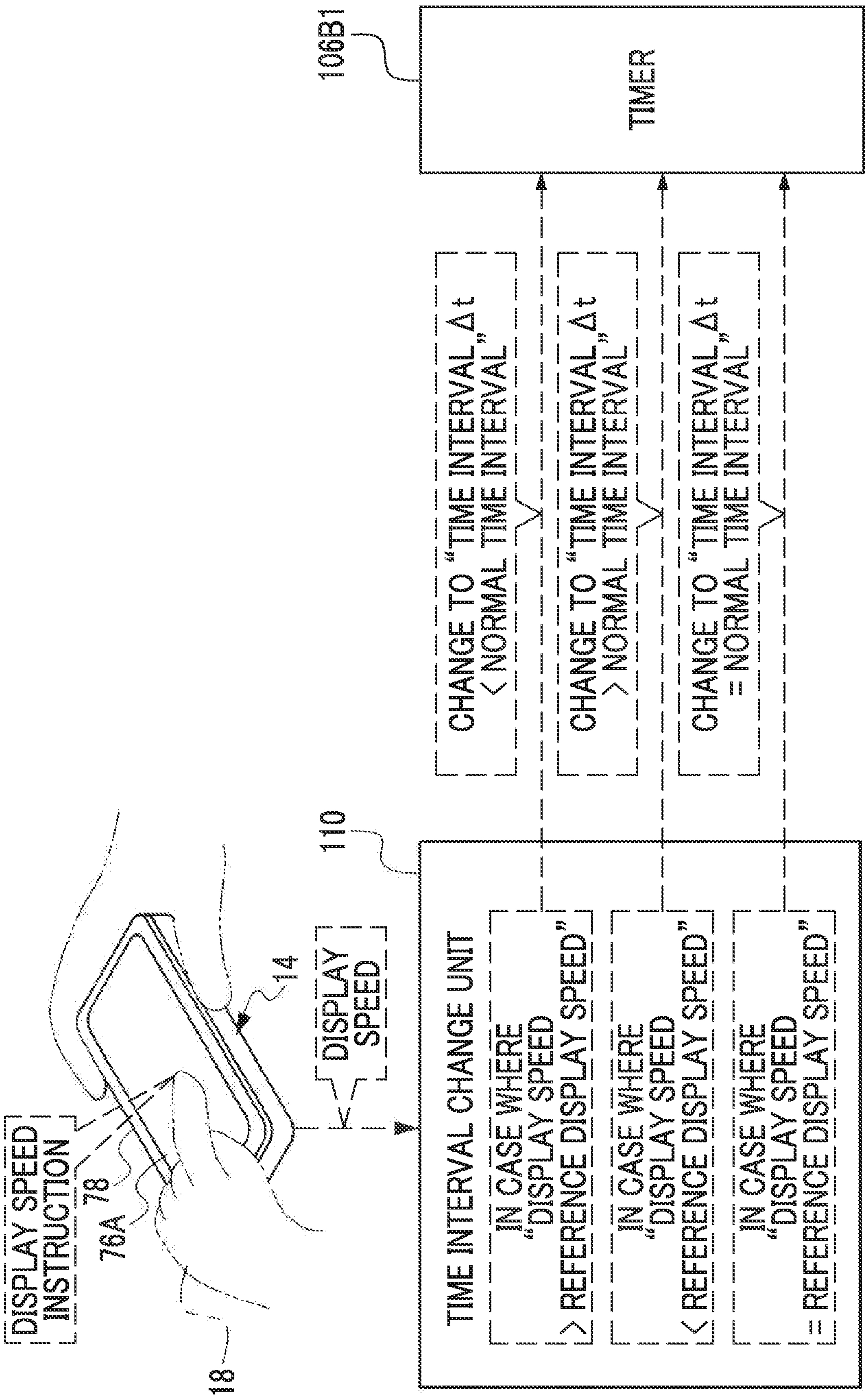
FIG. 20 is a conceptual diagram showing a specific example of processing details of the change unit shown in FIG. 19.

In a case where the time interval Δt is changed according to the instruction received by the reception device 76 of the user device 14, the instruction received by the reception device 76 may be an instruction related to a display speed (display speed instruction) of the virtual viewpoint image 46C as shown in FIG. 20 as an example. The display speed instruction is, for example, an instruction for a speed at which the virtual viewpoint image 46C is displayed on the display 78, that is, a reproduction speed. By setting an instruction received by the reception device 76 as the display speed instruction as described above, the time interval Δt can be adjusted to a display speed of the virtual viewpoint image 46C.

Here, for example, in a case where the reception device 76 receives an instruction for setting a display speed to be the same as a reference display speed, the time interval change unit 110B changes the time interval Δt to the same time interval as the normal time interval. The reference display speed is examples of a "first reference display speed" and a "second reference display speed" according to the technique of the present disclosure, and the reference display speed may be fixed or may be changed according to a given instruction and/or condition.

For example, in a case where the reception device 76 receives an instruction for setting a display speed to be higher than the reference display speed, the time interval change unit 110B sets the time interval Δt to be shorter than the normal time interval. Consequently, in a case where an instruction for setting a display speed of the virtual viewpoint image 46C to be higher than the reference display speed is received, the user 18 who is a viewer of the virtual viewpoint image 46C can feel the reality of rough temporal changes in the viewpoint position and the line-of-sight direction of the target person 96 compared with a case where the time interval Δt is always constant regardless of receiving an instruction for setting a display speed of the virtual viewpoint image 46C to be higher than the reference display speed.

For example, in a case where the reception device 76 receives an instruction for setting a display speed to be lower than the reference display speed, the time interval change unit 110B sets the time interval Δt to be longer than the normal time interval. Consequently, in a case where an instruction for setting a display speed of the virtual viewpoint image 46C to be lower than the reference display speed is received, the user 18 who is a viewer of the virtual viewpoint image 46C can feel the reality of fine temporal changes in the viewpoint position and the line-of-sight direction of the target person 96 compared with a case where the time interval Δt is always constant regardless of receiving an instruction for setting a display speed of the virtual viewpoint image 46C to be lower than the reference display speed.

Figure 21:
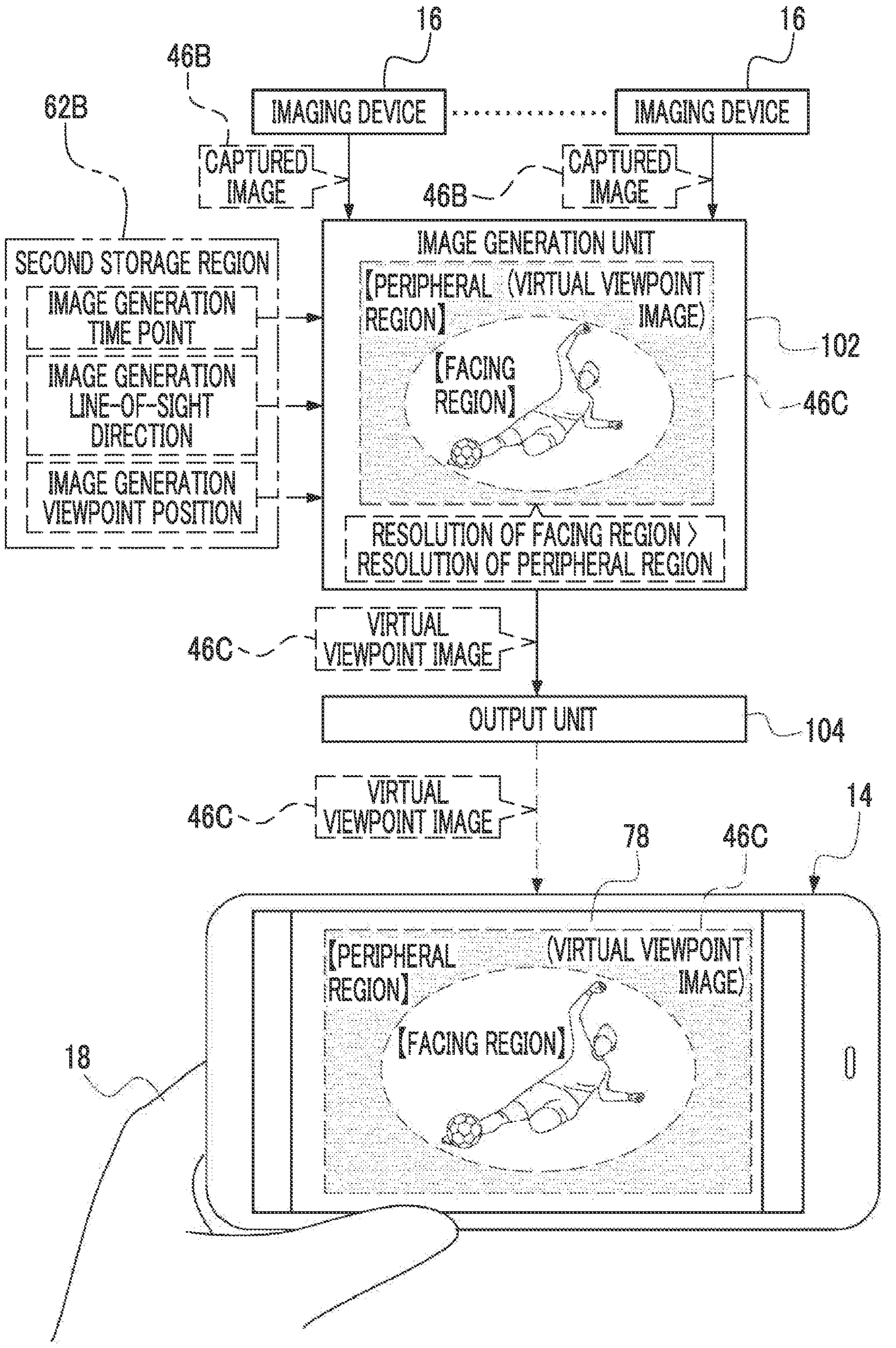
FIG. 21 is a conceptual diagram showing an example of a generation aspect and a display aspect of a virtual viewpoint image.

In each of the above embodiments, a resolution is constant in the virtual viewpoint image 46C, but the technique of the present disclosure is not limited to this. For example, as shown in FIG. 21, a display region of the virtual viewpoint image 46C is divided into a facing region facing the line-of-sight direction of the target person 96 and a peripheral region surrounding the facing region (hatched region shown in FIG. 21). The image generation unit 102 may set a resolution of the peripheral region to be lower than a resolution of the facing region. Consequently, the user 18 who is a viewer of the virtual viewpoint image 46C can separately feel the reality of a region where the target person 96 is expected to be paying attention to (the facing region in the example shown in FIG. 21) and the other region (the peripheral region in the example shown in FIG. 21).

Figure 22:
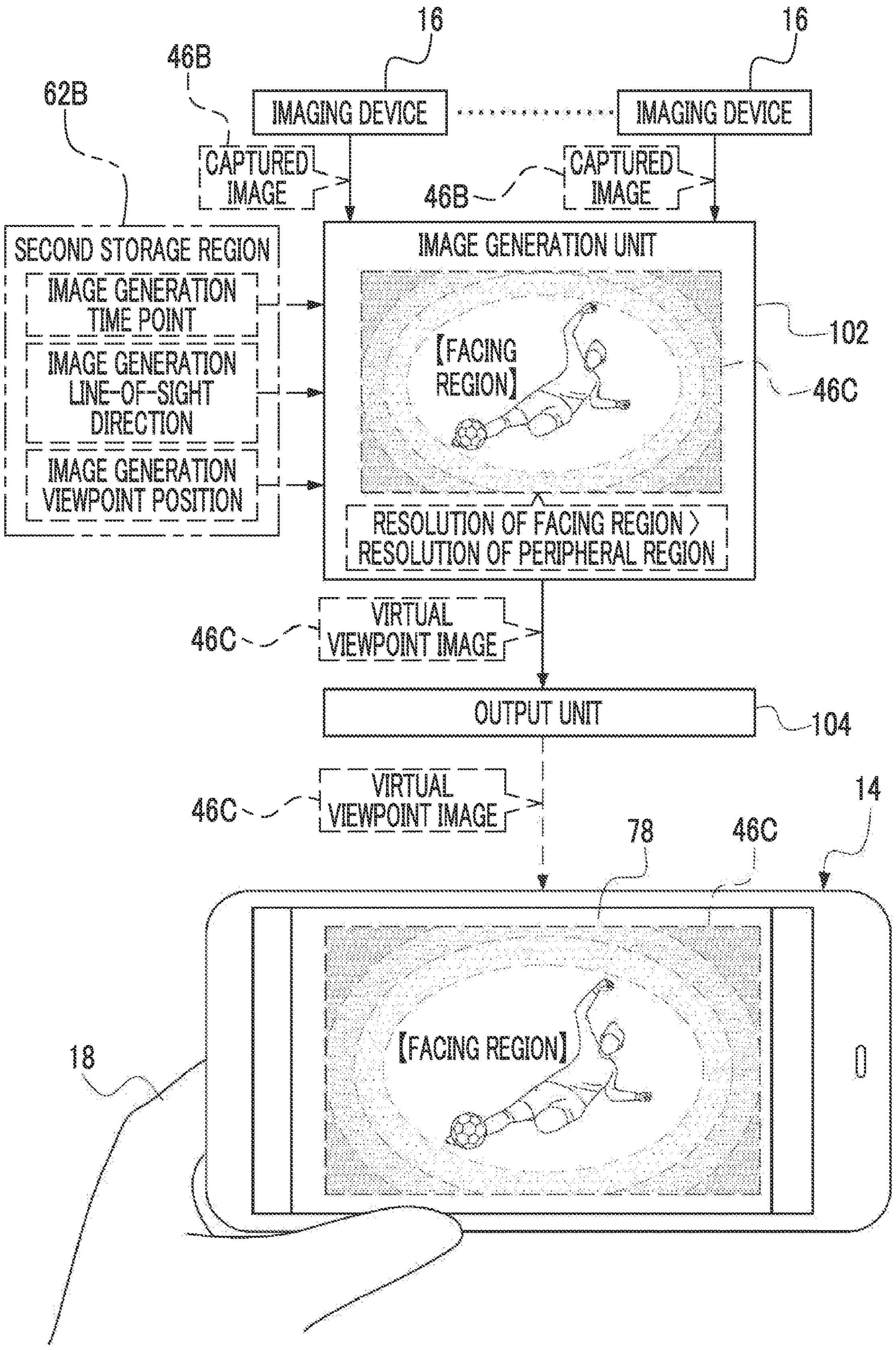
FIG. 22 is a conceptual diagram showing a first modification example of the generation aspect and the display aspect of the virtual viewpoint image shown in FIG. 21.

As shown in FIG. 22, the image generation unit 102 may set a resolution of the peripheral region (hatched region shown in FIG. 22) to be reduced as a distance from the facing region increases. Consequently, the user 18 who is a viewer of the virtual viewpoint image 46C can separately feel the reality of a region where the target person 96 is expected to be paying attention to (the facing region in the example shown in FIG. 22) and the other region (the hatched region in the example shown in FIG. 22).

Figure 23:
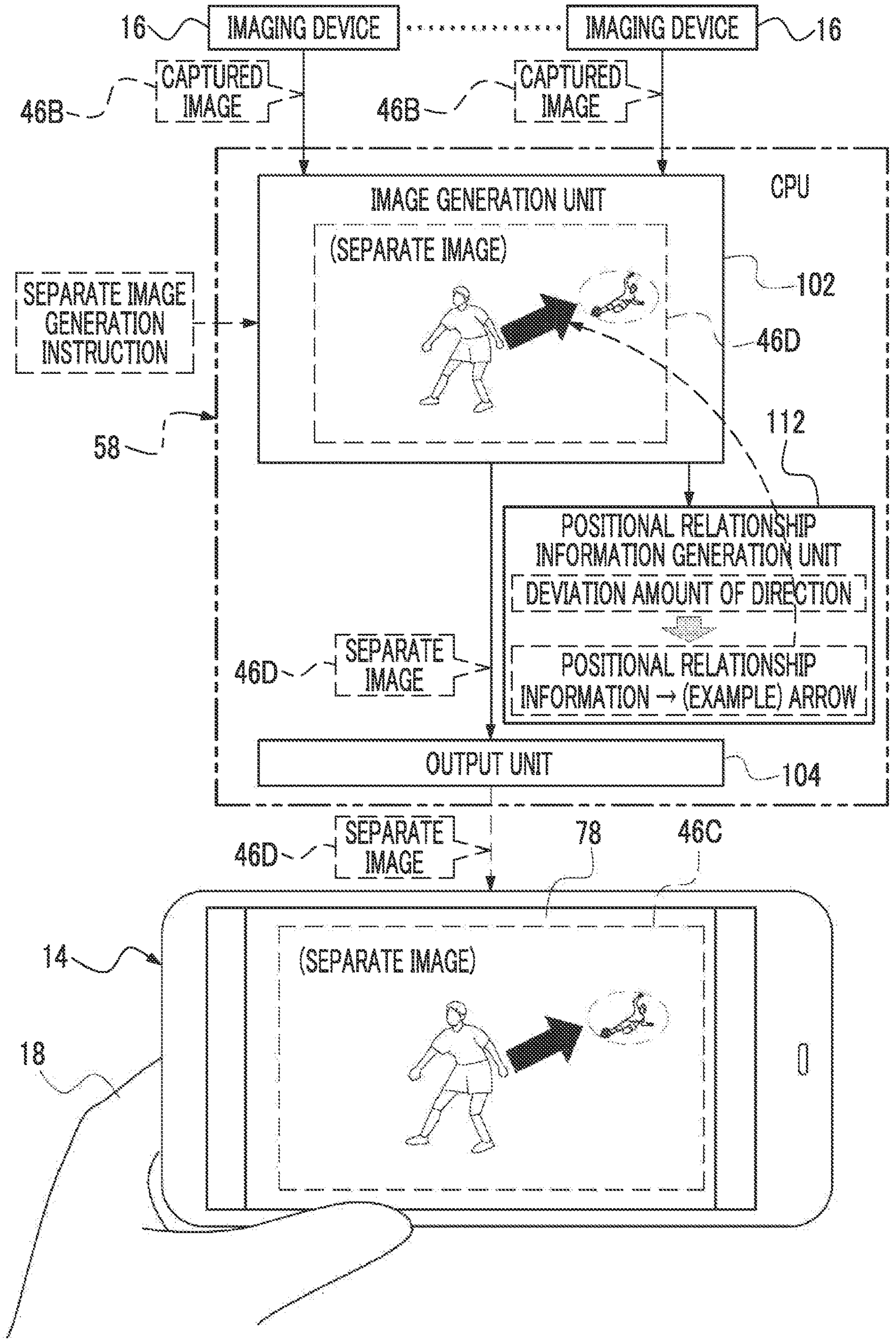
FIG. 23 is a conceptual diagram showing an example of processing details of an image generation unit, a positional relationship information generation unit, and an output unit.

The CPU 58 may generate and output information indicating a positional relationship between a separate image and the virtual viewpoint image 46C on the basis of a deviation between an imaging direction for obtaining the separate image showing at least a part of an imaging region and a line-of-sight direction of the target person 96, the separate image being different from the virtual viewpoint image 46C. In this case, as shown in FIG. 23 as an example, the CPU 58 further operates as a positional relationship information generation unit 112. The image generation unit 102 generates a separate image 46D by using the captured image group in response to a separate image generation instruction given from the outside (for example, the user device 14). The separate image generation instruction is an instruction for generating, for example, a live broadcast image, a recorded image (for example, a replay image), or a virtual viewpoint image obtained by being captured by a virtual camera having a virtual camera position and a virtual camera orientation different from a viewpoint position and a line-of-sight direction of the target person 96. The separate image 46D is an example of a “display image” according to the technique of the present disclosure.

The image generation unit 102 outputs the virtual viewpoint image 46C and the separate image 46D generated in response to the separate image generation instruction to the positional relationship information generation unit 112. The positional relationship information generation unit 112 acquires the imaging direction used to obtain the separate image 46D and the line-of-sight direction of the target person 96. For the imaging direction used to obtain the separate image 46D, in a case where imaging for obtaining the separate image 46D is performed by a plurality of imaging devices 16, for example, an average value of imaging directions of the plurality of imaging devices 16 is set as the imaging direction used to obtain the separate image 46D.

The positional relationship information generation unit 112 calculates a deviation amount and a deviation direction between the imaging direction used to obtain the separate image 46D and the line-of-sight direction of the target person 96, and generates positional relationship information indicating a positional relationship between the virtual viewpoint image 46C and the separate image 46D input from the image generation unit 102 on the basis of the deviation amount and the deviation direction. The positional relationship information is information that is visually recognized by a viewer of the virtual viewpoint image 46C, that is, the user 18. In the example shown in FIG. 23, an arrow is given as an example of the positional relationship information. A direction indicated by the arrow is a direction from the separate image 46D to the virtual viewpoint image 46C.

The positional relationship information generation unit 112 superimposes an arrow as the positional relationship information on the separate image 46D. The arrow indicates a direction of the virtual viewpoint image 46C from a central portion of the separate image 46D. The separate image 46D on which the arrow is superimposed is displayed on the display 78 of the user device 14.

Figure 24:
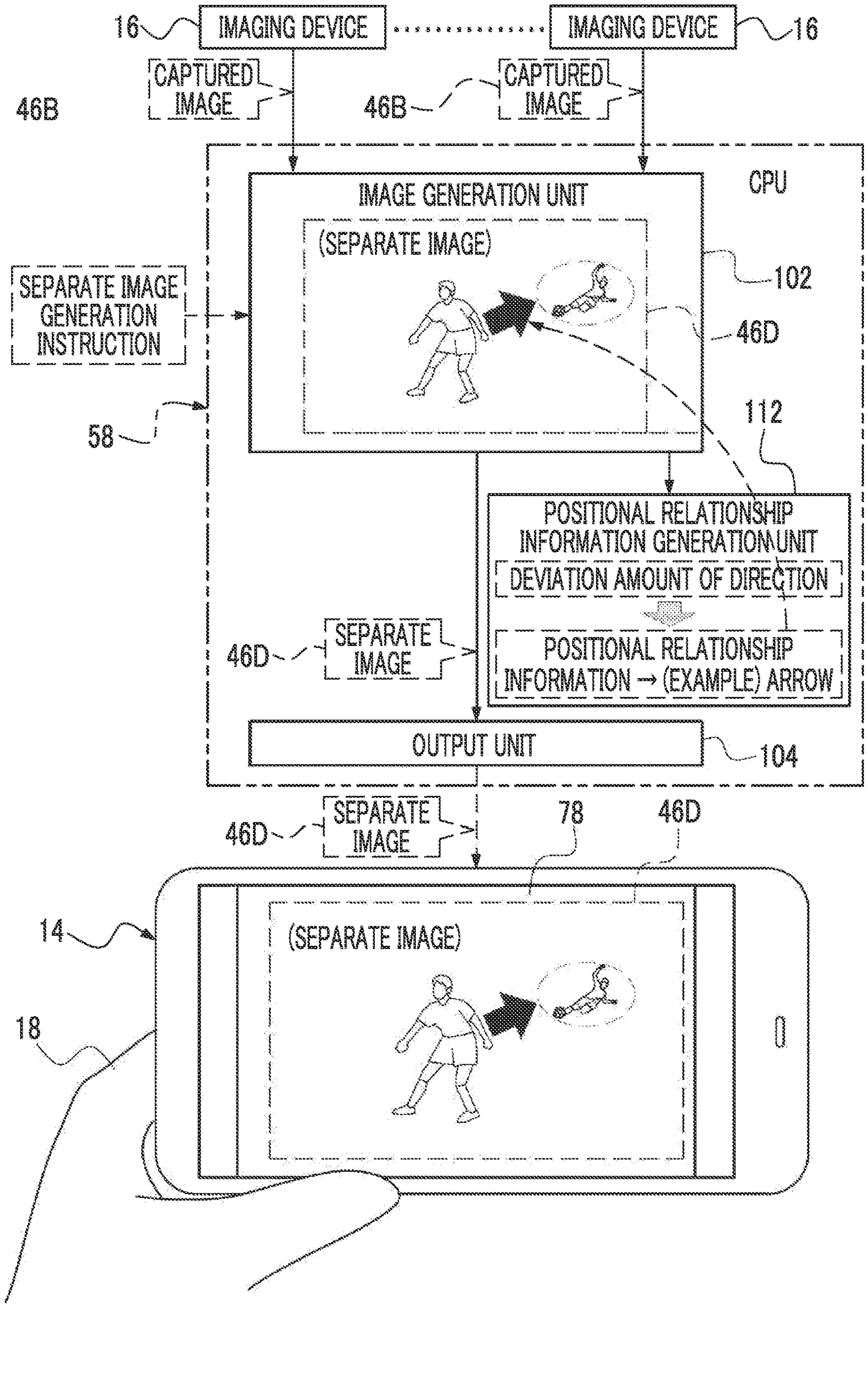
FIG. 24 is a conceptual diagram showing an example of an aspect in which a length of a superimposed arrow shown in FIG. 23 is shortened.

A length of the arrow superimposed on the separate image 46D (hereinafter, also referred to as “superimposed arrow”) is expanded and contracted by the positional relationship generation unit 112 according to a distance (for example, a deviation amount) between the position of the separate image 46D and the position of the virtual viewpoint image 46C. For example, an superimposed arrow shown in FIG. 24 is shorter than the superimposed arrow shown in FIG. 23. A length of the superimposed arrow shown in FIG. 24 is returned to the arrow shown in FIG. 23 or longer than the arrow shown in FIG. 23 by the positional relationship information generation unit 112 according to a deviation amount between the imaging direction used to obtain the separate image 46D and the line-of-sight direction of the target person 96. In a case where a deviation direction between the imaging direction used to obtain the separate image 46D and the line-of-sight direction of the target person 96 is changed, the orientation of the superimposed arrow is also changed by the positional relationship information generation unit 112 accordingly.

As described above, in the examples shown in FIGS. 23 and 24, positional relationship information indicating a positional relationship between the separate image and the virtual viewpoint image 46C is generated and output on the basis of a deviation between the imaging direction for obtaining the separate image and the line-of-sight direction of the target person 96. The positional relationship information is information that is visually recognized by the user 18 who is a viewer of the virtual viewpoint image 46C. As the positional relationship information indicating the positional relationship between the separate image and the virtual viewpoint image 46C, an arrow indicating a direction from the separate image 46D to the virtual viewpoint image 46C is employed. Therefore, according to the present configuration, the user 18 who is a viewer of the virtual viewpoint image 46 can recognize a positional relationship between the separate image 46D and the virtual viewpoint image 46C. The arrow is only an example, and may be another image, text, or the like as long as information enables a direction from the separate image 46D to the virtual viewpoint image 46C to be visually recognized.

In the examples shown in FIGS. 23 and 24, a length of the superimposed arrow is expanded and contracted according to a deviation amount between the imaging direction used to obtain the separate image 46D and the line-of-sight direction of the target person 96. Therefore, according to the present configuration, the user 18 who is a viewer of the virtual viewpoint image 46C can visually recognize a distance between the separate image 46D and the virtual viewpoint image 46C.

The CPU 58 may perform control for switching an image to be displayed on the display 78 from the image 46D to the virtual viewpoint image 46C on condition that an instruction for switching from the separate image 46D to the virtual viewpoint image 46C is given in a state in which the separate image 46D is displayed on the display 78.

Figure 25:
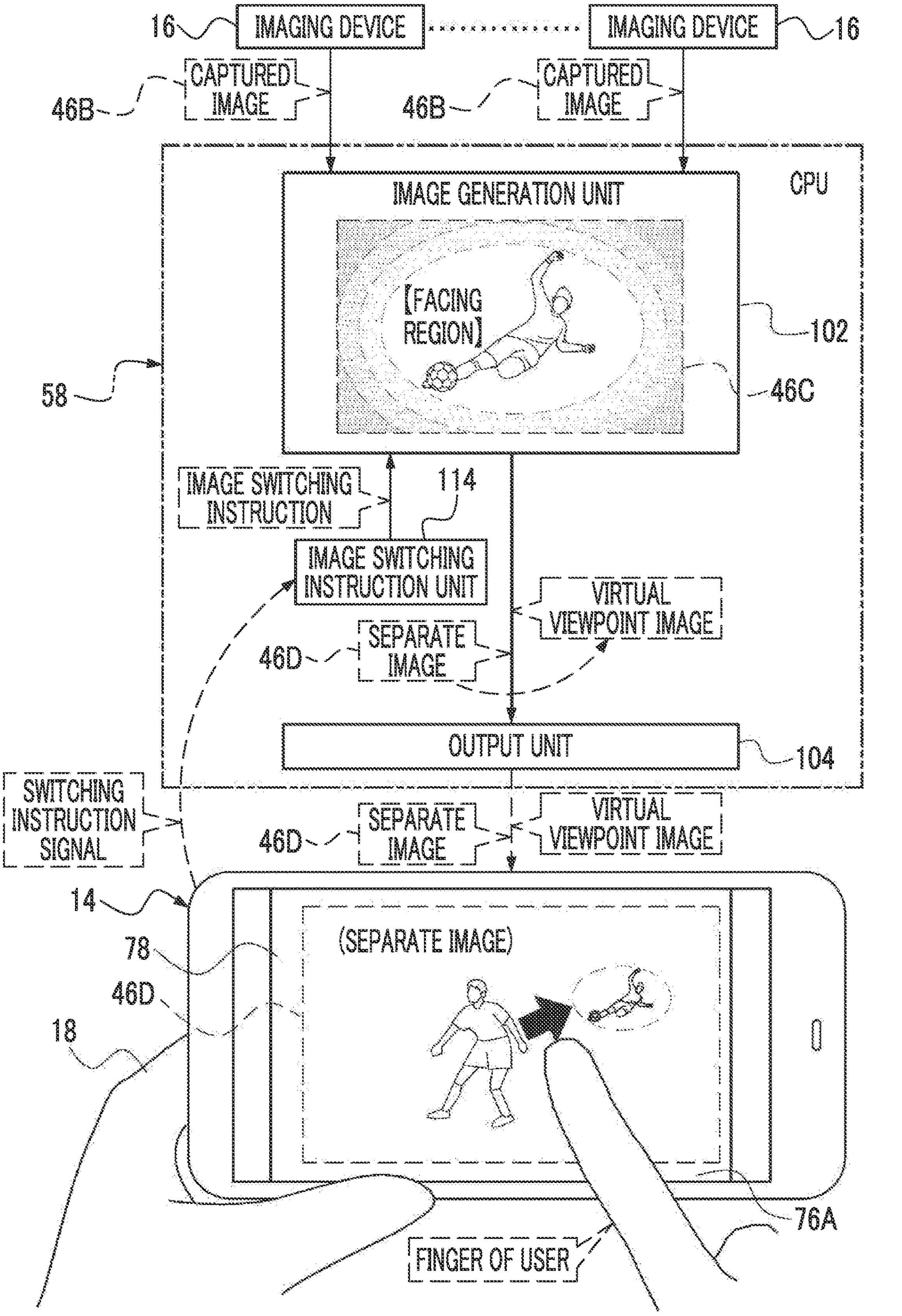
FIG. 25 is a conceptual diagram showing processing details in a case of switching from another image to a virtual viewpoint image.

In this case, as shown in FIG. 25 as an example, the CPU 58 further operates as an image switching instruction unit 114. In a case where the user 18 touches the position where the superimposed arrow is displayed with a finger via the touch panel 76A to give a switching instruction to the user device 14 in a state in which the separate image 46D is displayed on the display 78, the user device 14 outputs a switching instruction signal to the image switching instruction unit 114. Here, the switching instruction is an instruction for switching from the separate image 46D to the virtual viewpoint image 46C, and the switching instruction signal is a signal indicating an instruction for switching from the separate image 46D to the virtual viewpoint image 46C.

In a case where the switching instruction signal is input, the image switching instruction unit 114 instructs the image generation unit 102 to switch from the separate image 46D to the virtual viewpoint image 46C. In response to this, the image generation unit 102 generates the virtual viewpoint image 46C. The output unit 104 outputs the virtual viewpoint image 46C generated by the image generation unit 102 to the user device 14, and thus performs switching from the separate image 46D displayed on the display 78 to the virtual viewpoint image 46C. Consequently, an image to be displayed on the display 78 can be switched from the separate image 46D to the virtual viewpoint image 46C at a timing intended by the user 18.

Figure 26:
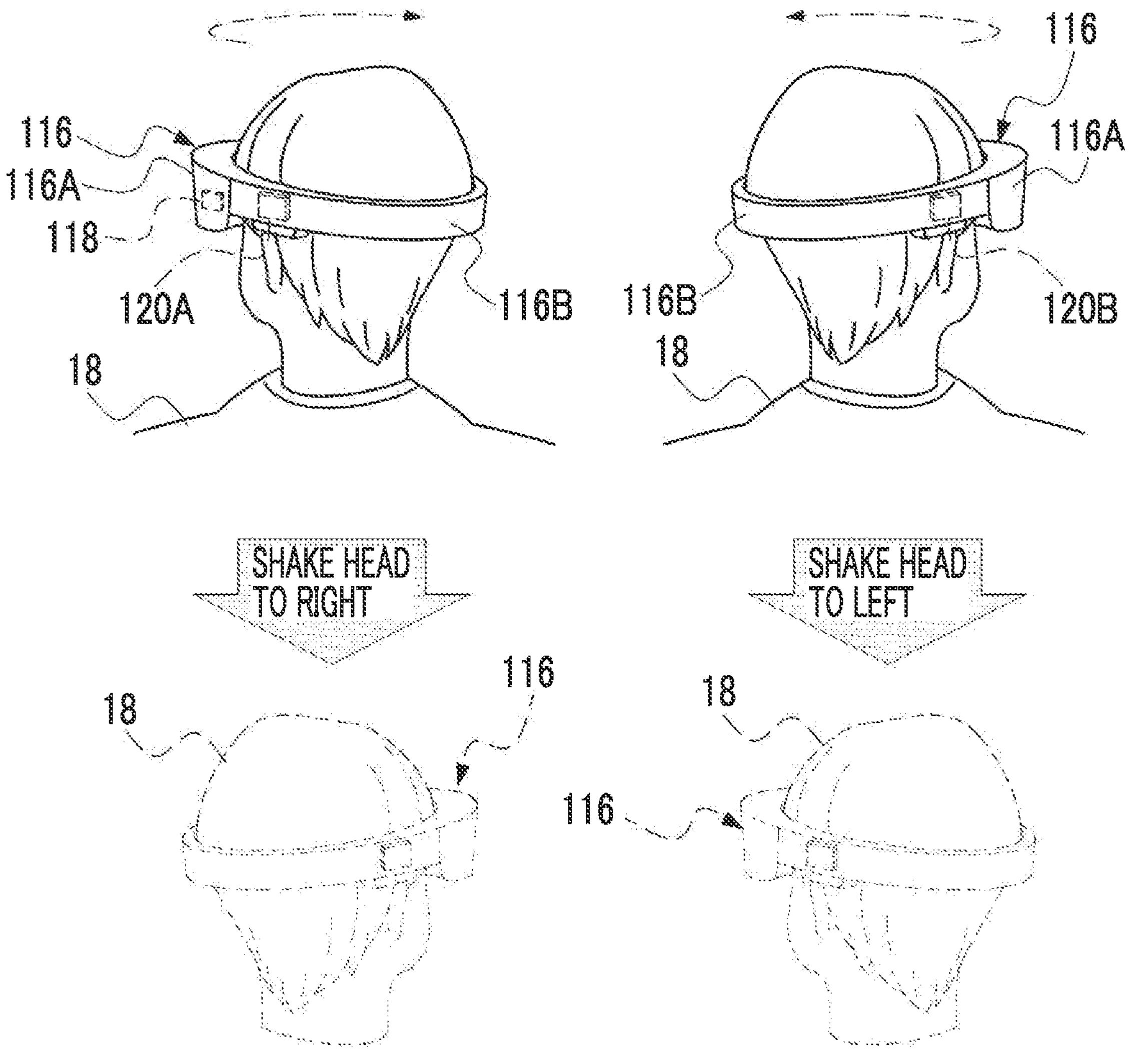
FIG. 26 is a conceptual diagram showing a usage example in a case where a head-mounted display is used as a user device.

In each of the above embodiments, a smartphone has been described as an example of the user device 14, but the technique of the present disclosure is not limited to this, and as shown in FIG. 26 as an example, the technique of the present disclosure is established even in a case where a head-mounted display 116 is applied instead of the user device 14. In the example shown in FIG. 26, the head-mounted display 116 includes a body part 116A and a mounting part 116B. In a case where the head-mounted display 116 is mounted on the user 18, the body part 116A is located in front of the eyes of the user 18, and the mounting part 116B is located in the upper half of the head of the user 18. The mounting part 116B is a band-shaped member having a width of about several centimeters, and is fixed in close contact with the upper half of the head of the user 18.

The body part 116A includes various electrical devices. Examples of various electrical devices include a computer corresponding to the computer 70 of the user device 14, a communication I/F corresponding to the communication I/F 86 of the user device 14, a display corresponding to the display 78 of the user device 14, a microphone corresponding to the microphone 80 of the user device 14, a speaker corresponding to the speaker 82 of the user device 14, and a gyro sensor 118 corresponding to the gyro sensor 74 of the user device 14.

The mounting part 116B includes vibrators 120A and 120B. The vibrator 120A is disposed to face the left side head of the user 18, and the vibrator 120B is disposed to face the right side head of the user 18.

The various electrical devices, the vibrator 120A, and the vibrator 120B of the body part 116A are electrically connected via a bus corresponding to the bus 94 of the user device 14.

Here, for example, a case is assumed in which the separate image 46D shown in FIG. 25 is displayed on the head-mounted display 116 in a state of being mounted on the upper half of the head of the user 18, similarly to the display 78 of the user device 14. The user 18 shakes his head in a direction indicated by the superimposed arrow, and thus the computer in the mounting part 116B detects the direction in which the user 18 has shaken the head on the basis of a detection result from the gyro sensor 118 (hereinafter, also referred to as a "head shaking direction"). The computer determines whether or not the detected head shaking direction and the direction indicated by the superimposed arrow match. In a case where the head shaking direction and the direction indicated by the superimposed arrow match, the computer switches an image displayed on the head-mounted display 116 from the separate image 46D to the virtual viewpoint image 46C.

Information indicating a positional relationship between the separate image 46D and the virtual viewpoint image 46C may be information that is tactilely recognized by the user 18 who is a viewer of the virtual viewpoint image 46C. In this case, for example, the computer vibrates the vibrator 120A in a case where the direction indicated by the superimposed arrow is the left direction as viewed from the user 18, and the computer vibrates the vibrator 120B in a case where the direction indicated by the superimposed arrow is the right direction as viewed from the user 18. In a case where the user 18 shakes his/her head to the right in a state in which the vibrator 120B is being vibrated, the computer determines that the head shaking direction is to the right direction on the basis of a detection result from the gyro sensor 118, and switches an image displayed on the head-mounted display 116 from the separate image 46D to the virtual viewpoint image 46C. In a case where the user 18 shakes his/her head to the left while the vibrator 120A is being vibrated, the computer determines that the head shaking direction is the left direction on the basis of a detection result from the gyro sensor 118, and switches an image displayed on the head-mounted display 116 from the separate image 46D to the virtual viewpoint image 46C.

By selectively vibrating the vibrators 120A and 120B as described above, the user 18 tactilely recognizes a positional relationship between the virtual viewpoint image 46C and the separate image 46D.

Information indicating the positional relationship between the separate image 46D and the virtual viewpoint image 46C may be information that is audibly recognized by the user 18 who is a viewer of the virtual viewpoint image 46C. In this case, the computer controls the speaker such that voice indicating a direction indicated by the superimposed arrow is output from the speaker. Consequently, the user 18 audibly recognizes the positional relationship between the virtual viewpoint image 46C and the separate image 46D.

Here, a form example in which voice is transmitted to the user 18 by the speaker is described, but this is only an example, and voice may be transmitted to the user 18 according to a bone conduction method.

Information indicating the positional relationship between the separate image 46D and the virtual viewpoint image 46C may be at least one of information that is visually recognized by the user 18, information that is audibly recognized by the user 18, or information that is tactilely recognized by the user 18.

In each of the above embodiments, a form example has been described in which the virtual viewpoint image 46C related to one image generation time point is generated by the image generation unit 102 and the generated virtual viewpoint image 46C is output to the user device 14 by the output unit 104, but the technique of the present disclosure is not limited to this. For example, the CPU 58 may generate and output a display screen in which the virtual viewpoint images 46C are arranged in a time series.

Figure 27:
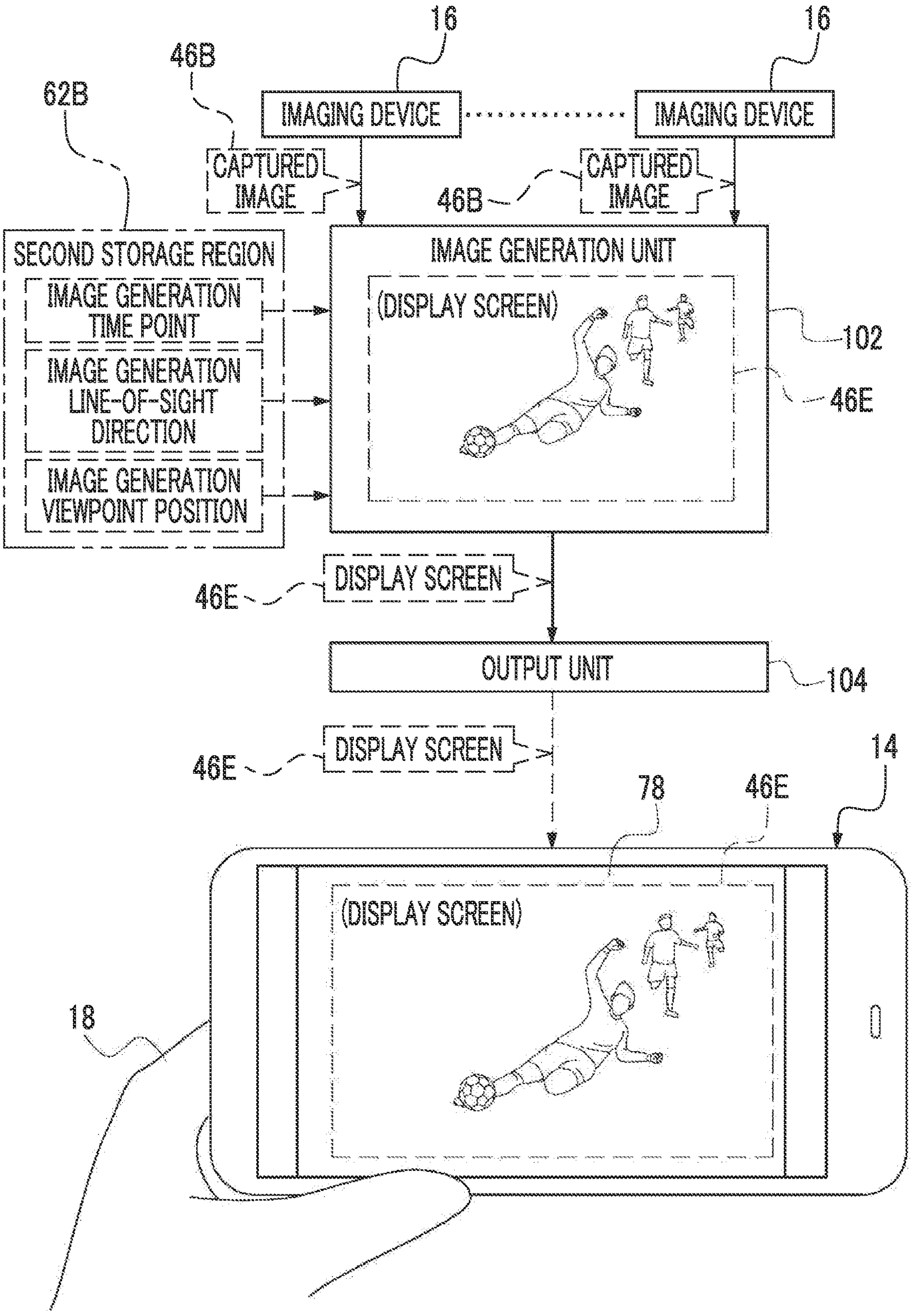
FIG. 27 is a conceptual diagram showing an example of an aspect of a display screen in which virtual viewpoint images are arranged in a time series.
Figure 28:
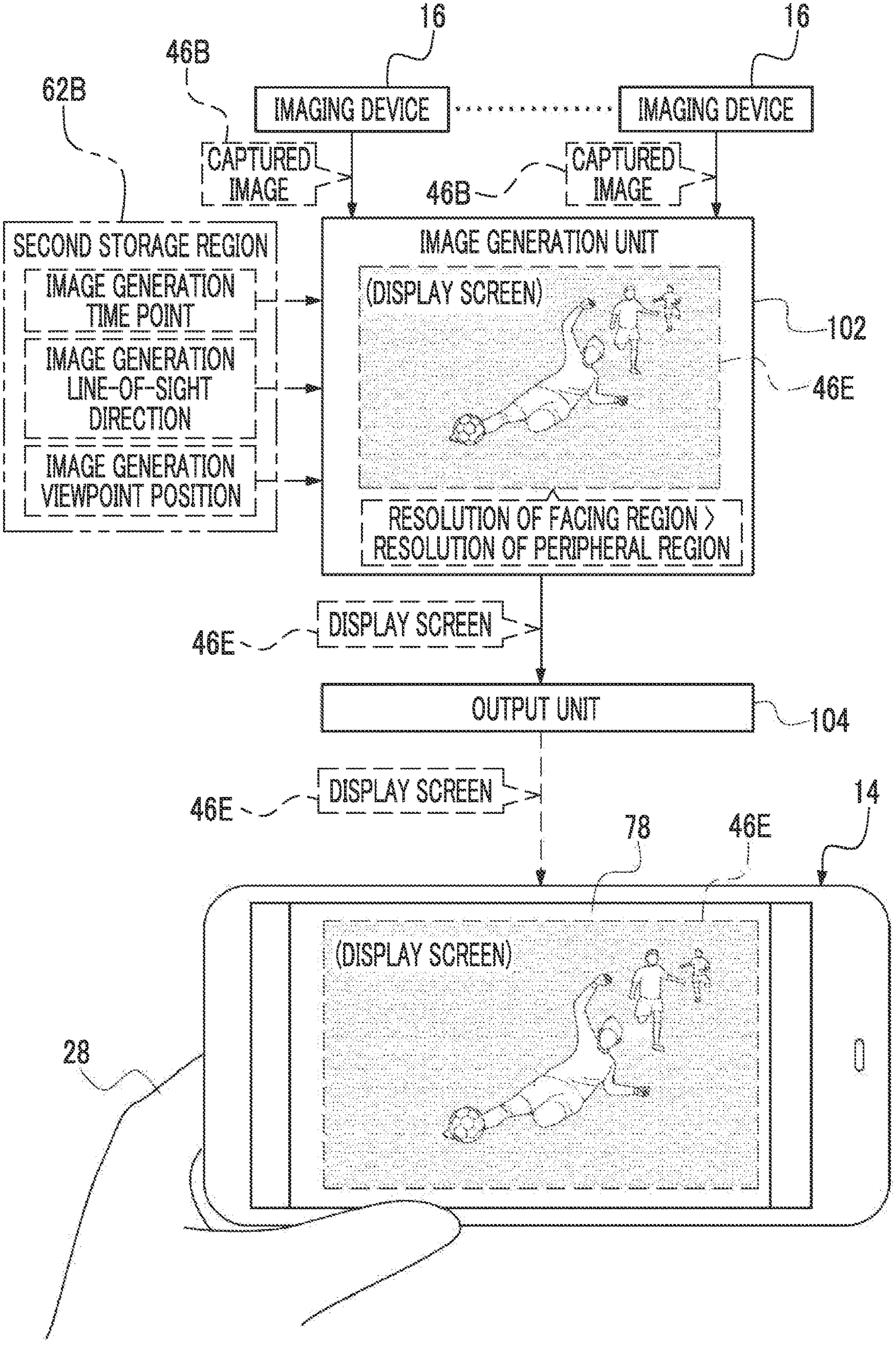
FIG. 28 is a conceptual diagram showing an example of an aspect in which a resolution of a peripheral region is lower than a resolution of a facing region in the display screen.

In this case, for example, every time a new image generation time point is stored in the second storage region 62B, the image generation unit 102 generates the virtual viewpoint image 46C with reference to an image generation viewpoint position and an image generation line-of-sight direction. As shown in FIG. 27 as an example, the image generation unit 102 generates a display screen 46E in which a plurality of virtual viewpoint images 46C related to respective image generation time points are arranged in a time series. In the display screen 46E, the plurality of virtual viewpoint images 46C are, for example, alpha-blended and arranged in a time series. As shown in FIG. 28 as an example, a resolution of the facing region may be higher than a resolution of the peripheral region in the display screen 46E. In the example shown in FIG. 28, a hatched region in the display screen 46E has a lower resolution than other regions.

The display screen 46E generated by the image generation unit 102 as described above is output to the user device 14 by the output unit 104 and displayed on the display 78 of the user device 14. Consequently, the user 18 who is a viewer of the virtual viewpoint image 46C can ascertain the process of change in the virtual viewpoint image 46C via the display screen 46E.

In each of the above embodiments, the soccer stadium 22 has been exemplified, but this is only an example, and any place may be used as long as a plurality of imaging devices 16 can be installed, such as a baseball field, a rugby field, a curling field, an athletic field, a swimming pool, a concert hall, an outdoor music field, and a theatrical play venue.

In each of the above embodiments, the computers 50 and 70 have been exemplified, but the technique of the present disclosure is not limited to this. For example, instead of the computers 50 and/or 70, devices including ASICs, FPGAs, and/or PLDs may be applied. Instead of the computer 50 and/or 70, a combination of hardware configuration and software configuration may be used.

In each of the above embodiments, a form example in which the image processing apparatus side processing is executed by the CPU 58 of the image processing apparatus 12 has been described, but the technique of the present disclosure is not limited to this. Some of the processes included in the image processing apparatus side processing may be executed by the CPU 88 of the user device 14. Instead of the CPU 88, a GPU may be employed, or a plurality of CPUs may be employed, and various processes may be executed by one processor or a plurality of physically separated processors.

Figure 29:
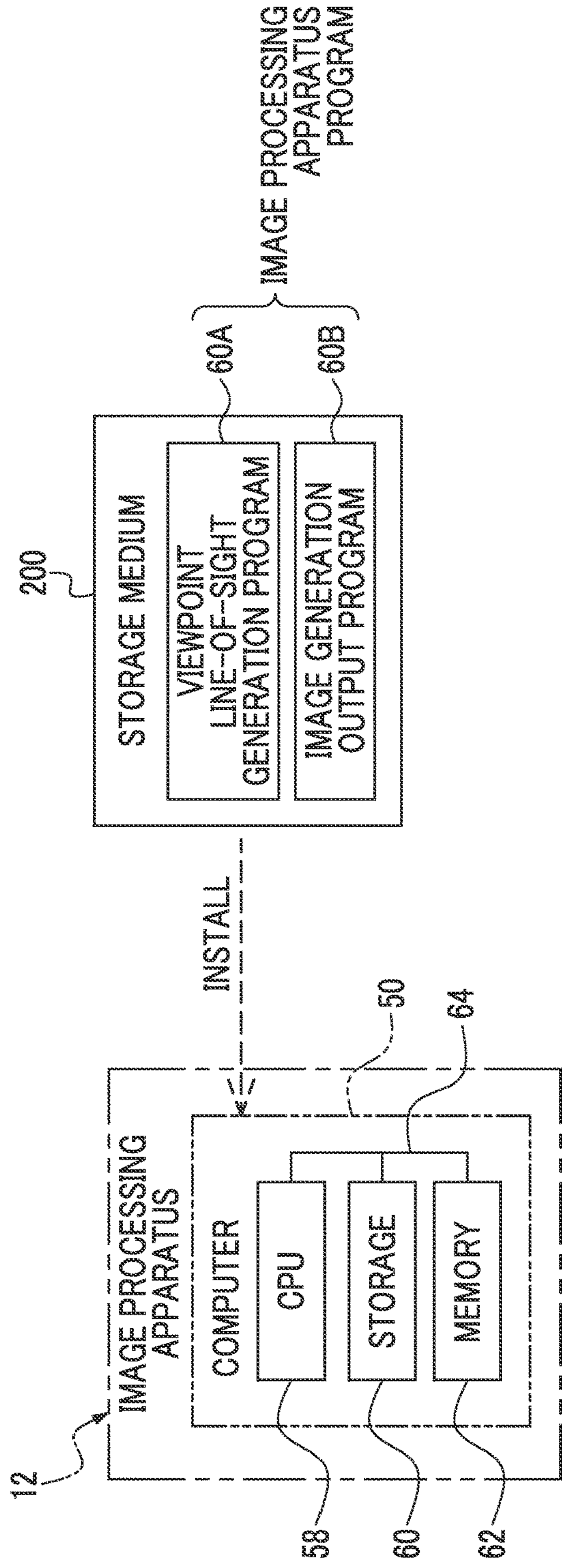
FIG. 29 is a block diagram showing an example of an aspect in which an image processing apparatus program is installed in a computer of the image processing apparatus from a storage medium in which the image processing apparatus program is stored.

In each of the above embodiments, the image processing apparatus program is stored in the storage 60, but the technique of the present disclosure is not limited to this, and as shown in FIG. 29 as an example, and the image processing apparatus program may be stored in any portable storage medium 200. The storage medium 200 is a non-transitory storage medium. Examples of the storage medium 200 include an SSD and a USB memory. The image processing apparatus program stored in the storage medium 200 is installed in the computer 50, and the CPU 58 executes the image processing apparatus side processing according to the image processing apparatus program.

The image processing apparatus program may be stored in a program memory of another computer, a server device, or the like connected to the computer 50 via a communication network (not shown), and the image processing apparatus program may be downloaded to the image processing apparatus 12 in response to a request from the image processing apparatus 12. In this case, the image processing apparatus side processing based on the downloaded image processing apparatus program is executed by the CPU 58 of the computer 50.

In each of the above embodiments, the CPU 58 has been exemplified, but the technique of the present disclosure is not limited to this, and a GPU may be employed. A plurality of CPUs may be employed instead of the CPU 58. That is, the image processing apparatus side processing may be executed by one processor or a plurality of physically separated processors.

As a hardware resource for executing the image processing apparatus side processing, the following various processors may be used. Examples of the processor include, as described above, a CPU that is a general-purpose processor that functions as a hardware resource that executes the image processing apparatus side processing according to software, that is, a program. As another processor, for example, a dedicated electric circuit which is a processor such as an FPGA, a PLD, or an ASIC having a circuit configuration specially designed for executing a specific process may be used. A memory is built in or connected to each processor, and each processor executes the image processing apparatus side processing by using the memory.

The hardware resource that executes the image processing apparatus side processing may be configured with one of these various processors, or a combination of two or more processors of the same type or different types (for example, a combination of a plurality of FPGAs, or a combination of a CPU and an FPGA). The hardware resource that executes the image processing apparatus side processing may be one processor.

As an example of configuring a hardware resource with one processor, first, there is a form in which one processor is configured by a combination of one or more CPUs and software, as typified by a computer used for a client or a server, and this processor functions as the hardware resource that executes the image processing apparatus side processing. Second, as typified by system on chip (SoC), there is a form in which a processor that realizes functions of the entire system including a plurality of hardware resources executing the image processing apparatus side processing with one integrated circuit (IC) chip is used. As described above, the image processing apparatus side processing is realized by using one or more of the above various processors as hardware resources.

As a hardware structure of these various processors, more specifically, an electric circuit in which circuit elements such as semiconductor elements are combined may be used.

The image processing apparatus side processing described above is only an example. Therefore, needless to say, unnecessary steps may be deleted, new steps may be added, or the processing order may be changed within the scope without departing from the spirit.

The content described and exemplified above are detailed descriptions of the portions related to the technique of the present disclosure, and are only an example of the technique of the present disclosure. For example, the above description of the configuration, the function, the operation, and the effect is an example of the configuration, the function, the operation, and the effect of the portions of the technique of the present disclosure. Therefore, needless to say, unnecessary portions may be deleted, new elements may be added, or replacements may be made to the described content and illustrated content shown above within the scope without departing from the spirit of the technique of the present disclosure. In order to avoid complications and facilitate understanding of the portions related to the technique of the present disclosure, in the description content and the illustrated content shown above require special description, description of common technical knowledge or the like that does not require particular description in order to enable the implementation of the technique of the present disclosure is omitted.

In the present specification, "A and/or B" is synonymous with "at least one of A or B". That is, "A and/or B" means that it may be only A, only B, or a combination of A and B. In the present specification, in a case where three or more matters are connected and expressed by "and/or", the same concept as "A and/or B" is applied.

All the documents, the patent applications, and the technical standards disclosed in the present specification are incorporated by reference in the present specification to the same extent as in a case where the individual documents, patent applications, and technical standards are specifically and individually stated to be incorporated by reference.

What is claimed is:

1. An image processing apparatus comprising:
a processor; and
a memory built in or connected to the processor,
wherein the processor
generates and outputs a virtual viewpoint image with reference to a position and an orientation of a target object, wherein the target object is included in an imaging region and a plurality of images on the basis of the plurality of images obtained by imaging the imaging region with a plurality of imaging devices of which at least either of imaging positions or imaging directions are different,
generates an adjustment position and an adjustment orientation based on the position and the orientation of the target object by smoothing an amount of temporal changes in at least one of the position or the orientation of the target object,
controls a display aspect of the virtual viewpoint image by generating and outputting the virtual viewpoint image with reference to the adjustment position and the adjustment orientation, and
controls a display region of the virtual viewpoint image by controlling a resolution for each region included in the display region of the virtual viewpoint image,
wherein the display region of the virtual viewpoint image is divided into a facing region facing the orientation and a peripheral region surrounding the facing region, and
the processor sets a resolution of the peripheral region to be lower than a resolution of the facing region.

2. The image processing apparatus according to claim 1, wherein the processor controls the display aspect according to the amount of temporal changes smaller than an actual amount of temporal changes in the position and the orientation of the target object.

3. The image processing apparatus according to claim 1, wherein the processor smooths the amount of temporal changes by obtaining a moving average of an amount of time-series changes in the position and the orientation.

4. The image processing apparatus according to claim 1, wherein the processor controls the display aspect of the virtual viewpoint image according to the amount of temporal changes in a case where the amount of temporal changes is within a predetermined range.

5. The image processing apparatus according to claim 1, wherein the processor changes a time interval for generating the virtual viewpoint image according to the amount of temporal changes.

6. The image processing apparatus according to claim 5, wherein, in a case where the amount of temporal changes is equal to or more than a first predetermined value, the processor sets the time interval to be shorter than a first reference time interval.

7. The image processing apparatus according to claim 6, wherein, in a case where the amount of temporal changes is less than the first predetermined value and the time interval is different from a second reference time interval, the processor sets the time interval to the second reference time interval.

8. The image processing apparatus according to claim 5, wherein, in a case where the amount of temporal changes is equal to or less than a first predetermined value, the processor sets the time interval to be longer than a second reference time interval.

9. The image processing apparatus according to claim 8, wherein, in a case where the amount of temporal changes exceeds the first predetermined value and the time interval is different from the second reference time interval, the processor sets the time interval to the second reference time interval.

10. The image processing apparatus according to claim 5, wherein the processor further changes the time interval for generating the virtual viewpoint image according to an instruction received by a reception device.

11. The image processing apparatus according to claim 10, wherein the instruction is an instruction related to a display speed of the virtual viewpoint image.

12. The image processing apparatus according to claim 11, wherein, in a case where the instruction is an instruction for setting the display speed to be lower than a first reference display speed, the processor sets the time interval to be shorter than a third reference time interval.

13. The image processing apparatus according to claim 11, wherein, in a case where the instruction is an instruction for setting the display speed to be higher than a second reference display speed, the processor sets the time interval to be longer than a fourth reference time interval.

14. The image processing apparatus according to claim 1, wherein the processor reduces the resolution of the peripheral region as a distance from the facing region increases.

15. The image processing apparatus according to claim 1, wherein the processor generates and outputs information indicating a positional relationship between a display image and the virtual viewpoint image, the display image being different from the virtual viewpoint image and showing at least a part of the imaging region, on the basis of a deviation between an imaging direction for obtaining the display image and the orientation.

16. The image processing apparatus according to claim 15, wherein the information indicating the positional relationship is information that is visually recognized by a viewer of the virtual viewpoint image.

17. The image processing apparatus according to claim 16, wherein the information indicating the positional relationship is an arrow indicating a direction from a position of the display image to a position of the virtual viewpoint image.

18. The image processing apparatus according to claim 17, wherein the processor expands and contracts a length of the arrow according to a distance between the position of the display image and the position of the virtual viewpoint image.

19. The image processing apparatus according to claim 15, wherein the information indicating the positional relationship is information including at least one of information that is tactilely recognized by a viewer of the virtual viewpoint image or information that is audibly recognized by the viewer.

20. The image processing apparatus according to claim 15, wherein the processor performs control of switching an image to be displayed on a display from the display image to the virtual viewpoint image on condition that an instruction for switching from the display image to the virtual viewpoint image is given in a state in which the display image is displayed on the display.

21. The image processing apparatus according to claim 1, wherein the processor generates and outputs a display screen in which the virtual viewpoint images are arranged in a time series.

22. The image processing apparatus according to claim 1, wherein the target object is a specific person, the position is a viewpoint position of the person, and the orientation is a line-of-sight direction of the person.

23. An image processing method comprising:

generating and outputting a virtual viewpoint image with reference to a position and an orientation of a target object, wherein the target object is included in an imaging region and a plurality of images on the basis of the plurality of images obtained by imaging the imaging region with a plurality of imaging devices of which at least either of imaging positions or imaging directions are different;

generating an adjustment position and an adjustment orientation based on the position and the orientation of the target object by smoothing an amount of temporal changes in at least one of the position or the orientation of the target object;

controlling a display aspect of the virtual viewpoint image by generating and outputting the virtual viewpoint image with reference to the adjustment position and the adjustment orientation; and controlling a display region of the virtual viewpoint image by controlling a resolution for each region included in the display region of the virtual viewpoint image, wherein the display region of the virtual viewpoint image is divided into a facing region facing the orientation and a peripheral region surrounding the facing region, and a resolution of the peripheral region is set to be lower than a resolution of the facing region.

24. A non-transitory computer-readable storage medium storing a program executable by a computer to perform a process comprising:

generating and outputting a virtual viewpoint image with reference to a position and an orientation of a target object, wherein the target object is included in an imaging region and a plurality of images on the basis of the plurality of images obtained by imaging the imaging region with a plurality of imaging devices of which at least either of imaging positions or imaging directions are different;

generating an adjustment position and an adjustment orientation based on the position and the orientation of the target object by smoothing an amount of temporal changes in at least one of the position or the orientation of the target object;

controlling a display aspect of the virtual viewpoint image by generating and outputting the virtual viewpoint image with reference to the adjustment position and the adjustment orientation; and controlling a display region of the virtual viewpoint image by controlling a resolution for each region included in the display region of the virtual viewpoint image, wherein the display region of the virtual viewpoint image is divided into a facing region facing the orientation and a peripheral region surrounding the facing region, and a resolution of the peripheral region is set to be lower than a resolution of the facing region.

* * * * *